US010790703B2

(12) United States Patent
Yoden

(10) Patent No.: US 10,790,703 B2
(45) Date of Patent: Sep. 29, 2020

(54) SMART WIRELESS POWER TRANSFER BETWEEN DEVICES

(71) Applicant: Koji Yoden, Tamba (JP)

(72) Inventor: Koji Yoden, Tamba (JP)

(*) Notice: Subject to any disclaimer, the term of this patent is extended or adjusted under 35 U.S.C. 154(b) by 0 days.

(21) Appl. No.: 15/843,092

(22) Filed: Dec. 15, 2017

(65) Prior Publication Data

US 2018/0175672 A1 Jun. 21, 2018

Related U.S. Application Data

(60) Provisional application No. 62/435,883, filed on Dec. 19, 2016.

(51) Int. Cl.
| | | |
|---|---|---|
| *H02J 50/12* | (2016.01) | |
| *H02J 7/02* | (2016.01) | |
| *H02J 50/05* | (2016.01) | |
| *H02J 50/40* | (2016.01) | |
| *H02J 50/80* | (2016.01) | |

(52) U.S. Cl.
CPC ............. *H02J 50/12* (2016.02); *H02J 7/025* (2013.01); *H02J 50/05* (2016.02); *H02J 50/40* (2016.02); *H02J 50/80* (2016.02)

(58) Field of Classification Search
CPC .. H02J 7/025; H02J 50/12; H02J 50/40; H02J 50/80; H02J 50/05
USPC ........................................................ 320/108
See application file for complete search history.

(56) References Cited

U.S. PATENT DOCUMENTS

| | | | | |
|---|---|---|---|---|
| 6,829,467 B2* | 12/2004 | Ochiai | ................. | G06Q 20/105 235/380 |
| 6,889,905 B2* | 5/2005 | Shigemasa | ......... | G06K 19/0701 235/492 |
| 7,430,675 B2* | 9/2008 | Lee | ........................ | G06F 1/3203 713/320 |
| 7,451,839 B2* | 11/2008 | Perlman | ................. | G07F 15/005 180/2.1 |

(Continued)

OTHER PUBLICATIONS

"How can I maximize the read distance of an NFC system", Mark Roberti, RFID Journal, Published Mar. 3, 2016, Accessed Online Feb. 22, 2019, https://www.rfidjournal.com/blogs/experts/entry?11643 (Year: 2016).*

(Continued)

*Primary Examiner* — John T Trischler

(57) ABSTRACT

In an aspect, a wireless power transfer system includes at least one powering device and at least one powered device. Each powering device includes powering circuitry for wireless power transfer to the powered device. Each powered device includes powered circuitry for reception of the wireless power transfer from the powering device. The powering device may include communication circuitry for a close-range wireless communication with the powered device, while the powered device may also include communication circuitry for the close-range wireless communication with the powering device, so as for the powering device and the powered device to discover each other through the communication. The powering device and powered device may conditionally activate and deactivate the powering circuitry and powered circuitry, respectively, based on the discovery using the close-range wireless communication.

4 Claims, 40 Drawing Sheets

(56) References Cited

U.S. PATENT DOCUMENTS

| | | | | |
|---|---|---|---|---|
| 7,853,813 | B2* | 12/2010 | Lee | G06F 1/3203 713/320 |
| 8,026,694 | B2* | 9/2011 | Kamijo | H02J 5/005 320/108 |
| 8,030,887 | B2* | 10/2011 | Jung | H02J 50/10 320/108 |
| 8,116,681 | B2* | 2/2012 | Baarman | A61L 2/10 455/41.1 |
| 8,140,010 | B2* | 3/2012 | Symons | H04B 5/0075 455/41.1 |
| 8,159,364 | B2* | 4/2012 | Zeine | H02J 50/20 340/693.1 |
| 8,180,286 | B2 | 5/2012 | Yamasuge | |
| 8,212,518 | B2* | 7/2012 | Pijnenburg | H02J 7/022 320/108 |
| 8,307,922 | B2* | 11/2012 | Perlman | B60K 6/46 180/2.1 |
| 8,354,913 | B2* | 1/2013 | Solomon | G06F 21/31 340/5.2 |
| 8,369,905 | B2* | 2/2013 | Sogabe | H04B 5/0093 307/104 |
| 8,407,500 | B2* | 3/2013 | Lee | G06F 1/3203 713/320 |
| 8,410,953 | B2* | 4/2013 | Zeine | H02J 50/90 340/693.1 |
| 8,432,125 | B2* | 4/2013 | Takada | H02J 5/005 320/104 |
| 8,452,235 | B2* | 5/2013 | Kirby | H02J 7/025 455/41.1 |
| 8,469,122 | B2* | 6/2013 | Perlman | G07F 15/005 180/2.1 |
| 8,497,658 | B2 | 7/2013 | Von Novak | |
| 8,502,497 | B2* | 8/2013 | Pijnenburg | H02J 7/022 320/108 |
| 8,531,153 | B2 | 9/2013 | Baarman | |
| 8,547,057 | B2 | 10/2013 | Dunworth | |
| 8,558,661 | B2* | 10/2013 | Zeine | H02J 7/025 340/5.1 |
| 8,629,650 | B2* | 1/2014 | Mohammadian | G06K 7/0008 320/108 |
| 8,638,062 | B2* | 1/2014 | Baarman | H02J 5/005 320/108 |
| 8,686,685 | B2 | 4/2014 | Moshfeghi | |
| 8,716,977 | B2 | 5/2014 | Walley | |
| 8,796,999 | B2* | 8/2014 | Toncich | H02J 7/007 320/155 |
| 8,797,146 | B2* | 8/2014 | Cook | G06K 19/07749 340/10.34 |
| 8,803,474 | B2* | 8/2014 | Hillan | G06K 7/0008 320/108 |
| 8,823,319 | B2* | 9/2014 | Von Novak, III | H02J 7/025 320/108 |
| 8,841,881 | B2* | 9/2014 | Failing | B60L 3/00 320/109 |
| 8,854,176 | B2* | 10/2014 | Zeine | H02J 50/90 340/5.1 |
| 8,879,995 | B2* | 11/2014 | Viglione | H04B 7/0682 455/42 |
| 8,909,150 | B2* | 12/2014 | Bacioccola | H04M 1/72533 455/41.2 |
| 8,928,276 | B2* | 1/2015 | Kesler | H02J 17/00 320/108 |
| 8,928,284 | B2* | 1/2015 | Carobolante | H02J 7/025 320/125 |
| 8,929,805 | B2* | 1/2015 | Yu | G06K 19/077 340/10.4 |
| 8,933,594 | B2* | 1/2015 | Kurs | B60L 3/003 307/326 |
| 8,952,655 | B2* | 2/2015 | Walley | H01M 2/0267 320/108 |
| 8,963,487 | B2* | 2/2015 | Fukaya | H02J 5/005 320/108 |
| 9,000,619 | B2* | 4/2015 | Kato | H01Q 1/38 307/104 |
| 9,001,622 | B2* | 4/2015 | Perry | H04B 11/00 367/138 |
| 9,014,623 | B2* | 4/2015 | Symons | H04B 5/0075 455/41.1 |
| 9,018,898 | B2* | 4/2015 | Ziv | H02J 5/005 320/108 |
| 9,035,601 | B2* | 5/2015 | Kim | H02J 17/00 320/108 |
| 9,035,603 | B2* | 5/2015 | Endo | H02J 5/005 320/108 |
| 9,065,182 | B2* | 6/2015 | Kato | H01Q 1/38 |
| 9,088,305 | B2* | 7/2015 | Jurgovan | G06F 1/26 |
| 9,094,052 | B1* | 7/2015 | Hsu | H04B 5/0031 |
| 9,094,110 | B2* | 7/2015 | Perry | H04B 11/00 |
| 9,094,111 | B2* | 7/2015 | Perry | H04B 11/00 |
| 9,094,112 | B2* | 7/2015 | Perry | H04B 11/00 |
| 9,130,394 | B2* | 9/2015 | Burdo | G06F 1/266 |
| 9,142,973 | B2* | 9/2015 | Zeine | H02J 7/025 |
| 9,142,996 | B2* | 9/2015 | Kim | H02J 5/005 |
| 9,143,003 | B2* | 9/2015 | Baarman | H02J 5/005 |
| 9,178,387 | B2* | 11/2015 | Mohammadian | G06K 7/0008 |
| 9,214,151 | B2* | 12/2015 | Perry | H04B 11/00 |
| 9,240,824 | B2* | 1/2016 | Hillan | H04B 5/00 |
| 9,318,913 | B2* | 4/2016 | Pijnenburg | H02J 7/022 |
| 9,400,903 | B2* | 7/2016 | Wang | H04B 5/0031 |
| 9,407,106 | B2* | 8/2016 | Redding | H02J 5/005 |
| 9,407,327 | B2* | 8/2016 | Kirby | H04B 5/00 |
| 9,409,029 | B2* | 8/2016 | Perryman | A61N 1/37252 |
| 9,431,844 | B2* | 8/2016 | Redding | H02J 5/005 |
| 9,479,227 | B2* | 10/2016 | Chernokalov | H04B 5/0037 |
| 9,491,705 | B2* | 11/2016 | Skipper | H04W 52/0245 |
| 9,505,315 | B2* | 11/2016 | Garcia Briz | B60L 11/182 |
| 9,509,151 | B2* | 11/2016 | Lee | H02J 7/025 |
| 9,509,179 | B2* | 11/2016 | Chernokalov | H02J 17/00 |
| 9,520,739 | B2* | 12/2016 | Endo | H02J 5/005 |
| 9,522,270 | B2* | 12/2016 | Perryman | H02J 50/20 |
| 9,525,464 | B2* | 12/2016 | Kim | H02J 5/005 |
| 9,537,200 | B2* | 1/2017 | Kato | H01Q 1/38 |
| 9,537,354 | B2* | 1/2017 | Bell | H04W 12/08 |
| 9,537,359 | B2* | 1/2017 | Perry | H04B 11/00 |
| 9,538,382 | B2* | 1/2017 | Bell | H02J 50/20 |
| 9,548,632 | B2* | 1/2017 | Perry | H04B 11/00 |
| 9,553,471 | B2* | 1/2017 | Chinnadurai | B25H 3/00 |
| 9,577,446 | B2* | 2/2017 | Yamazaki | H02J 7/0004 |
| 9,583,803 | B2* | 2/2017 | Miller | H02J 7/025 |
| 9,590,446 | B2* | 3/2017 | Park | H02J 7/025 |
| 9,647,485 | B2* | 5/2017 | Kim | H02J 5/005 |
| 9,666,915 | B2* | 5/2017 | Miller | H02J 7/025 |
| 9,685,815 | B2* | 6/2017 | Lee | H02J 7/025 |
| 9,685,826 | B1* | 6/2017 | Bhatti | H02J 50/90 |
| 9,729,014 | B2* | 8/2017 | Perry | H04B 11/00 |
| 9,755,437 | B2* | 9/2017 | Kuusilinna | H02J 7/0004 |
| 9,768,637 | B2* | 9/2017 | Kwon | H02J 7/025 |
| 9,768,643 | B2* | 9/2017 | Kanno | H01F 38/14 |
| 9,769,786 | B2* | 9/2017 | Skaaksrud | H04W 12/06 |
| 9,774,209 | B2* | 9/2017 | Lin | H02J 7/025 |
| 9,787,142 | B2* | 10/2017 | Perry | H04B 11/00 |
| 9,793,764 | B2* | 10/2017 | Perry | H04B 11/00 |
| 9,812,902 | B2* | 11/2017 | Chernokalov | H02J 17/00 |
| 9,812,906 | B2* | 11/2017 | Perry | H04B 11/00 |
| 9,825,492 | B2* | 11/2017 | Perry | H04B 11/00 |
| 9,831,723 | B2* | 11/2017 | Perry | H04B 11/00 |
| 9,837,646 | B2* | 12/2017 | Miller | H02J 7/025 |
| 9,847,677 | B1* | 12/2017 | Leabman | H02J 7/025 |
| 9,859,594 | B2* | 1/2018 | Miller | H02J 7/025 |
| 9,866,279 | B2* | 1/2018 | Bell | H02J 7/0027 |
| 9,882,395 | B1* | 1/2018 | Leabman | H02J 17/00 |
| 9,882,430 | B1* | 1/2018 | Leabman | H02J 17/00 |
| 9,893,555 | B1* | 2/2018 | Leabman | H02J 7/025 |
| 9,906,065 | B2* | 2/2018 | Leabman | H02J 7/025 |
| 9,913,230 | B1* | 3/2018 | Tyagi | H04W 52/383 |
| 9,929,603 | B2* | 3/2018 | Perry | H04B 11/00 |
| 9,935,489 | B2* | 4/2018 | Kim | H02J 5/005 |
| 9,941,706 | B2* | 4/2018 | Laudebat | H02J 7/0031 |
| 9,941,745 | B2* | 4/2018 | Akuzawa | H02J 50/12 |
| 9,941,751 | B2* | 4/2018 | Juan | H02J 7/025 |
| 9,967,743 | B1* | 5/2018 | Bell | H02J 50/20 |

(56) References Cited

U.S. PATENT DOCUMENTS

| | | | | |
|---|---|---|---|---|
| 9,979,223 B2* | 5/2018 | Redding | | H02J 5/005 |
| 9,991,753 B2* | 6/2018 | Miller | | H02J 7/025 |
| 9,997,961 B2* | 6/2018 | Kanno | | H01F 38/14 |
| 9,997,963 B2* | 6/2018 | Zeine | | H02J 50/80 |
| 10,008,887 B2* | 6/2018 | Zeine | | H02J 50/27 |
| 10,014,711 B2* | 7/2018 | Iwabuchi | | B60R 16/03 |
| 10,019,611 B2* | 7/2018 | Wang | | H04B 5/0031 |
| 10,050,477 B2* | 8/2018 | Nago | | H02J 50/12 |
| 10,050,676 B2* | 8/2018 | Yazaki | | H02J 17/00 |
| 10,056,790 B2* | 8/2018 | Miller | | H02J 7/025 |
| 10,063,064 B1* | 8/2018 | Bell | | H02J 5/005 |
| 10,063,105 B2* | 8/2018 | Leabman | | H02J 50/60 |
| 10,063,112 B2* | 8/2018 | Tachiwa | | H02J 50/90 |
| 10,074,837 B2* | 9/2018 | Miller | | H02J 7/025 |
| 10,097,048 B2* | 10/2018 | Perry | | H04B 11/00 |
| 10,097,049 B2* | 10/2018 | Perry | | H04B 11/00 |
| 10,097,050 B2* | 10/2018 | Perry | | H04B 11/00 |
| 10,128,686 B1* | 11/2018 | Leabman | | H02J 50/20 |
| 10,128,692 B2* | 11/2018 | Perry | | H04B 11/00 |
| 10,153,645 B1* | 12/2018 | Bell | | H02J 5/005 |
| 10,169,619 B2* | 1/2019 | Goldberg | | G06F 21/81 |
| 10,193,396 B1* | 1/2019 | Bell | | H02J 50/80 |
| 10,223,717 B1* | 3/2019 | Bell | | G06Q 30/04 |
| 10,243,414 B1* | 3/2019 | Leabman | | H02J 50/00 |
| 10,258,800 B2* | 4/2019 | Perryman | | H01Q 9/26 |
| 10,263,453 B2* | 4/2019 | Kwon | | H02J 7/025 |
| 10,318,722 B2* | 6/2019 | Goldberg | | G06F 21/32 |
| 10,396,602 B2* | 8/2019 | Zeine | | H02J 50/23 |
| 10,498,144 B2* | 12/2019 | Leabman | | H02J 5/005 |
| 2003/0061066 A1* | 3/2003 | Ochiai | | G06Q 20/105 455/41.2 |
| 2004/0095291 A1* | 5/2004 | Shigemasa | | G06K 19/0701 343/913 |
| 2004/0203365 A1* | 10/2004 | Yamamoto | | H04B 5/02 455/41.2 |
| 2006/0266564 A1* | 11/2006 | Perlman | | G07F 15/005 180/2.1 |
| 2008/0150485 A1* | 6/2008 | Kedem | | H01M 2/1022 320/127 |
| 2008/0201587 A1* | 8/2008 | Lee | | G06F 1/3203 713/320 |
| 2008/0238632 A1* | 10/2008 | Endo | | H04B 5/02 340/10.51 |
| 2008/0307243 A1* | 12/2008 | Lee | | G06F 1/3203 713/320 |
| 2009/0001932 A1* | 1/2009 | Kamijo | | H02J 5/005 320/108 |
| 2009/0075591 A1* | 3/2009 | Murdoch | | G06K 7/0008 455/41.1 |
| 2009/0218957 A1* | 9/2009 | Kraft | | G06F 1/3203 315/291 |
| 2009/0264069 A1* | 10/2009 | Yamasuge | | H04B 5/0037 455/41.1 |
| 2009/0284218 A1* | 11/2009 | Mohammadian | | G06K 7/0008 320/107 |
| 2009/0284227 A1* | 11/2009 | Mohammadian | | G06K 7/0008 320/137 |
| 2009/0284245 A1* | 11/2009 | Kirby | | G06K 7/0008 323/318 |
| 2009/0286476 A1* | 11/2009 | Toncich | | G06K 7/0008 455/41.1 |
| 2010/0007307 A1* | 1/2010 | Baarman | | H02J 5/005 320/108 |
| 2010/0015917 A1* | 1/2010 | Symons | | H04B 5/0075 455/41.1 |
| 2010/0036773 A1* | 2/2010 | Bennett | | G06Q 20/3674 705/67 |
| 2010/0044123 A1* | 2/2010 | Perlman | | G07F 15/005 180/2.1 |
| 2010/0136904 A1* | 6/2010 | Watanabe | | H04B 17/23 455/41.1 |
| 2010/0181961 A1* | 7/2010 | Novak | | H02J 7/025 320/108 |
| 2010/0194206 A1* | 8/2010 | Burdo | | G06F 1/266 307/104 |
| 2010/0194335 A1* | 8/2010 | Kirby | | H02J 5/005 320/108 |
| 2010/0201312 A1* | 8/2010 | Kirby | | H02J 7/025 320/108 |
| 2010/0201314 A1* | 8/2010 | Toncich | | H02J 7/007 320/108 |
| 2010/0207575 A1* | 8/2010 | Pijnenburg | | H02J 7/022 320/108 |
| 2010/0225270 A1* | 9/2010 | Jacobs | | H02J 5/005 320/108 |
| 2010/0225272 A1* | 9/2010 | Kirby | | H04B 5/00 320/108 |
| 2010/0248622 A1* | 9/2010 | Lyell Kirby | | H02J 7/025 455/41.1 |
| 2010/0253281 A1* | 10/2010 | Li | | H02J 7/0027 320/108 |
| 2010/0279606 A1* | 11/2010 | Hillan | | H04B 5/00 455/41.1 |
| 2010/0315045 A1* | 12/2010 | Zeine | | H02J 50/90 320/137 |
| 2011/0018679 A1* | 1/2011 | Davis | | H02J 7/025 340/3.1 |
| 2011/0031928 A1* | 2/2011 | Soar | | F41G 1/34 320/108 |
| 2011/0057607 A1* | 3/2011 | Carobolante | | H02J 7/025 320/108 |
| 2011/0083025 A1* | 4/2011 | Lee | | G06F 1/3203 713/320 |
| 2011/0115431 A1* | 5/2011 | Dunworth | | G06Q 30/0267 320/108 |
| 2011/0115432 A1* | 5/2011 | El-Maleh | | G06Q 30/0267 320/108 |
| 2011/0127952 A1* | 6/2011 | Walley | | G06K 7/10207 320/108 |
| 2011/0127953 A1* | 6/2011 | Walley | | G06K 7/10207 320/108 |
| 2011/0151789 A1* | 6/2011 | Viglione | | H04B 7/0682 455/42 |
| 2011/0156640 A1* | 6/2011 | Moshfeghi | | H02J 50/20 320/108 |
| 2011/0260682 A1* | 10/2011 | Low | | H02J 7/0027 320/108 |
| 2011/0260839 A1* | 10/2011 | Cook | | G06K 19/0708 340/10.4 |
| 2011/0273138 A1* | 11/2011 | Baarman | | H02J 5/005 320/108 |
| 2011/0279226 A1* | 11/2011 | Chen | | B60L 53/65 340/5.8 |
| 2012/0091821 A1* | 4/2012 | Kato | | H01Q 1/38 307/104 |
| 2012/0112691 A1* | 5/2012 | Kurs | | B60L 11/182 320/108 |
| 2012/0119698 A1* | 5/2012 | Karalis | | B60L 11/182 320/108 |
| 2012/0122396 A1* | 5/2012 | Ha | | H04W 52/288 455/41.1 |
| 2012/0164943 A1* | 6/2012 | Bennett | | G06Q 20/3674 455/41.1 |
| 2012/0181973 A1* | 7/2012 | Lyden | | H02J 3/383 320/101 |
| 2012/0193999 A1* | 8/2012 | Zeine | | H02J 50/40 307/104 |
| 2012/0231734 A1* | 9/2012 | Symons | | H04B 5/0075 455/41.1 |
| 2012/0235638 A1* | 9/2012 | Pijnenburg | | H02J 7/022 320/108 |
| 2012/0242283 A1* | 9/2012 | Kim | | H02J 5/005 320/108 |
| 2012/0242284 A1* | 9/2012 | Wheatley, III | | H02J 17/00 320/108 |
| 2012/0280650 A1* | 11/2012 | Kim | | H02J 17/00 320/108 |
| 2012/0289155 A1* | 11/2012 | Dua | | H04M 1/7253 455/41.1 |

(56) References Cited

U.S. PATENT DOCUMENTS

| | | | |
|---|---|---|---|
| 2012/0299540 A1* | 11/2012 | Perry | H04B 11/00 320/108 |
| 2012/0299541 A1* | 11/2012 | Perry | H04B 11/00 320/108 |
| 2012/0299542 A1* | 11/2012 | Perry | H04B 11/00 320/108 |
| 2012/0300588 A1* | 11/2012 | Perry | H04B 11/00 367/135 |
| 2012/0300592 A1* | 11/2012 | Perry | H04B 11/00 367/180 |
| 2012/0300593 A1* | 11/2012 | Perry | H04B 11/00 367/181 |
| 2012/0326662 A1* | 12/2012 | Matsumoto | H02J 7/025 320/108 |
| 2013/0023211 A1* | 1/2013 | Watanabe | H04B 17/23 455/41.1 |
| 2013/0062963 A1* | 3/2013 | Chernokalov | H02J 17/00 307/104 |
| 2013/0062964 A1* | 3/2013 | Chernokalov | H02J 17/00 307/104 |
| 2013/0062965 A1* | 3/2013 | Chernokalov | H04B 5/0037 307/104 |
| 2013/0063082 A1* | 3/2013 | Lee | H02J 7/025 320/108 |
| 2013/0099734 A1* | 4/2013 | Lee | H02J 7/007 320/108 |
| 2013/0119924 A1* | 5/2013 | Kasturi | H04B 5/0087 320/108 |
| 2013/0154557 A1* | 6/2013 | Lee | H04B 5/0037 320/108 |
| 2013/0154560 A1* | 6/2013 | Walley | H01M 2/0267 320/108 |
| 2013/0207599 A1* | 8/2013 | Ziv | H02J 5/005 320/108 |
| 2013/0207604 A1* | 8/2013 | Zeine | H02J 50/80 320/108 |
| 2013/0234658 A1* | 9/2013 | Endo | H02J 5/005 320/108 |
| 2013/0244578 A1* | 9/2013 | Bacioccola | H04M 1/72533 455/41.2 |
| 2013/0257364 A1* | 10/2013 | Redding | H02J 5/005 320/108 |
| 2013/0257365 A1* | 10/2013 | Redding | H02J 5/005 320/108 |
| 2013/0264880 A1* | 10/2013 | Kim | H02J 5/005 307/66 |
| 2013/0278209 A1* | 10/2013 | Von Novak, III | H02J 7/025 320/108 |
| 2013/0288600 A1* | 10/2013 | Kuusilinna | H02J 7/0004 455/41.2 |
| 2013/0293190 A1* | 11/2013 | Pijnenburg | H02J 7/022 320/108 |
| 2013/0300354 A1* | 11/2013 | Ichikawa | H01F 38/14 320/108 |
| 2013/0300358 A1* | 11/2013 | Kirby | G06K 7/0008 320/108 |
| 2014/0015478 A1* | 1/2014 | Von Novak | H02J 7/0004 320/108 |
| 2014/0035524 A1* | 2/2014 | Zeine | H02J 50/27 320/108 |
| 2014/0062395 A1* | 3/2014 | Kwon | H02J 50/60 320/108 |
| 2014/0103869 A1* | 4/2014 | Radovic | H04B 5/0037 320/108 |
| 2014/0103870 A1* | 4/2014 | Baarman | H02J 5/005 320/108 |
| 2014/0111147 A1* | 4/2014 | Soar | H01F 27/365 320/108 |
| 2014/0111153 A1* | 4/2014 | Kwon | H02J 7/025 320/108 |
| 2014/0139322 A1* | 5/2014 | Wang | H04B 5/0031 340/10.5 |
| 2014/0159501 A1* | 6/2014 | Kanno | H01F 38/14 307/104 |
| 2014/0159651 A1* | 6/2014 | Von Novak | H04B 5/0037 320/108 |
| 2014/0197783 A1* | 7/2014 | Kim | H02J 7/025 320/108 |
| 2014/0217967 A1* | 8/2014 | Zeine | H02J 7/025 320/166 |
| 2014/0225560 A1* | 8/2014 | Walley | H01M 2/0267 320/108 |
| 2014/0266024 A1* | 9/2014 | Chinnadurai | B25H 3/00 320/108 |
| 2014/0306646 A1* | 10/2014 | Liu | H02J 5/005 320/103 |
| 2014/0327390 A1* | 11/2014 | Park | H02J 7/025 320/108 |
| 2014/0339915 A1* | 11/2014 | Kanno | H01F 38/14 307/104 |
| 2014/0340036 A1* | 11/2014 | Toncich | H02J 7/007 320/108 |
| 2014/0340273 A1* | 11/2014 | Kato | H01Q 1/38 343/788 |
| 2014/0347008 A1* | 11/2014 | Chae | H02J 7/025 320/108 |
| 2014/0361741 A1* | 12/2014 | Von Novak, III | H02J 7/025 320/108 |
| 2015/0006395 A1* | 1/2015 | Chu | G06Q 20/40 705/44 |
| 2015/0011160 A1* | 1/2015 | Jurgovan | G06F 1/26 455/41.1 |
| 2015/0038197 A1* | 2/2015 | Skipper | H04W 52/0245 455/573 |
| 2015/0097520 A1* | 4/2015 | Lin | H02J 13/0075 320/108 |
| 2015/0155739 A1* | 6/2015 | Walley | H01M 2/0267 320/108 |
| 2015/0171509 A1* | 6/2015 | Kato | H01Q 1/38 343/702 |
| 2015/0171513 A1* | 6/2015 | Chen | H01Q 3/00 342/368 |
| 2015/0171974 A1* | 6/2015 | Perry | H04B 11/00 307/104 |
| 2015/0198640 A1* | 7/2015 | Lee | H02J 7/025 320/108 |
| 2015/0213791 A1* | 7/2015 | Perry | H04B 11/00 367/138 |
| 2015/0213792 A1* | 7/2015 | Perry | H04B 11/00 367/138 |
| 2015/0214764 A1* | 7/2015 | Perry | H04B 11/00 320/107 |
| 2015/0214765 A1* | 7/2015 | Perry | H04B 11/00 367/138 |
| 2015/0214773 A1* | 7/2015 | Juan | H02J 7/025 320/108 |
| 2015/0229158 A1* | 8/2015 | Endo | H02J 5/005 320/108 |
| 2015/0244200 A1* | 8/2015 | Juan | H02J 7/0052 320/108 |
| 2015/0244201 A1* | 8/2015 | Chu | H02J 7/025 320/108 |
| 2015/0249484 A1* | 9/2015 | Mach | H04B 5/0037 307/104 |
| 2015/0280837 A1* | 10/2015 | Perry | H04B 11/00 307/104 |
| 2015/0312683 A1* | 10/2015 | Perry | H04B 11/00 367/135 |
| 2015/0321017 A1* | 11/2015 | Perryman | A61N 1/36125 607/61 |
| 2015/0326323 A1* | 11/2015 | Perry | H04B 11/00 367/135 |
| 2015/0362333 A1* | 12/2015 | Miller | H02J 7/025 340/870.02 |
| 2015/0364799 A1* | 12/2015 | Miller | H02J 7/025 320/108 |
| 2015/0364945 A1* | 12/2015 | Miller | H02J 7/025 320/108 |

(56) References Cited

U.S. PATENT DOCUMENTS

| | | | |
|---|---|---|---|
| 2015/0365135 A1* | 12/2015 | Miller | H02J 7/025 307/104 |
| 2015/0365136 A1* | 12/2015 | Miller | H02J 7/025 307/104 |
| 2015/0365137 A1* | 12/2015 | Miller | H02J 7/025 307/104 |
| 2015/0365138 A1* | 12/2015 | Miller | H02J 7/025 307/104 |
| 2015/0365737 A1* | 12/2015 | Miller | H02J 7/025 340/870.02 |
| 2015/0380981 A1* | 12/2015 | Kim | H02J 5/005 320/108 |
| 2016/0020649 A1* | 1/2016 | Bell | H04W 12/08 307/104 |
| 2016/0031332 A1* | 2/2016 | Garcia Briz | B60L 11/182 320/108 |
| 2016/0065269 A1* | 3/2016 | Yazaki | H02J 17/00 307/104 |
| 2016/0087447 A1* | 3/2016 | Laudebat | H02J 50/10 307/104 |
| 2016/0099612 A1* | 4/2016 | Leabman | H02J 7/025 307/104 |
| 2016/0099758 A1* | 4/2016 | Bell | H02J 7/0027 307/104 |
| 2016/0100312 A1* | 4/2016 | Bell | H02J 50/20 455/411 |
| 2016/0118805 A1* | 4/2016 | Swope | H02J 50/12 307/104 |
| 2016/0118834 A1* | 4/2016 | Swope | H02J 50/12 320/108 |
| 2016/0126749 A1* | 5/2016 | Shichino | H02J 5/005 307/104 |
| 2016/0218561 A1* | 7/2016 | Perry | H04B 11/00 |
| 2016/0218562 A1* | 7/2016 | Perry | H04B 11/00 |
| 2016/0218563 A1* | 7/2016 | Perry | H04B 11/00 |
| 2016/0218564 A1* | 7/2016 | Perry | H04B 11/00 |
| 2016/0218565 A1* | 7/2016 | Perry | H04B 11/00 |
| 2016/0233716 A1* | 8/2016 | Lee | H02J 7/025 |
| 2016/0276841 A1* | 9/2016 | Tachiwa | H02J 50/90 |
| 2016/0300088 A1* | 10/2016 | Wang | H04B 5/0031 |
| 2016/0301238 A1* | 10/2016 | Khoshvenis | H02J 7/0047 |
| 2016/0336782 A1* | 11/2016 | Vilhauer | H02J 7/025 |
| 2016/0339258 A1* | 11/2016 | Perryman | A61N 1/37252 |
| 2016/0359376 A1* | 12/2016 | Zeine | H02J 50/80 |
| 2016/0365747 A1* | 12/2016 | Redding | H02J 5/005 |
| 2016/0372977 A1* | 12/2016 | Nago | H02J 50/12 |
| 2016/0380471 A1* | 12/2016 | Moshfeghi | H02J 50/20 320/108 |
| 2016/0380472 A1* | 12/2016 | Moshfeghi | H02J 50/20 320/108 |
| 2017/0005516 A9* | 1/2017 | Leabman | H02J 50/40 |
| 2017/0054331 A1* | 2/2017 | Lee | H02J 7/025 |
| 2017/0115713 A1* | 4/2017 | Shin | G06F 1/266 |
| 2017/0125758 A1* | 5/2017 | Miller | H02J 7/025 |
| 2017/0163093 A1* | 6/2017 | Akuzawa | H02J 50/12 |
| 2017/0207668 A1* | 7/2017 | Kanno | H01F 38/14 |
| 2017/0237281 A1* | 8/2017 | Kim | H02J 5/005 320/108 |
| 2017/0373523 A1* | 12/2017 | Kwon | H02J 7/025 |
| 2018/0013307 A1* | 1/2018 | Pudipeddi | H02J 7/025 |
| 2018/0034326 A1* | 2/2018 | Abdolkhani | H02J 50/10 |
| 2018/0083349 A1* | 3/2018 | Sieber | H01Q 1/3291 |
| 2018/0130984 A1* | 5/2018 | Miller | H02J 7/025 |
| 2018/0159338 A1* | 6/2018 | Leabman | H02J 50/90 |
| 2018/0191201 A1* | 7/2018 | Perry | H04B 11/00 |
| 2018/0198316 A1* | 7/2018 | Kim | H02J 5/005 |
| 2018/0212470 A1* | 7/2018 | Leem | H02J 50/12 |
| 2018/0219430 A1* | 8/2018 | Russell | H02J 50/60 |
| 2018/0219431 A1* | 8/2018 | Guillermo | H02J 50/60 |
| 2018/0241255 A1* | 8/2018 | Leabman | H02J 50/40 |
| 2018/0248413 A1* | 8/2018 | Miller | H02J 7/025 |
| 2018/0309329 A1* | 10/2018 | Zeine | H02J 50/80 |
| 2019/0217106 A1* | 7/2019 | Perryman | H01Q 9/26 |

OTHER PUBLICATIONS

"Feasibility of Wireless Power Transmission," Rajen Biswa, Electronics and Communication Engineering College of Science and Technology, Richending :: Phuentsholing, Published May 2012, ww.academia.edu/1561057/Feasibility_of_Wireless_Power_Transmission.*

* cited by examiner

DB 122

| ALLOWED DEVICES | COMMUNICATION (122a) | STATUS (122b) |
| --- | --- | --- |
| ID1 | YES | STANDBY |
| ID2 | YES | CHARGING |
| ID3 | YES | N/A |
| ID4 | NO | N/A |
| ID5 | YES | STANDBY |

DB 222

| CONNECTABLE POWER SOURCES |
| --- |
| ID A |
| ID B |
| ID C |
| ID D |
| ID E |

FIG. 9

SMART WIRELESS POWER TRANSFER BETWEEN DEVICES

CROSS REFERENCE TO RELATED APPLICATIONS

This application claims the benefit of U.S. provisional patent application 62/435,883 filed on Dec. 19, 2016, entitled "Smart Wireless Power Transfer Between Devices", the content of which is incorporated herein by reference in its entirety.

TECHNICAL FIELD

The present disclosure relates to improved methods and systems for wireless power charging. More particularly, the present disclosure is directed to smart powering and charging between a wireless powering device and a wireless powered device.

BACKGROUND

Wireless power charging or wireless power transfer has been developed for wirelessly charging battery-powered portable devices without the need of use of a physical charging cable. A known typical wireless power transfer system employs some kind of coupling techniques such as inductive coupling and capacitive coupling to provide an electric or magnetic filed between a powering device and a powered device, resulting in generation of power at the powered device. In another known wireless power transfer system, a powering device uses transmission of electromagnetic waves to a powered device which then generates power from received electromagnetic waves. Researchers today have been working hard to develop wireless power transfer technologies that are capable of charging more distant devices with more efficiency.

An object of the present invention is to provide solutions for wirelessly powering and charging powered devices in a smart manner.

SUMMARY

According to an aspect of the present invention, a wireless power transfer system includes at least one powering device and at least one powered device. Each powering device includes powering circuitry for wireless power transfer to the powered device. Each powered device includes powered circuitry for reception of the wireless power transfer from the powering device.

In an aspect of the present invention, the powering device may include communication circuitry for a close-range wireless communication with the powered device, while the powered device may also include communication circuitry for the close-range wireless communication with the powering device, so as for the powering device and the powered device to discover each other through the communication.

In an aspect of the present invention, the powering device may include a database managing information indicative of at least one powered device authorized to receive wireless power from the powering device; indicative of the presence or absence of communication with the powered device using the communication circuitry; and/or indicative of the status of reception of wireless power transfer by the powered device.

In an aspect of the present invention, the powered device may include a database managing information indicative of at least one powering device from which the powered device is authorized to receive wireless power transfer.

In an aspect of the present invention, the powering device may be configured to: provide wireless power transfer with no regard to an explicit request from the powered device; provide wireless power transfer when an explicit request is issued by the powered device; or provide wireless power transfer upon discovering the powered device through communication using the communication circuitry.

In an aspect of the present invention, the powered device may be configured to: receive wireless power transfer with no regard to the battery level of a battery of the powered device; receive wireless power transfer when the battery level of a battery of the powered device is determined below a threshold; or receive wireless power transfer upon discovering the powering device through communication using the communication circuitry.

In an aspect of the present invention, the powering device may be configured to provide wireless power transfer on the condition that the powering device determines the powered device to be authorized to receive wireless power from the powering device.

In an aspect of the present invention, the powered device may be configured to receive wireless power transfer on the condition that the powered device determines itself to be authorized to receive wireless power transfer from the powering device.

In an aspect of the present invention, the powered device may provide indication of the status of its reception of wireless power transfer using an output of the powered device; and also may notify the powering device of the status so that the powering device may manage the notified status on the database.

In an aspect of the present invention, the powering device may be battery-powered and be configured to conditionally provide wireless power transfer: depending on whether or not the powering device is being battery-powered in operation; and/or depending on the status in connection with the battery level of a battery of the powering device.

In an aspect of the present invention, the powered device may include powering circuitry for wireless power transfer to another powered device for a daisy-chain wireless power transfer between two or more powered devices.

DRAWINGS

FIG. 9 illustrates an exemplary configuration of a database resident on the powering device 100 (DB 122) and a database resident on the powered device 200 (DB 222), according to some embodiments of the present invention.

Figure 12:
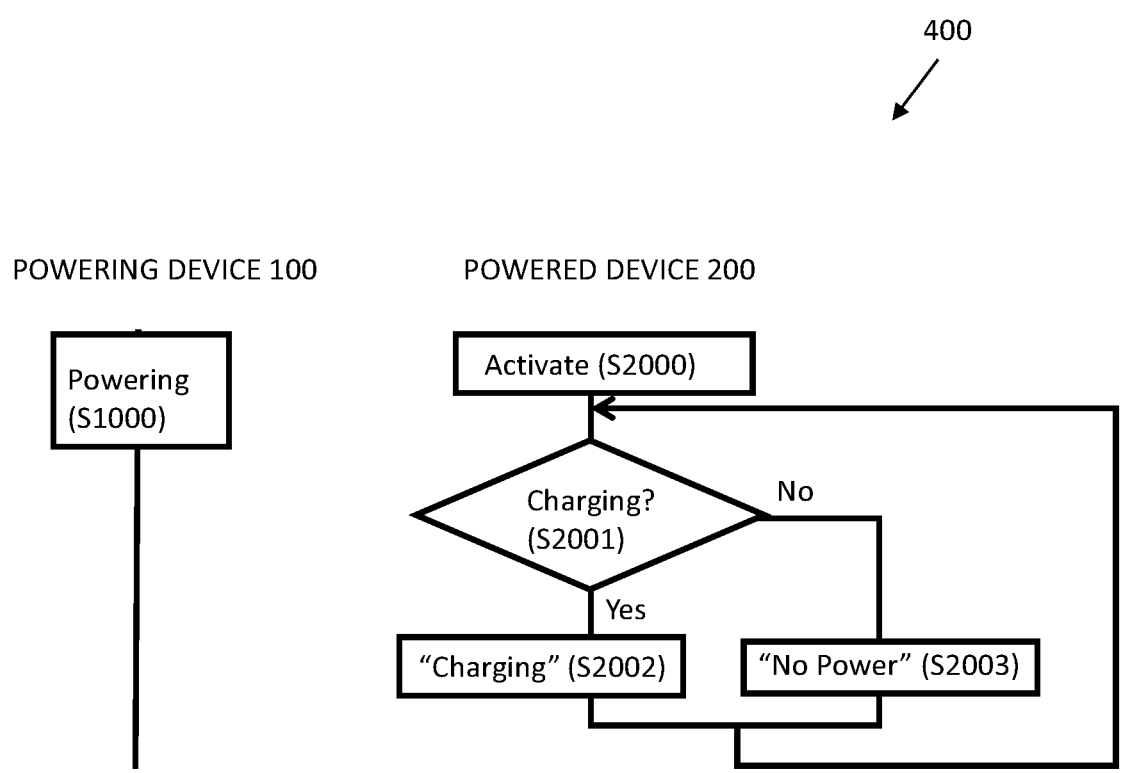

FIG. 12 is a flowchart illustrating a process 400 for wireless power transfer from the powering device 100 to the powered device 200, according to some embodiments of the present invention.

Figure 13:
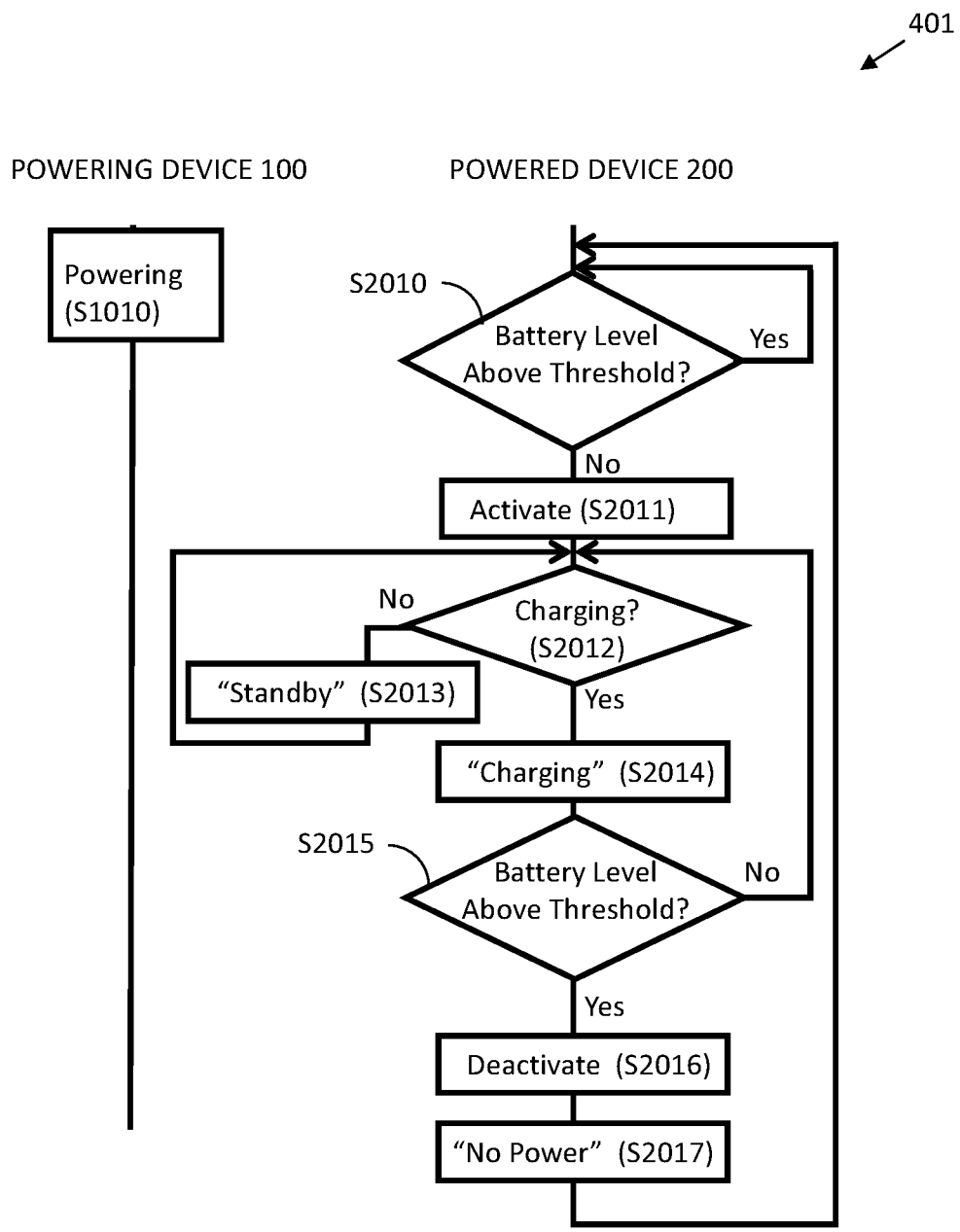

FIG. 13 is a flowchart illustrating a process 401 for wireless power transfer from the powering device 100 to the powered device 200, according to some embodiments of the present invention.

Figure 14:
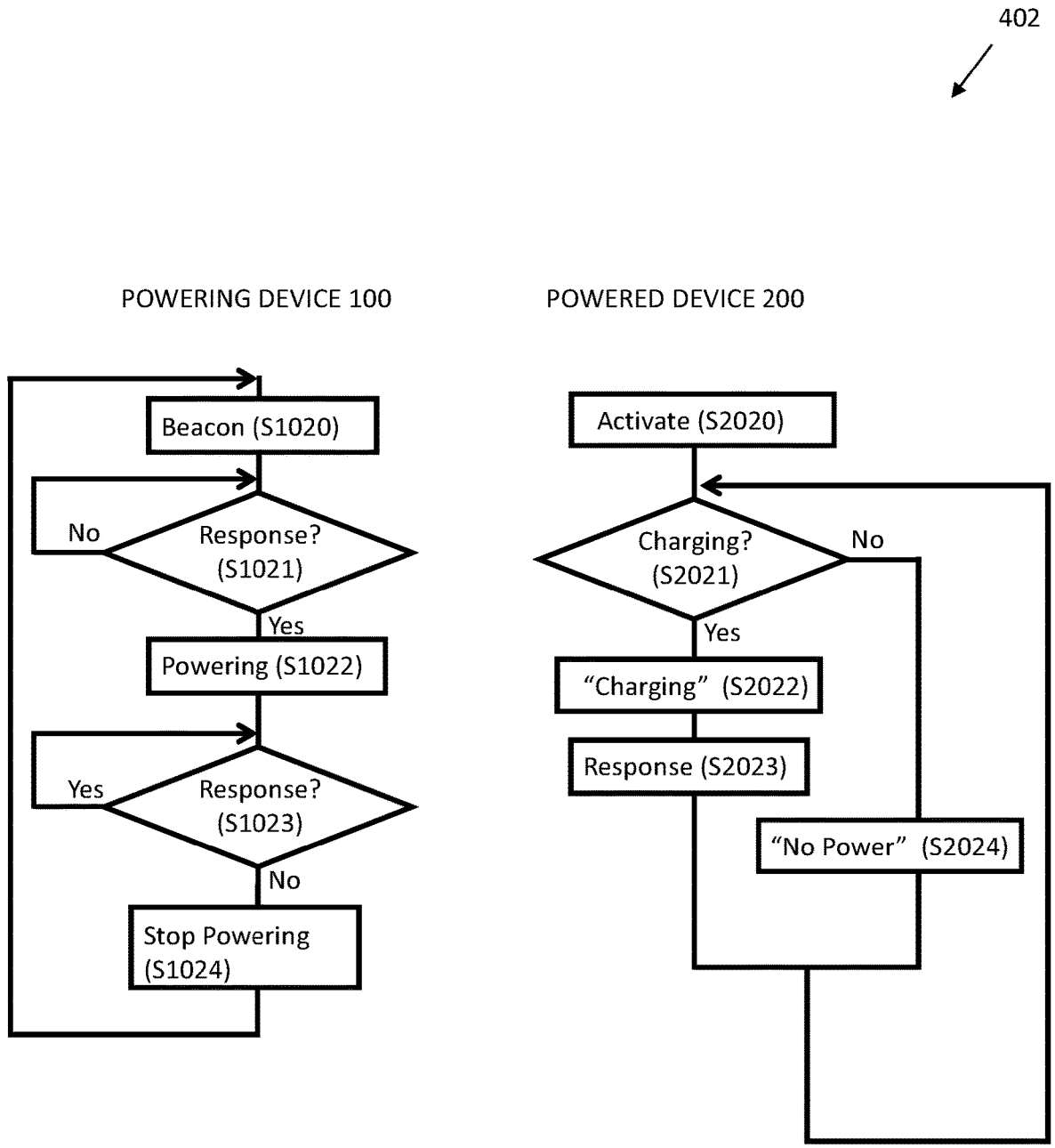

FIG. 14 is a flowchart illustrating a process 402 for wireless power transfer from the powering device 100 to the powered device 200, according to some embodiments of the present invention.

Figure 15:
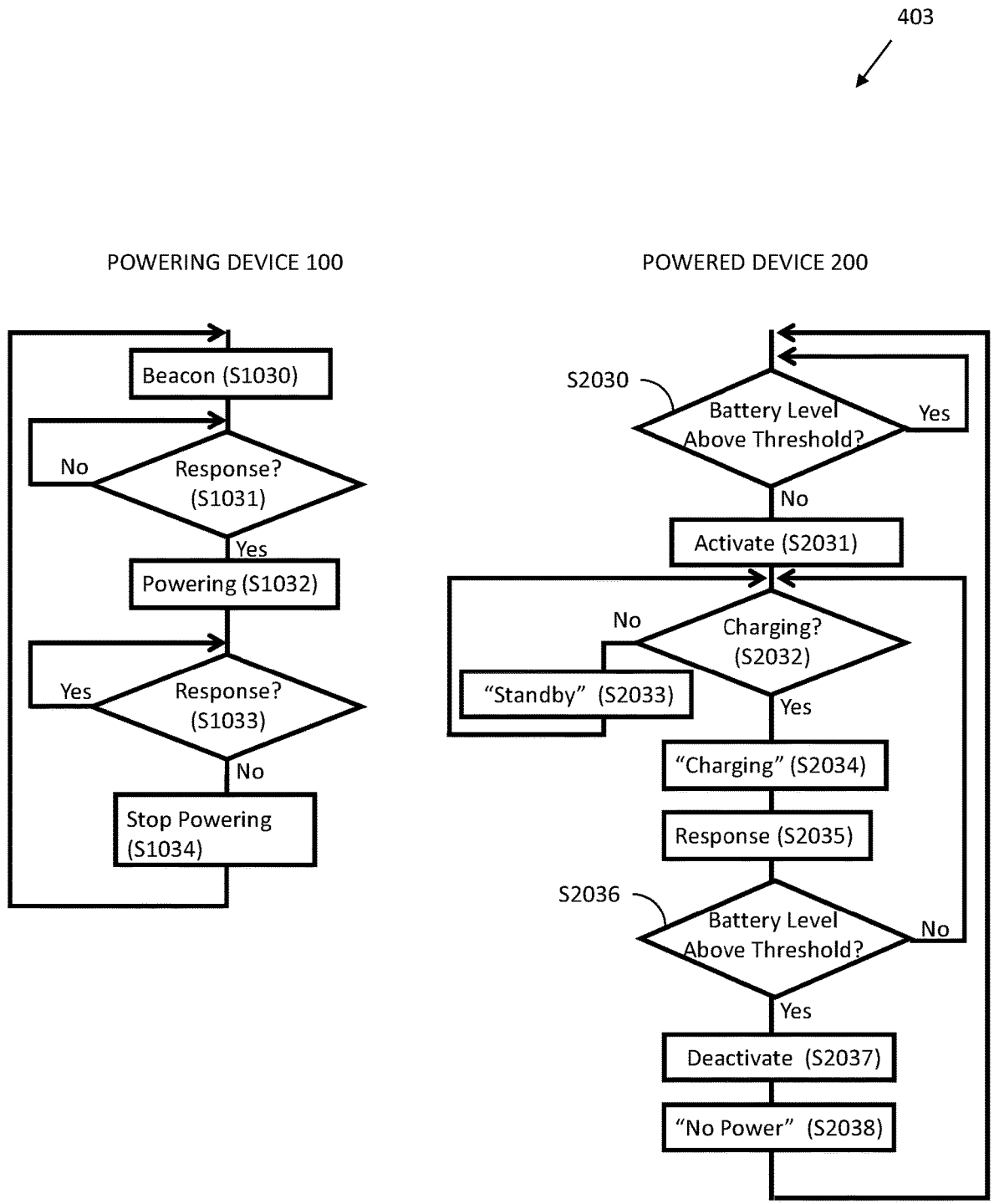

FIG. 15 is a flowchart illustrating a process 403 for wireless power transfer from the powering device 100 to the powered device 200, according to some embodiments of the present invention.

Figure 16:
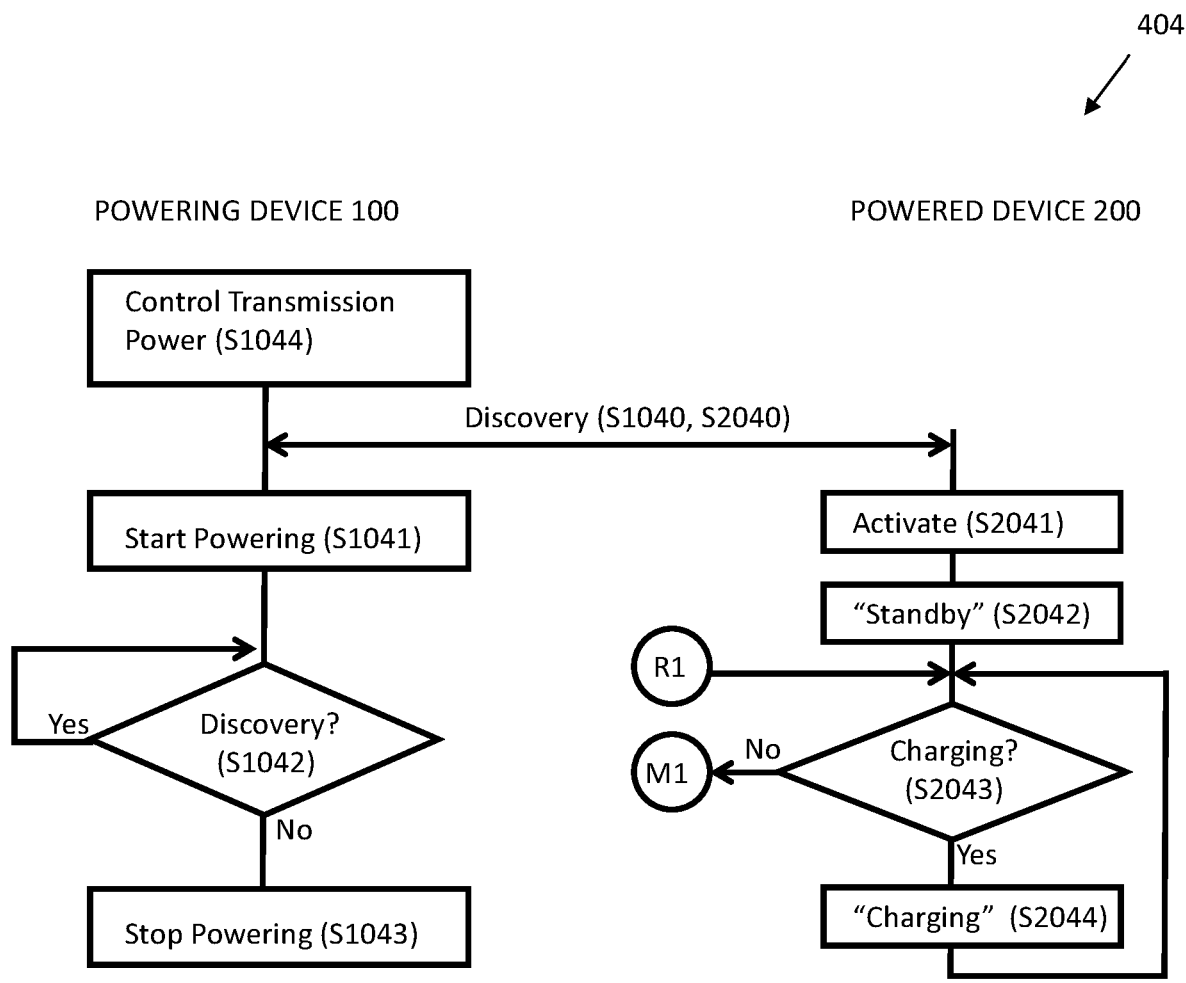

FIG. 16 is a flowchart illustrating a process 404 for wireless power transfer from the powering device 100 to the powered device 200, according to some embodiments of the present invention.

Figure 17:
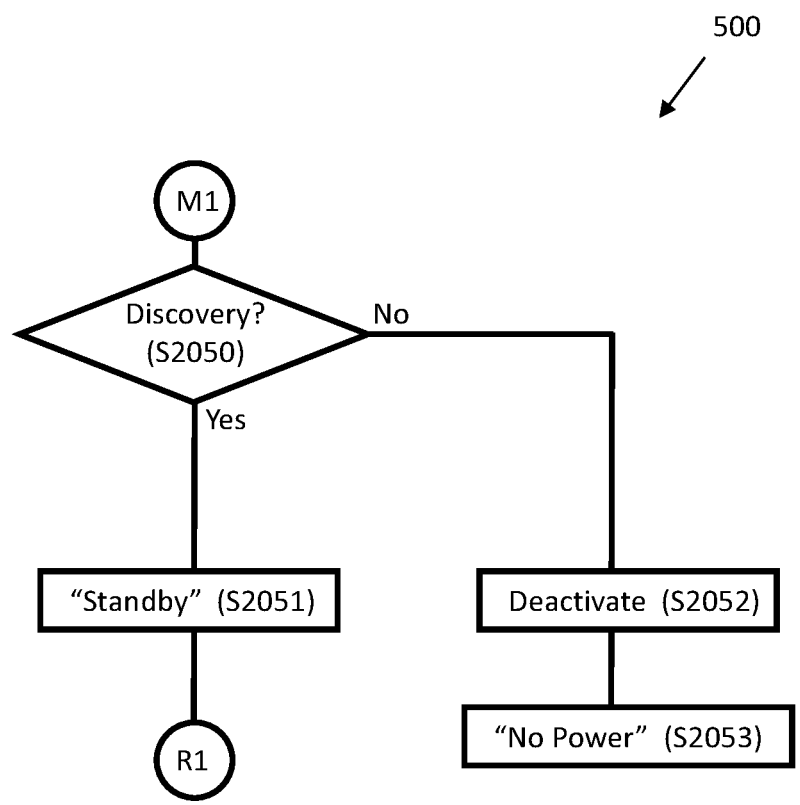

FIG. 17 is a flowchart illustrating a process 500 for wireless power transfer from the powering device 100 to the powered device 200, according to some embodiments of the present invention.

Figure 18:
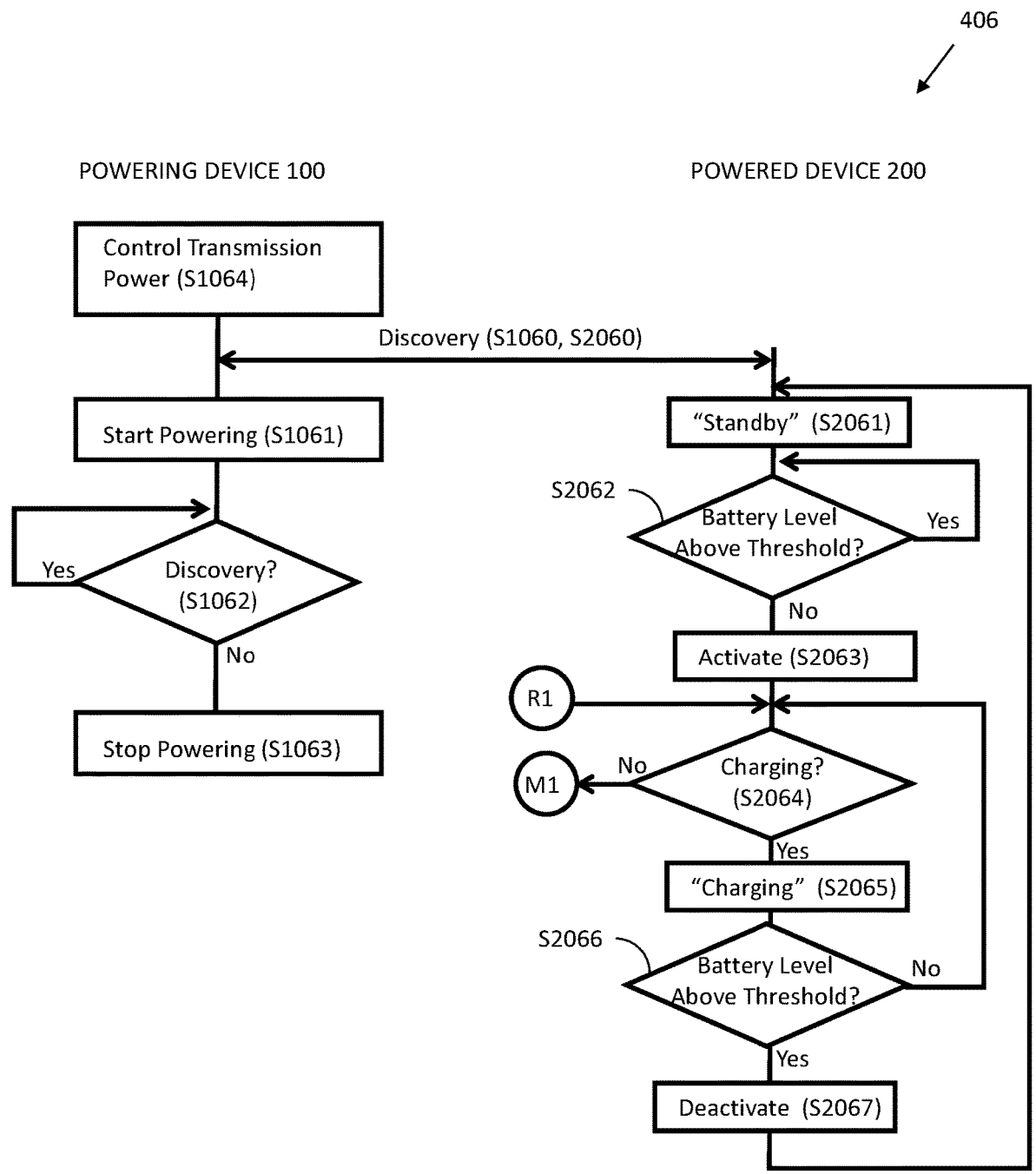

FIG. 18 is a flowchart illustrating a process 406 for wireless power transfer from the powering device 100 to the powered device 200, according to some embodiments of the present invention.

Figure 19:
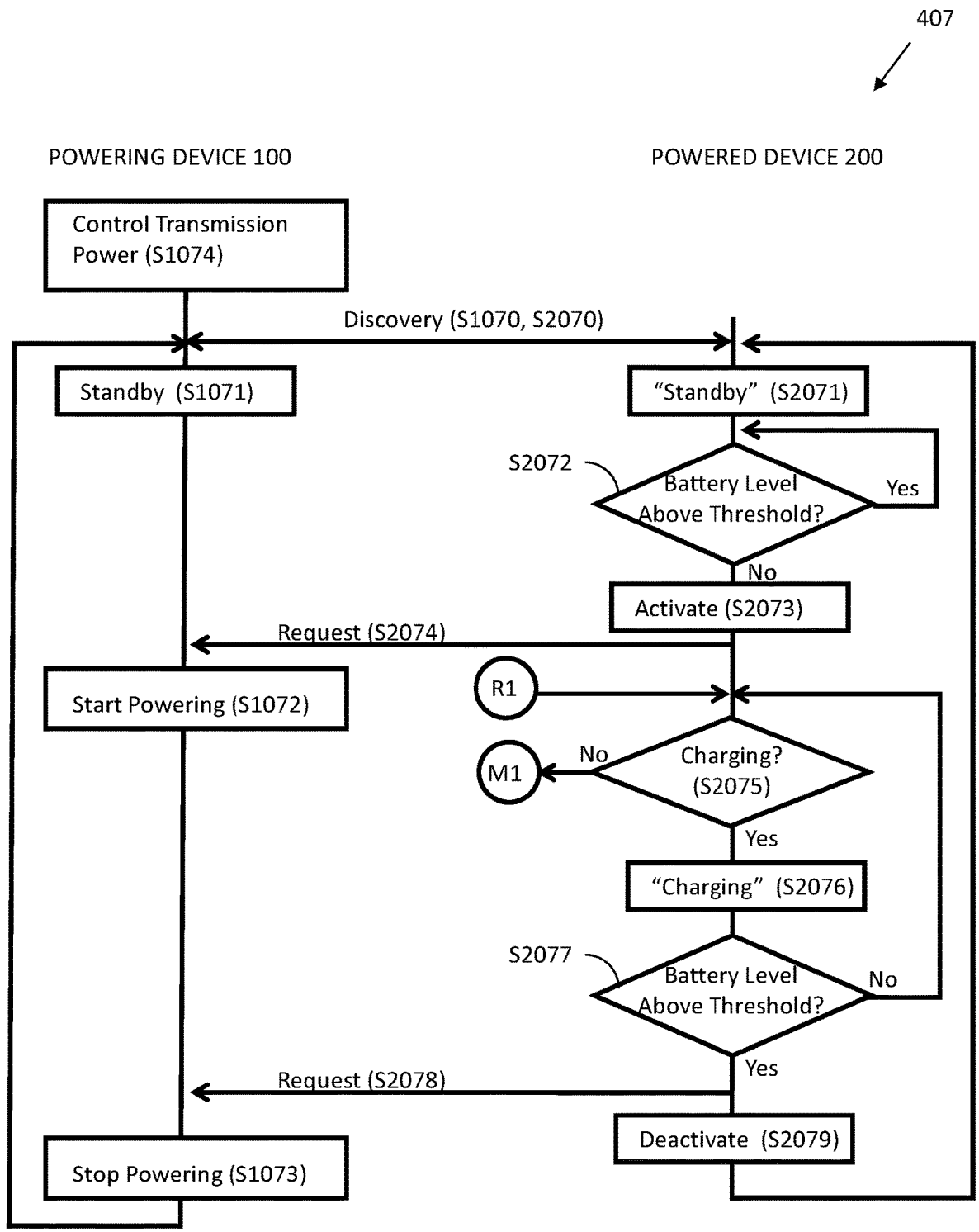

FIG. 19 is a flowchart illustrating a process 407 for wireless power transfer from the powering device 100 to the powered device 200, according to some embodiments of the present invention.

Figure 20:
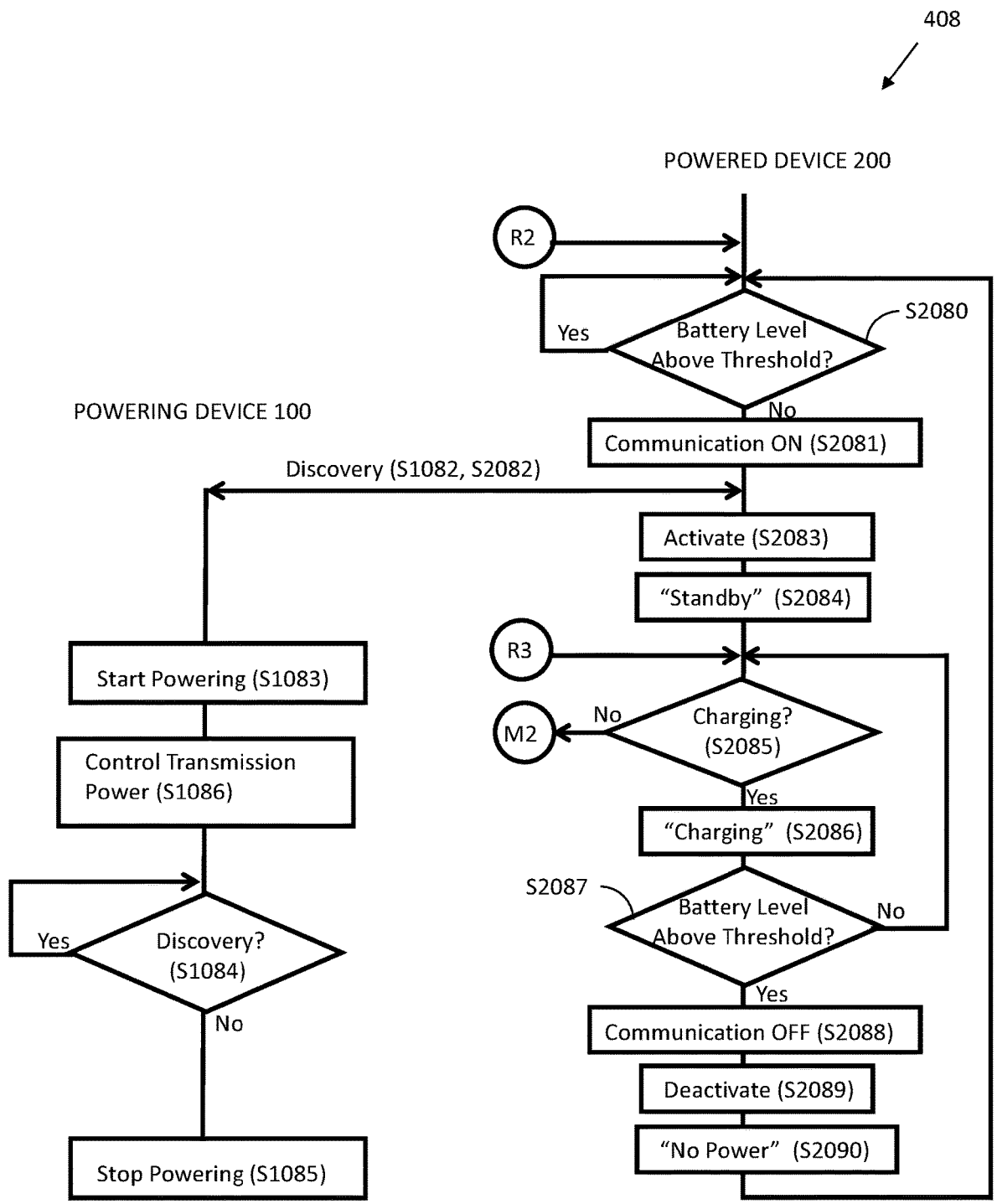

FIG. 20 is a flowchart illustrating a process 408 for wireless power transfer from the powering device 100 to the powered device 200, according to some embodiments of the present invention.

Figure 21:
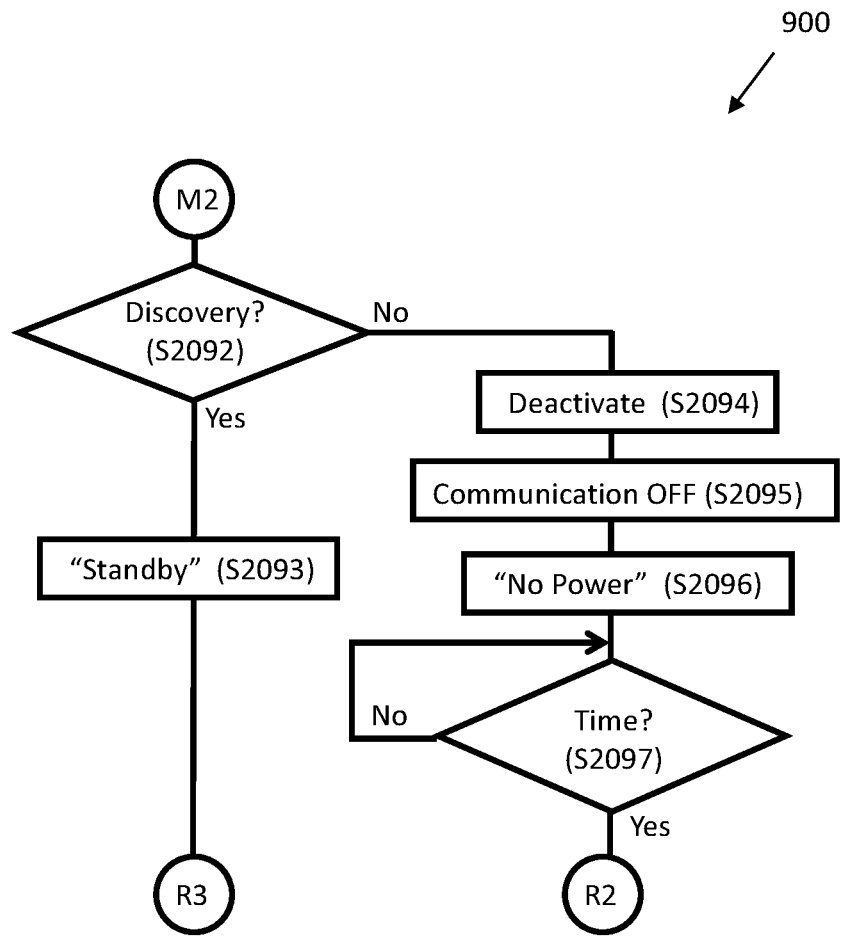

FIG. 21 is a flowchart illustrating a process 510 for wireless power transfer from the powering device 100 to the powered device 200, according to some embodiments of the present invention.

Figure 22:
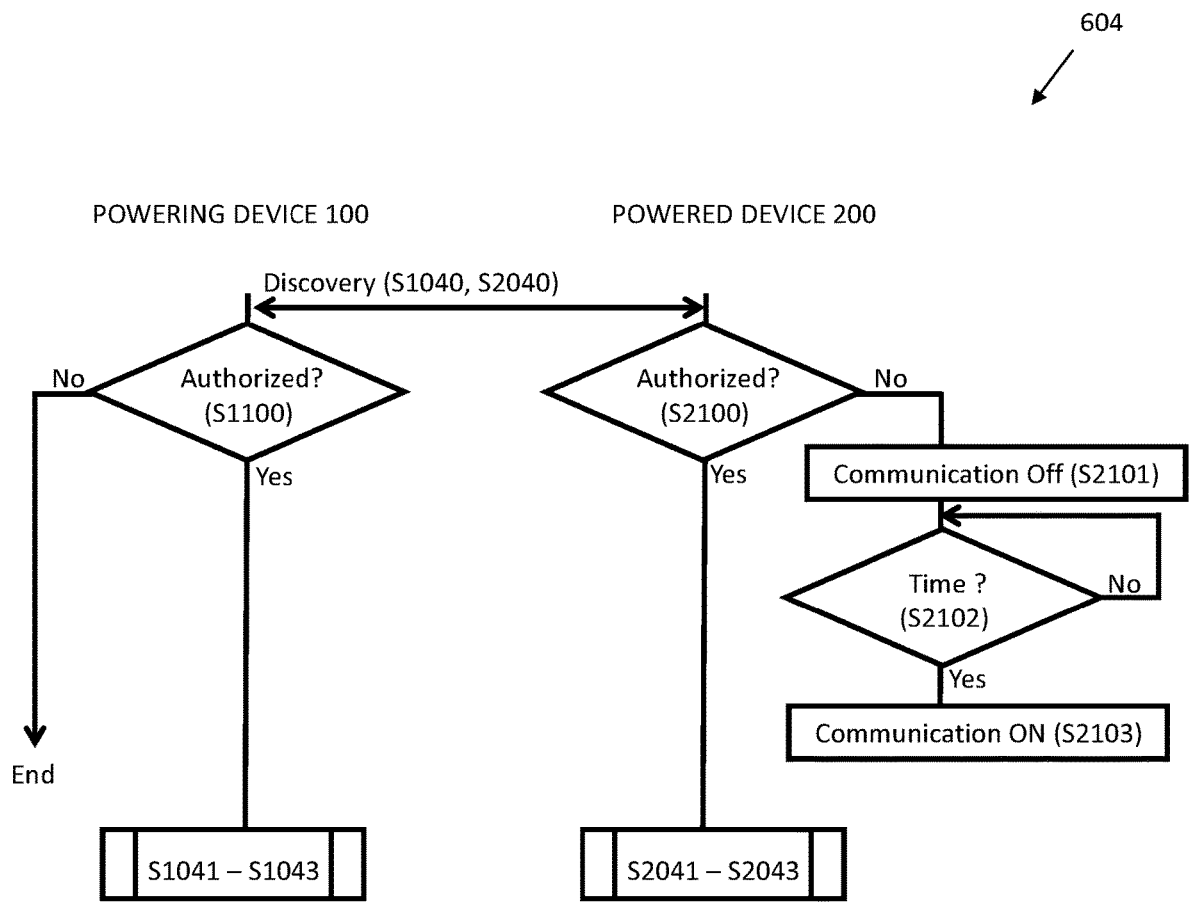

FIG. 22 is a flowchart illustrating a process 604 for wireless power transfer from the powering device 100 to the powered device 200, according to some embodiments of the present invention.

Figure 23:
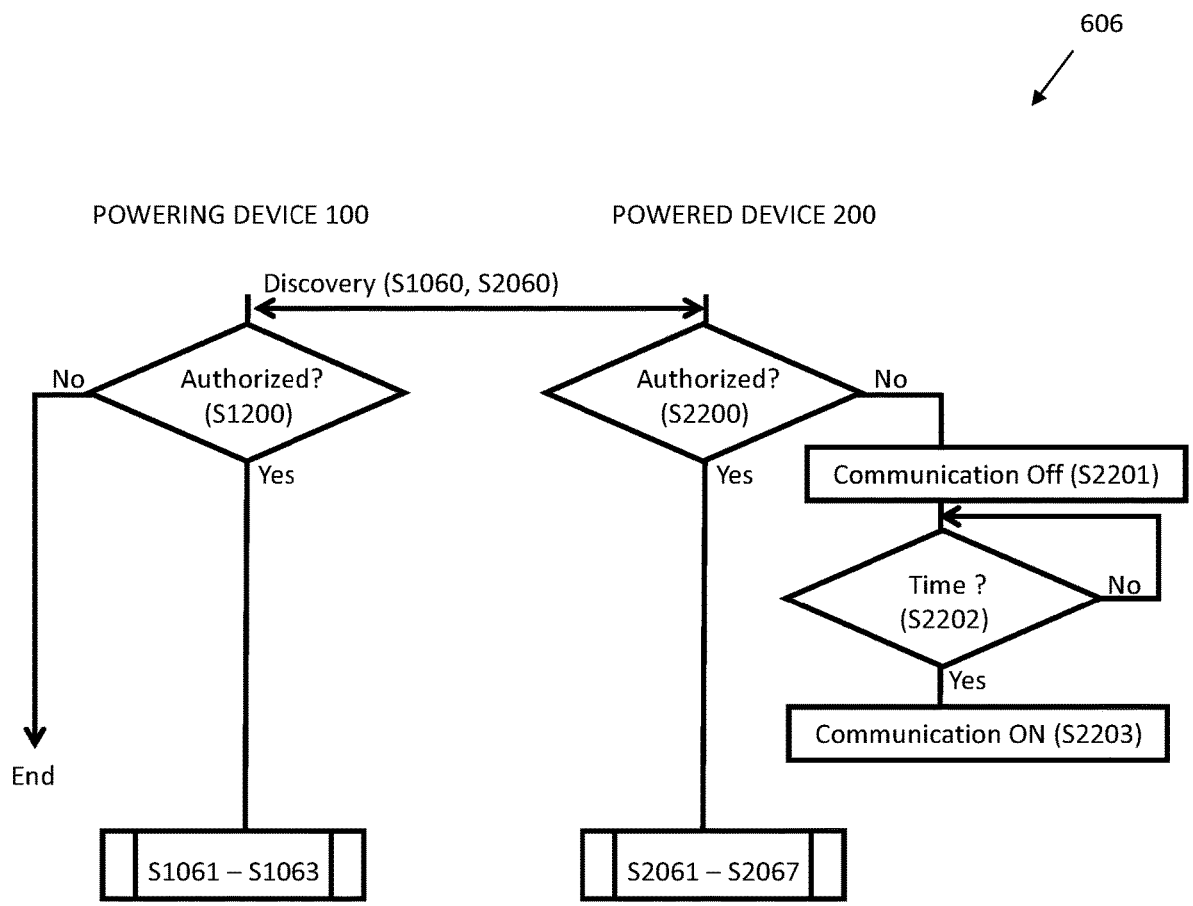

FIG. 23 is a flowchart illustrating a process 606 for wireless power transfer from the powering device 100 to the powered device 200, according to some embodiments of the present invention.

Figure 24:
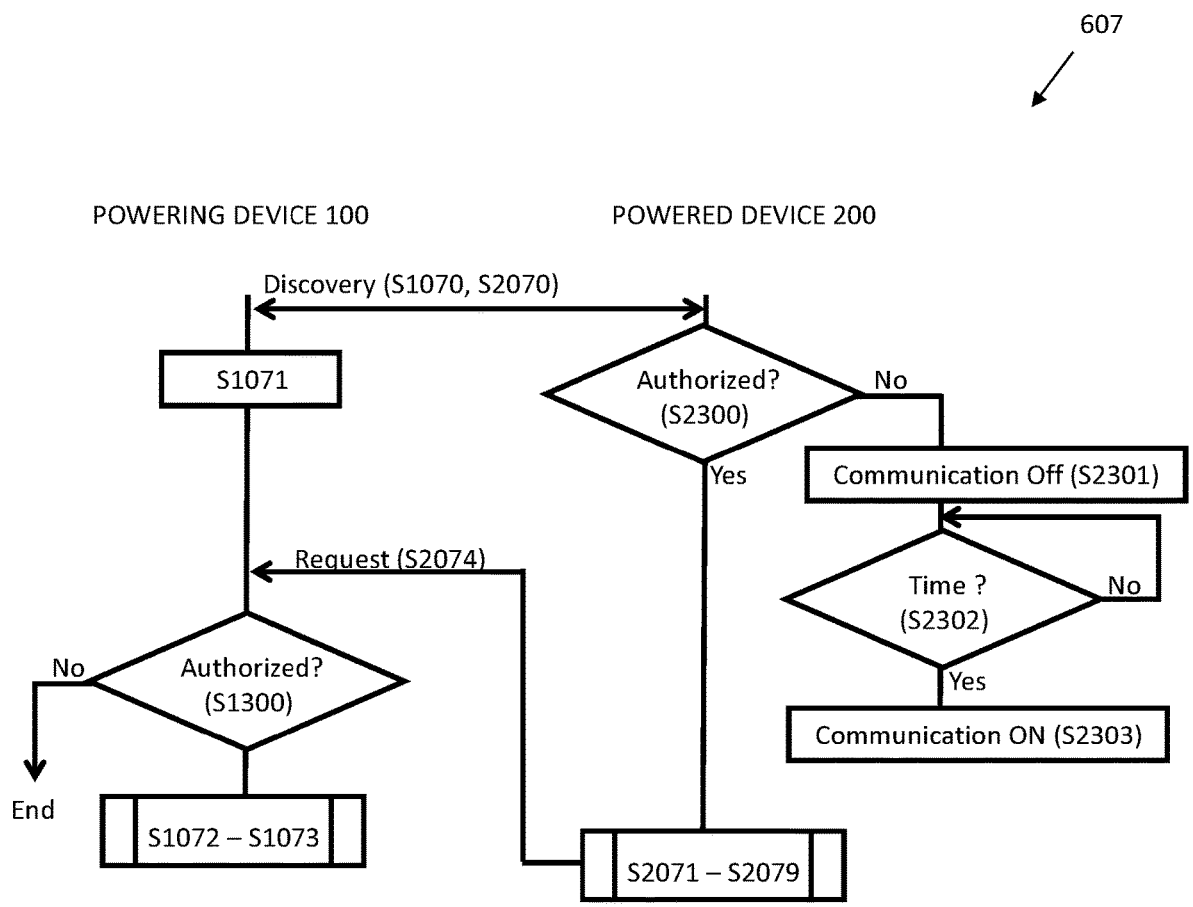

FIG. 24 is a flowchart illustrating a process 607 for wireless power transfer from the powering device 100 to the powered device 200, according to some embodiments of the present invention.

Figure 25:
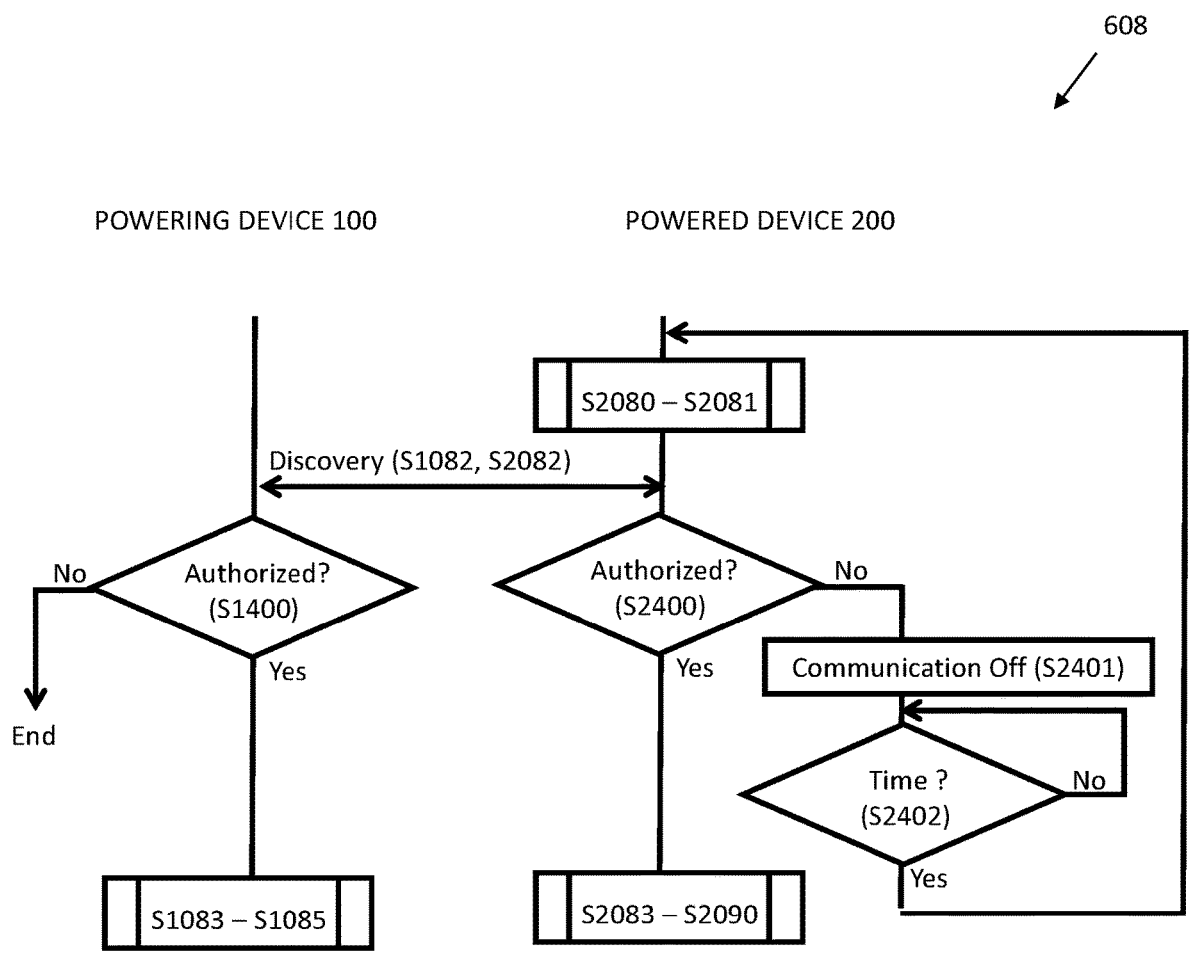

FIG. 25 is a flowchart illustrating a process 608 for wireless power transfer from the powering device 100 to the powered device 200, according to some embodiments of the present invention.

Figure 26:
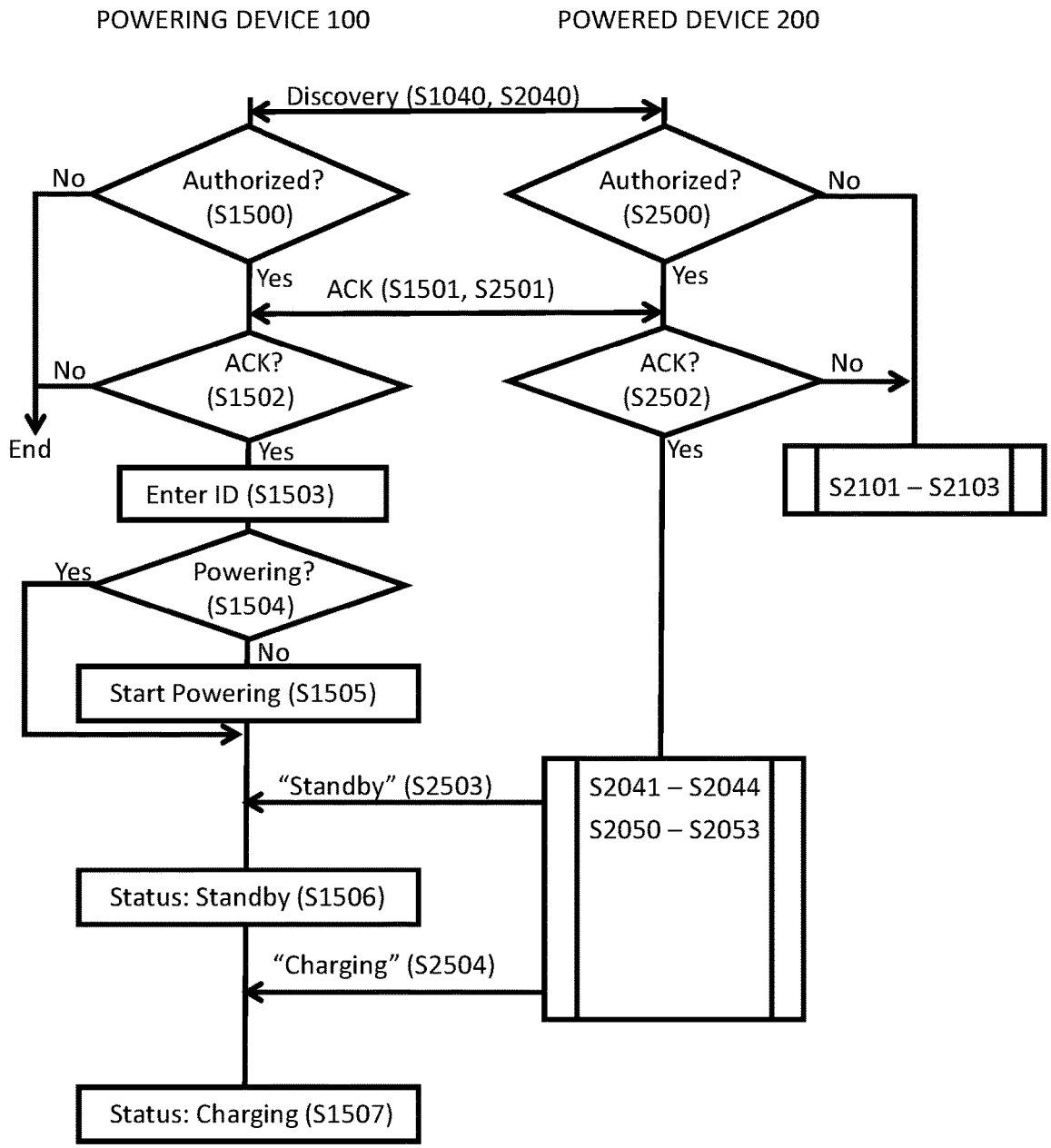

FIG. 26 is a flowchart illustrating a process 704 for wireless power transfer from the powering device 100 to the powered device 200, according to some embodiments of the present invention.

Figure 27:
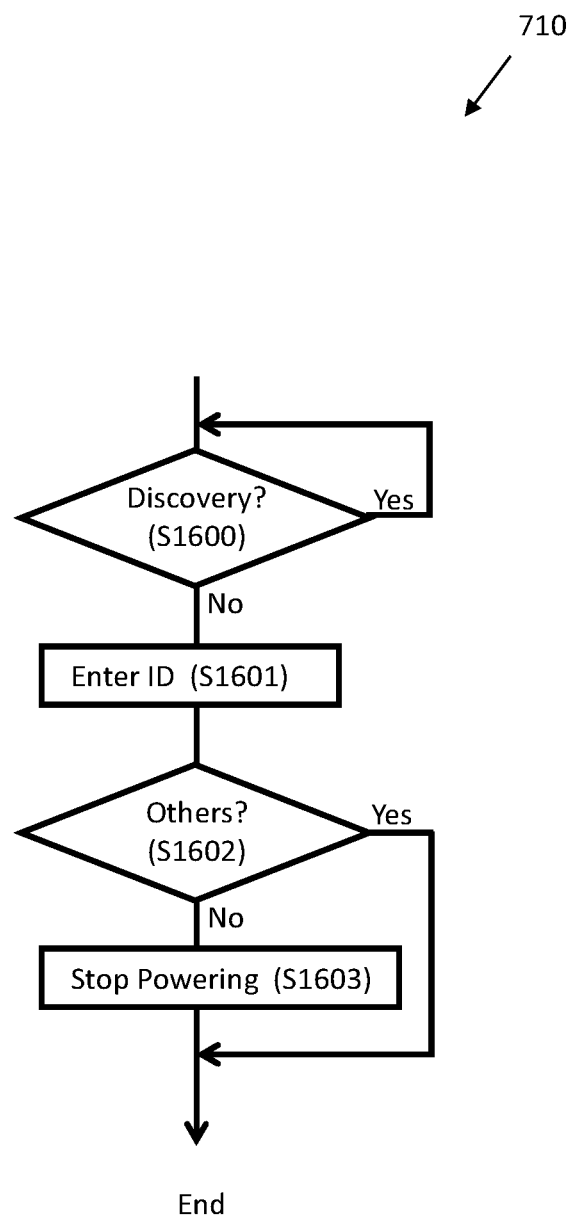

FIG. 27 is a flowchart illustrating a process 710 for wireless power transfer from the powering device 100 to the powered device 200, according to some embodiments of the present invention.

Figure 28:
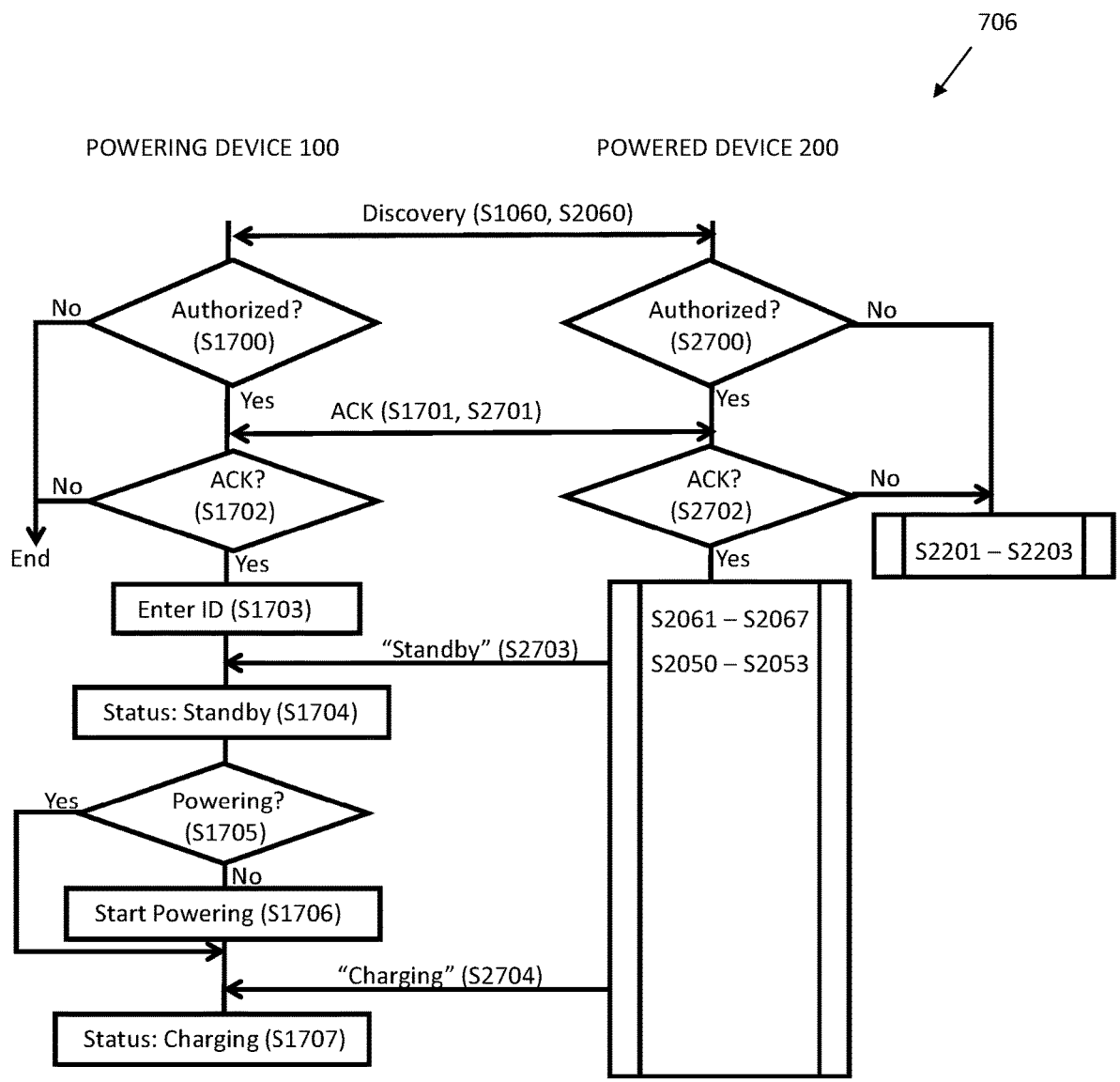

FIG. 28 is a flowchart illustrating a process 706 for wireless power transfer from the powering device 100 to the powered device 200, according to some embodiments of the present invention.

Figure 29:
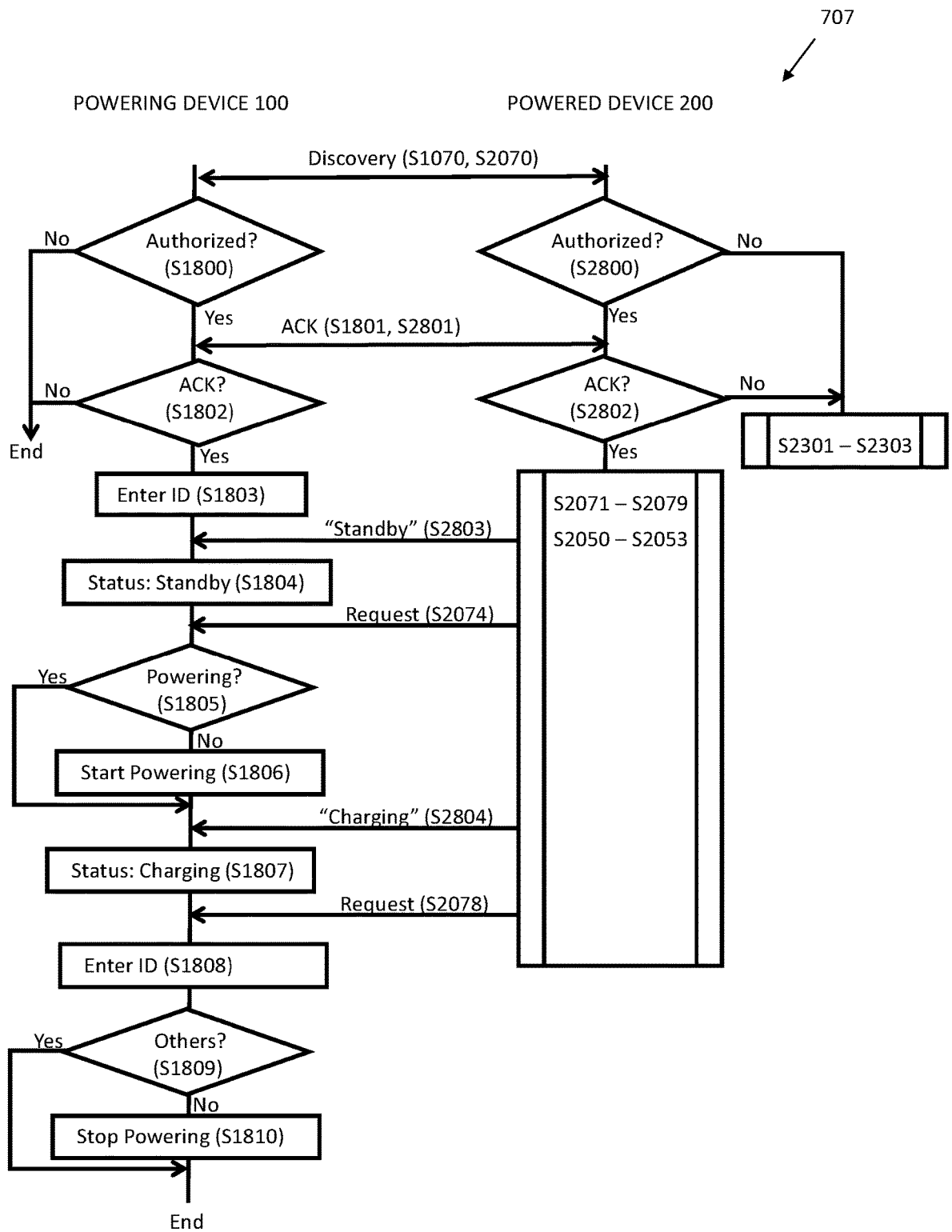

FIG. 29 is a flowchart illustrating a process 707 for wireless power transfer from the powering device 100 to the powered device 200, according to some embodiments of the present invention.

Figure 30:
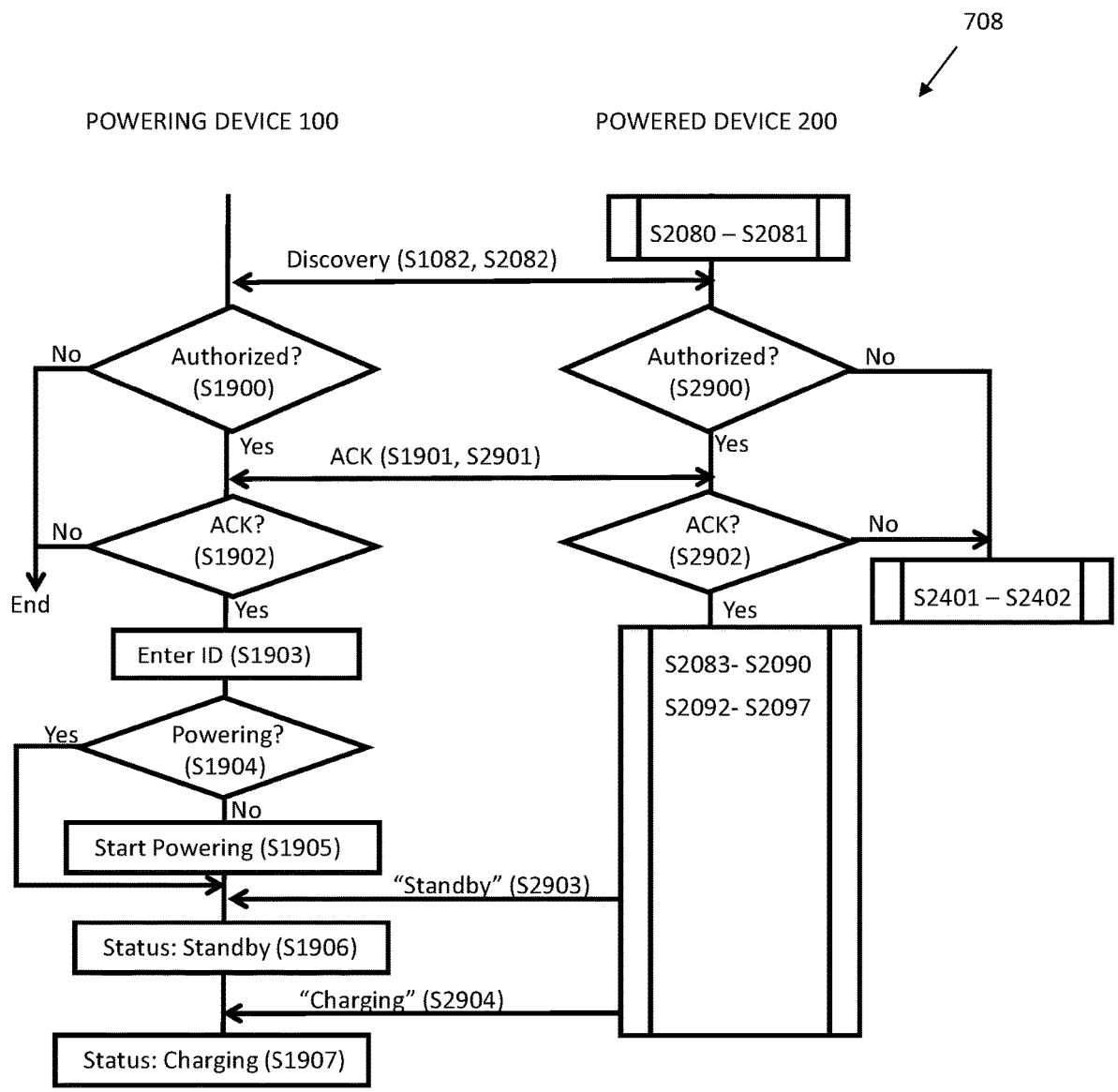

FIG. 30 is a flowchart illustrating a process 708 for wireless power transfer from the powering device 100 to the powered device 200, according to some embodiments of the present invention.

Figure 31:
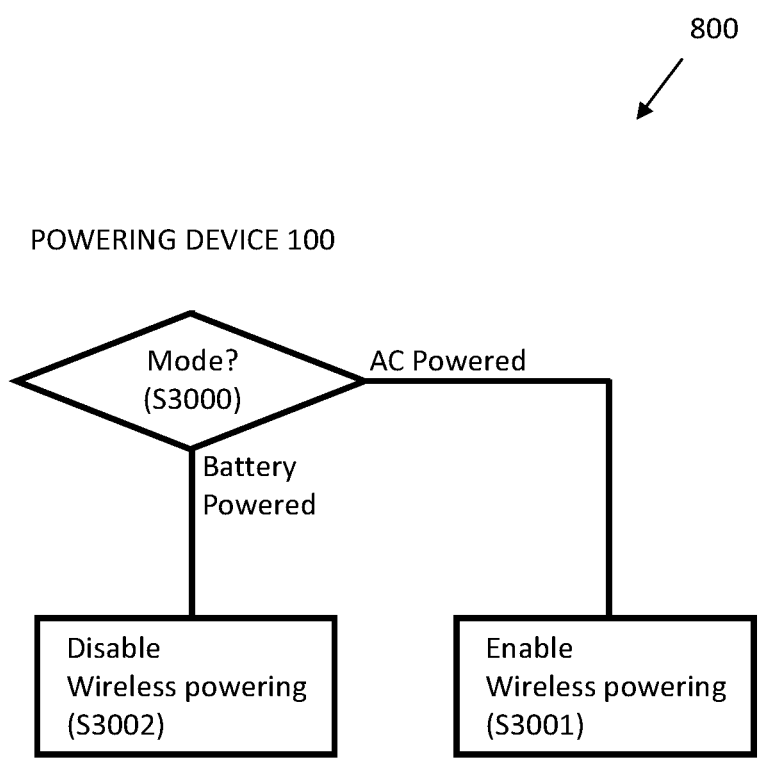

FIG. 31 is a flowchart illustrating a process 800 for conditional enablement of wireless power transfer at the powering device 100, according to some embodiments of the present invention.

Figure 32:
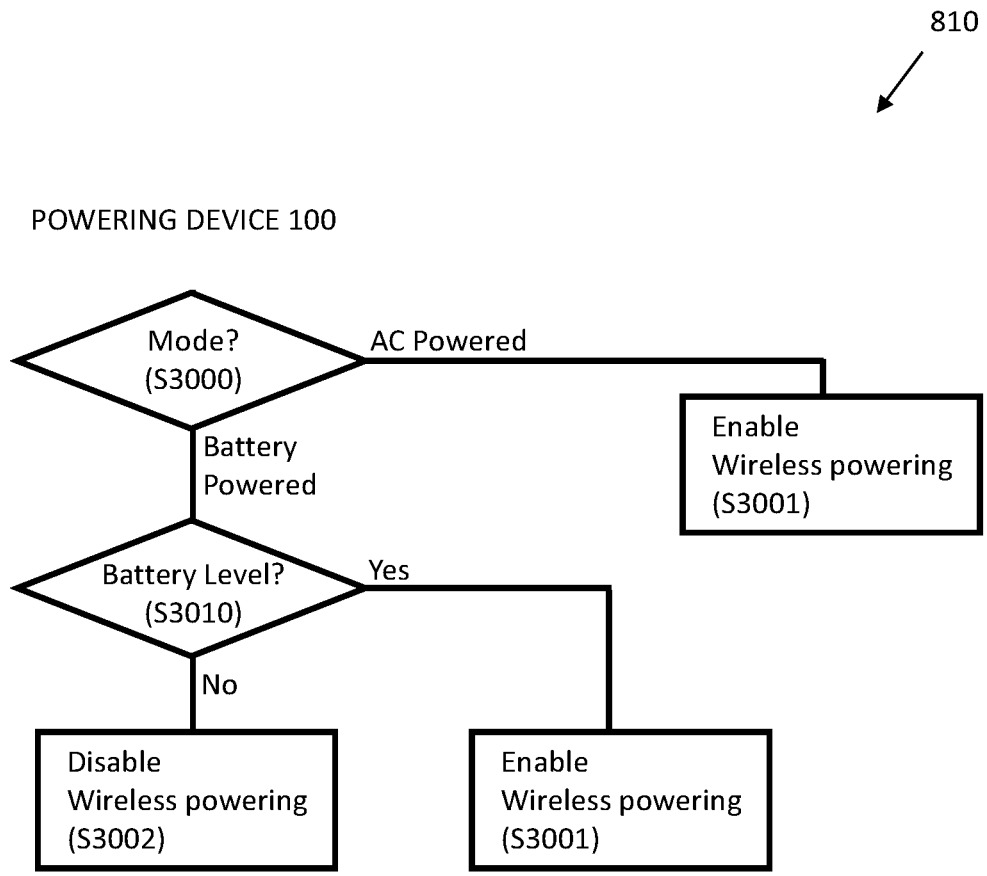

FIG. 32 is a flowchart illustrating a process 810 for conditional enablement of wireless power transfer at the powering device 100, according to some embodiments of the present invention.

Figure 33:
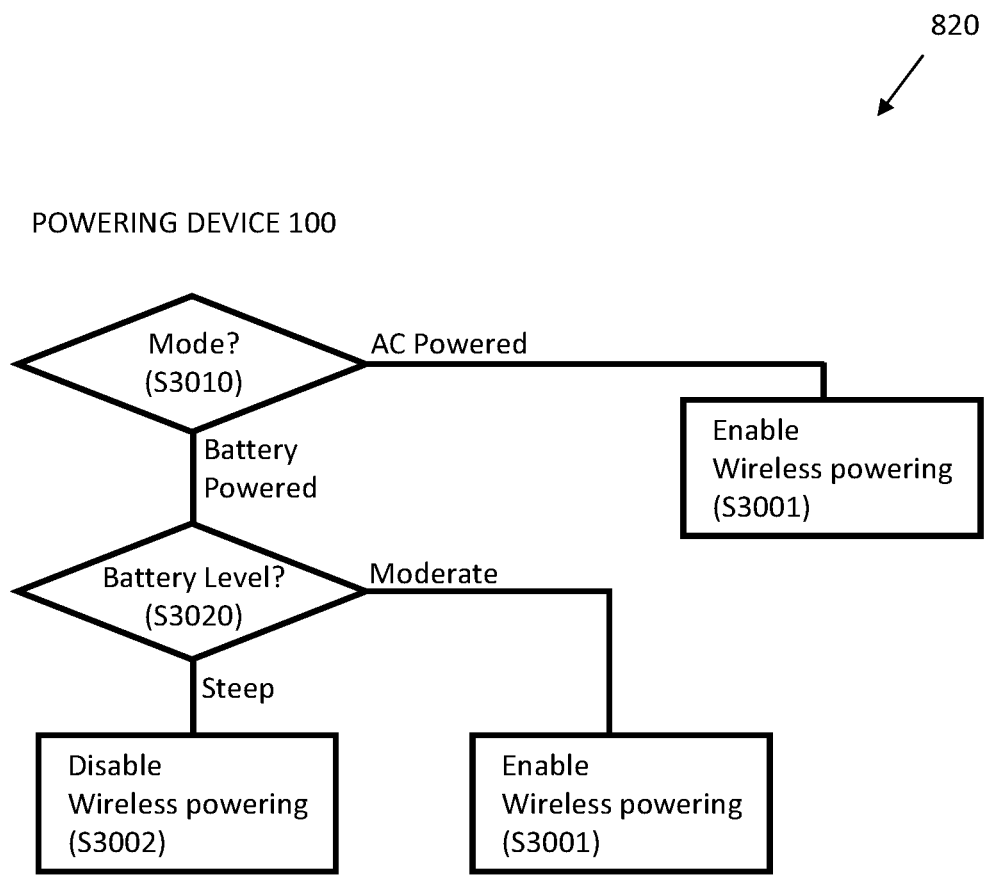

FIG. 33 is a flowchart illustrating a process 820 for conditional enablement of wireless power transfer at the powering device 100, according to some embodiments of the present invention.

Figure 34:
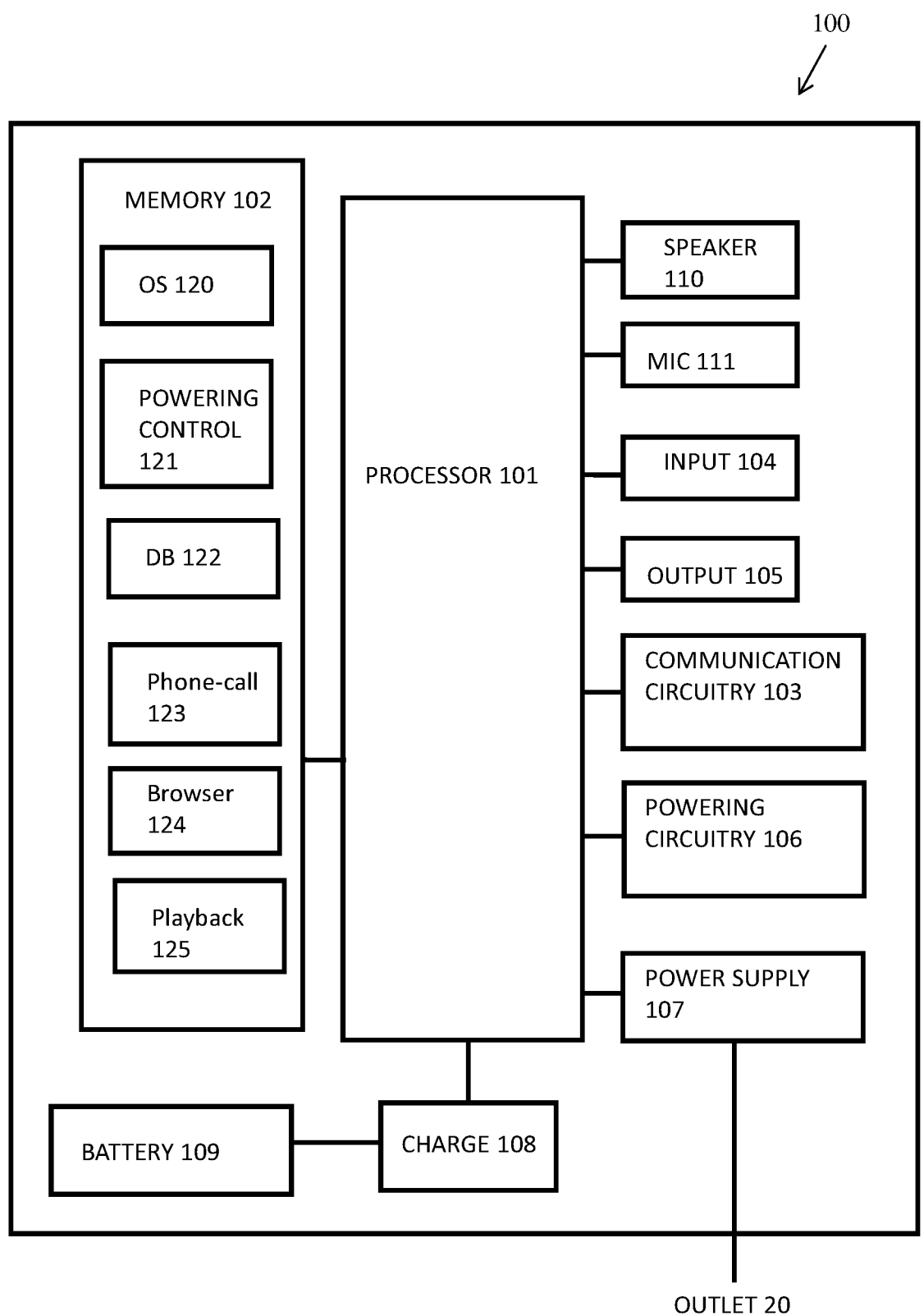

FIG. 34 is a block diagram illustrating an exemplary configuration of a powering device 100 operable in a battery-powered mode and an AC-powered mode, according to some embodiments of the present invention.

Figure 35:
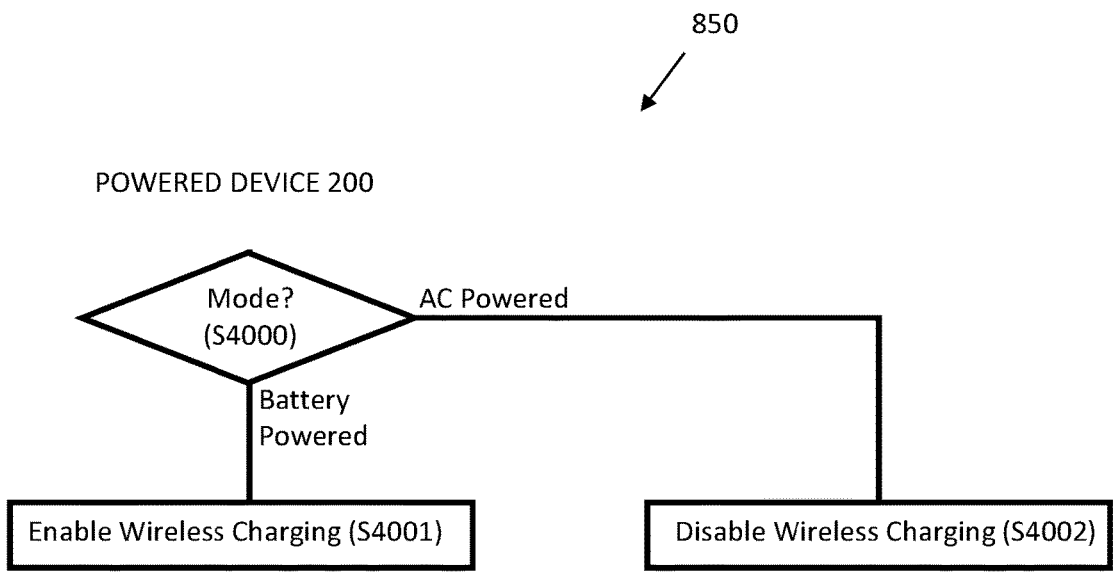

FIG. 35 is a flowchart illustrating a process 850 for conditional reception of wireless power transfer at the powered device 200, according to some embodiments of the present invention.

Figure 36:
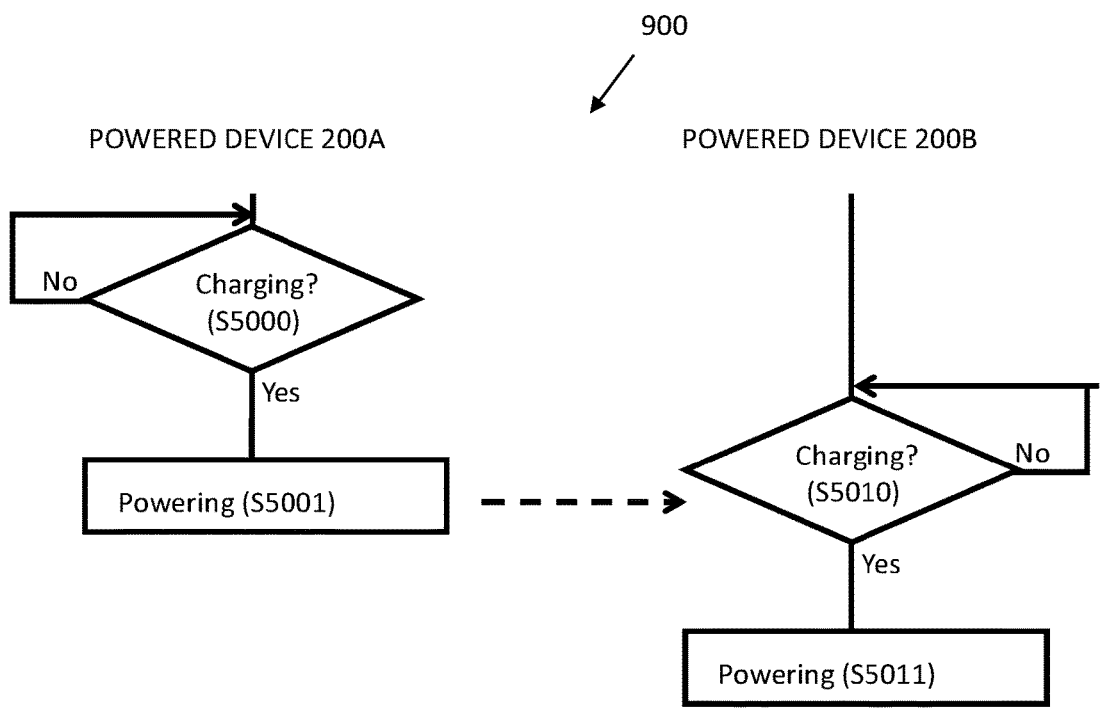

FIG. 36 is a flowchart illustrating a process 900 for wireless power transfer from the powered device 200 to another powered device, according to some embodiments of the present invention.

Figure 37:
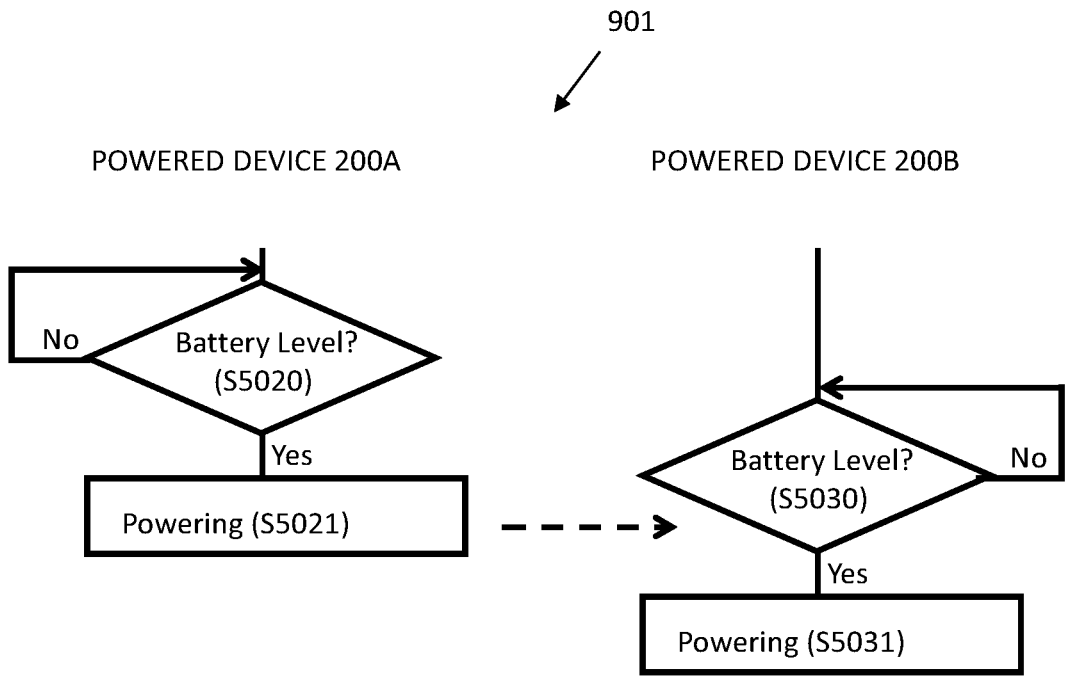

FIG. 37 is a flowchart illustrating a process 901 for wireless power transfer from the powered device 200 to another powered device, according to some embodiments of the present invention.

Figure 38:
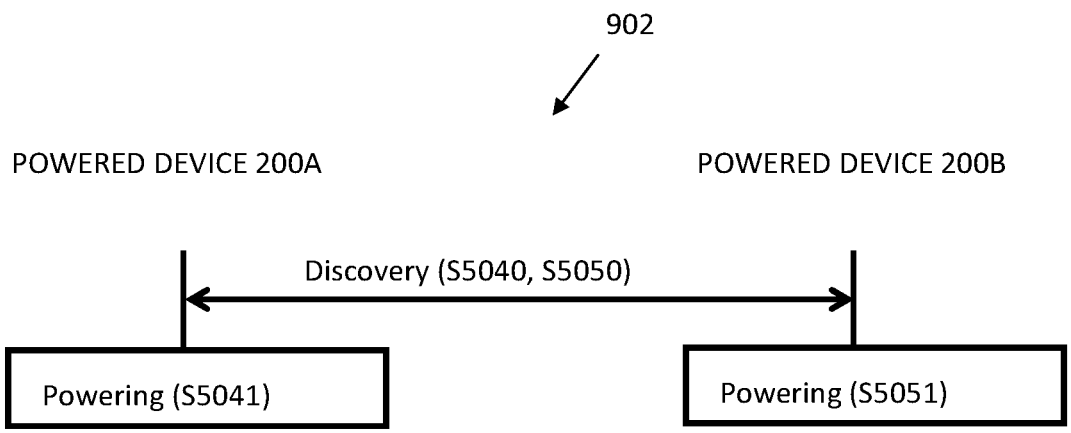

FIG. 38 is a flowchart illustrating a process 902 for wireless power transfer from the powered device 200 to another powered device, according to some embodiments of the present invention.

Figure 39:
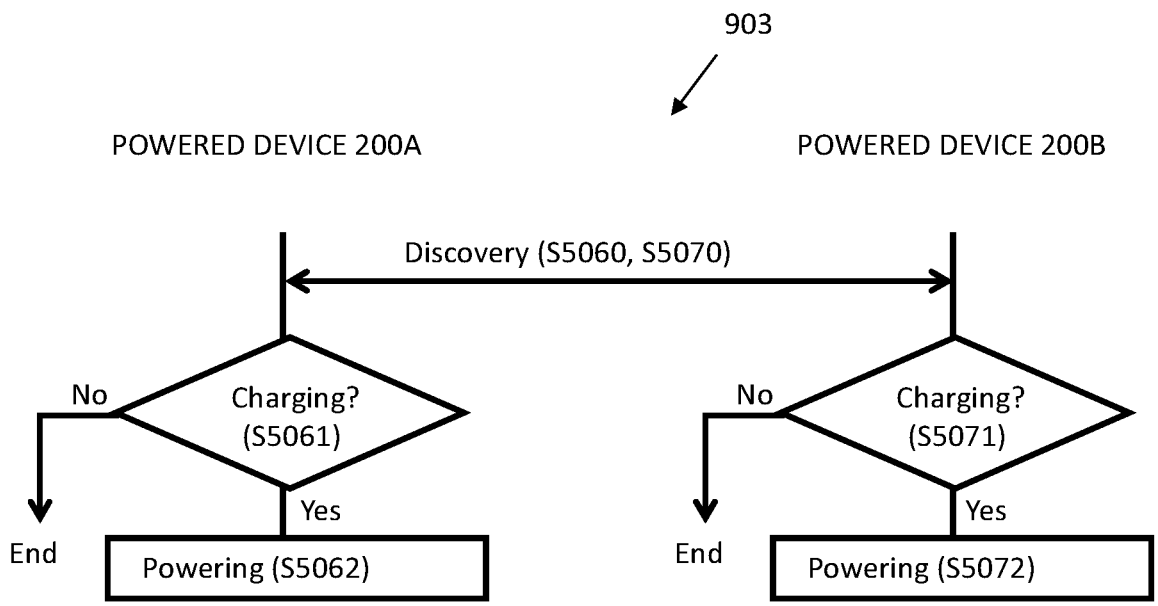

FIG. 39 is a flowchart illustrating a process 903 for wireless power transfer from the powered device 200 to another powered device, according to some embodiments of the present invention.

Figure 40:
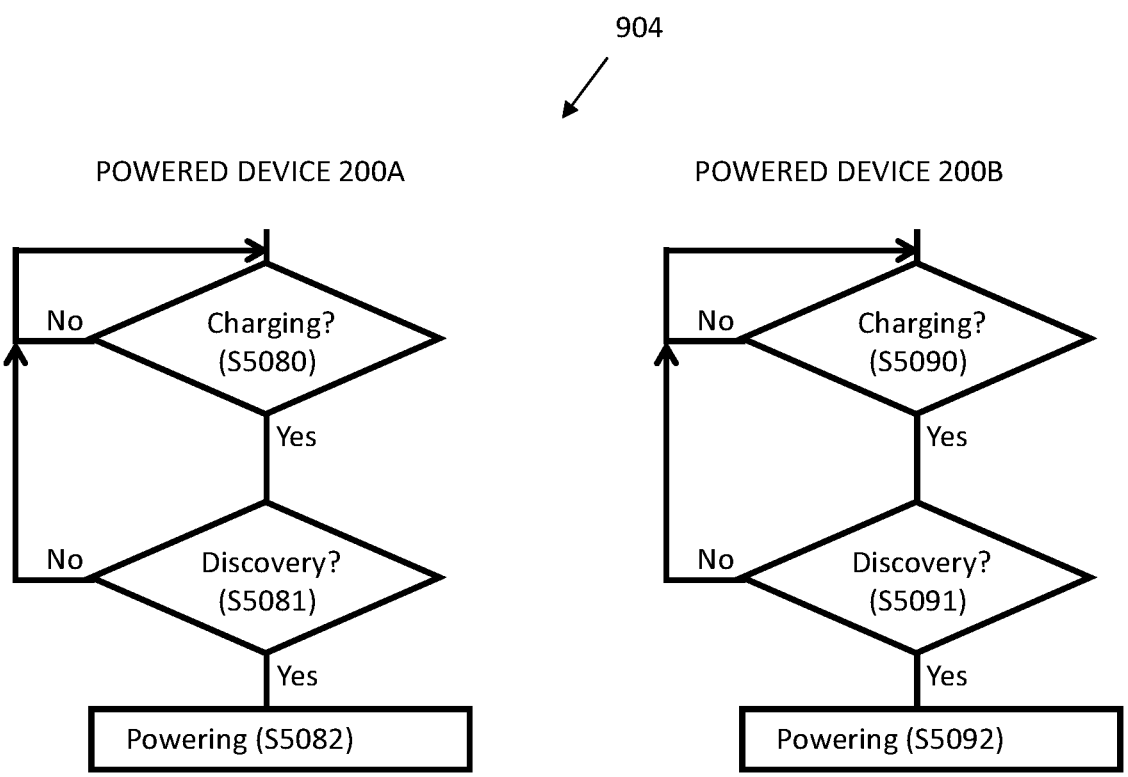

FIG. 40 is a flowchart illustrating a process 904 for wireless power transfer from the powered device 200 to another powered device, according to some embodiments of the present invention.

Figure 41:
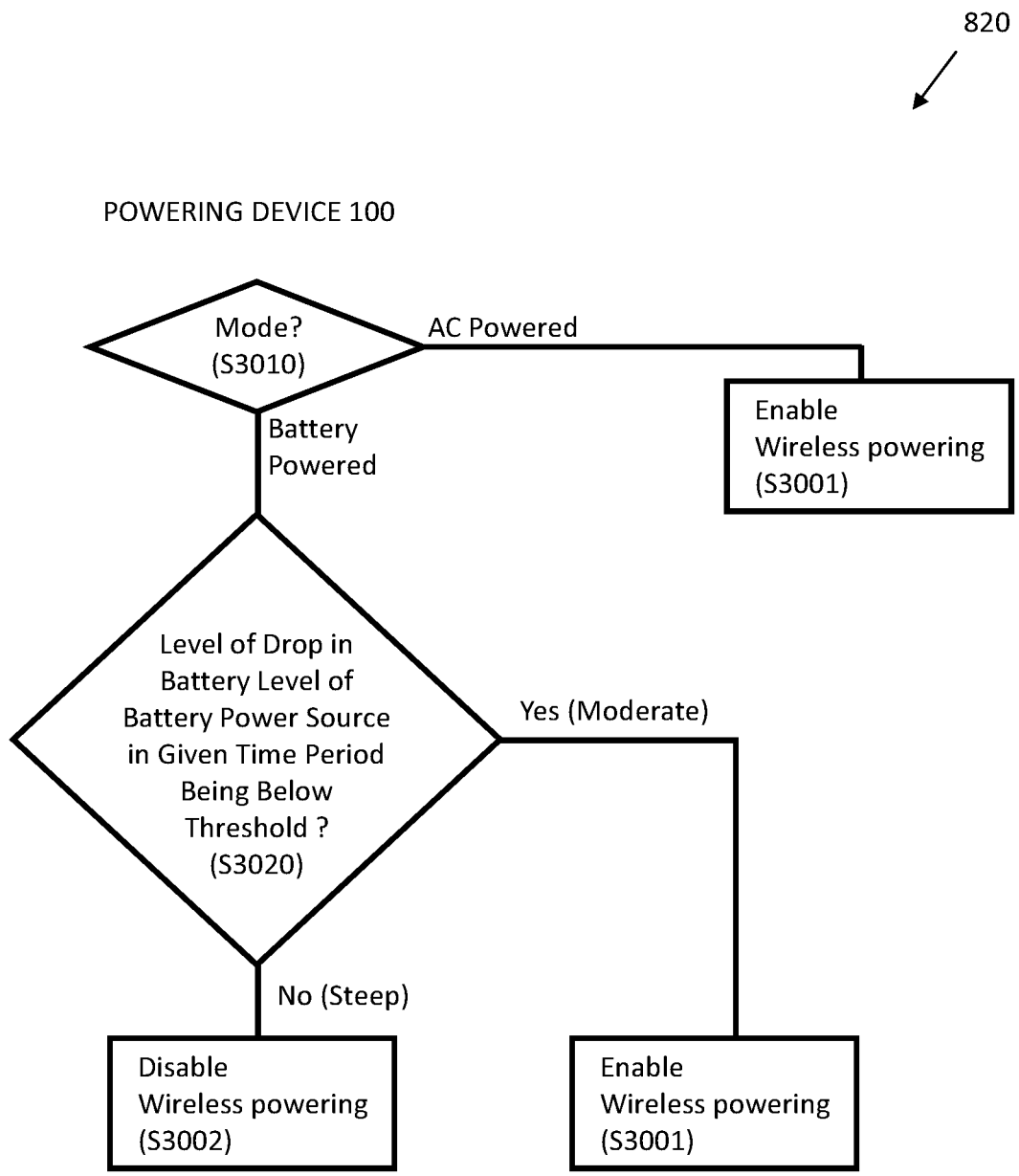

FIG. 41 is a flowchart illustrating a detailed example of the process 820 for conditional enablement of wireless power transfer at the powering device 100, according to some embodiments of the present invention.

Figure 42:
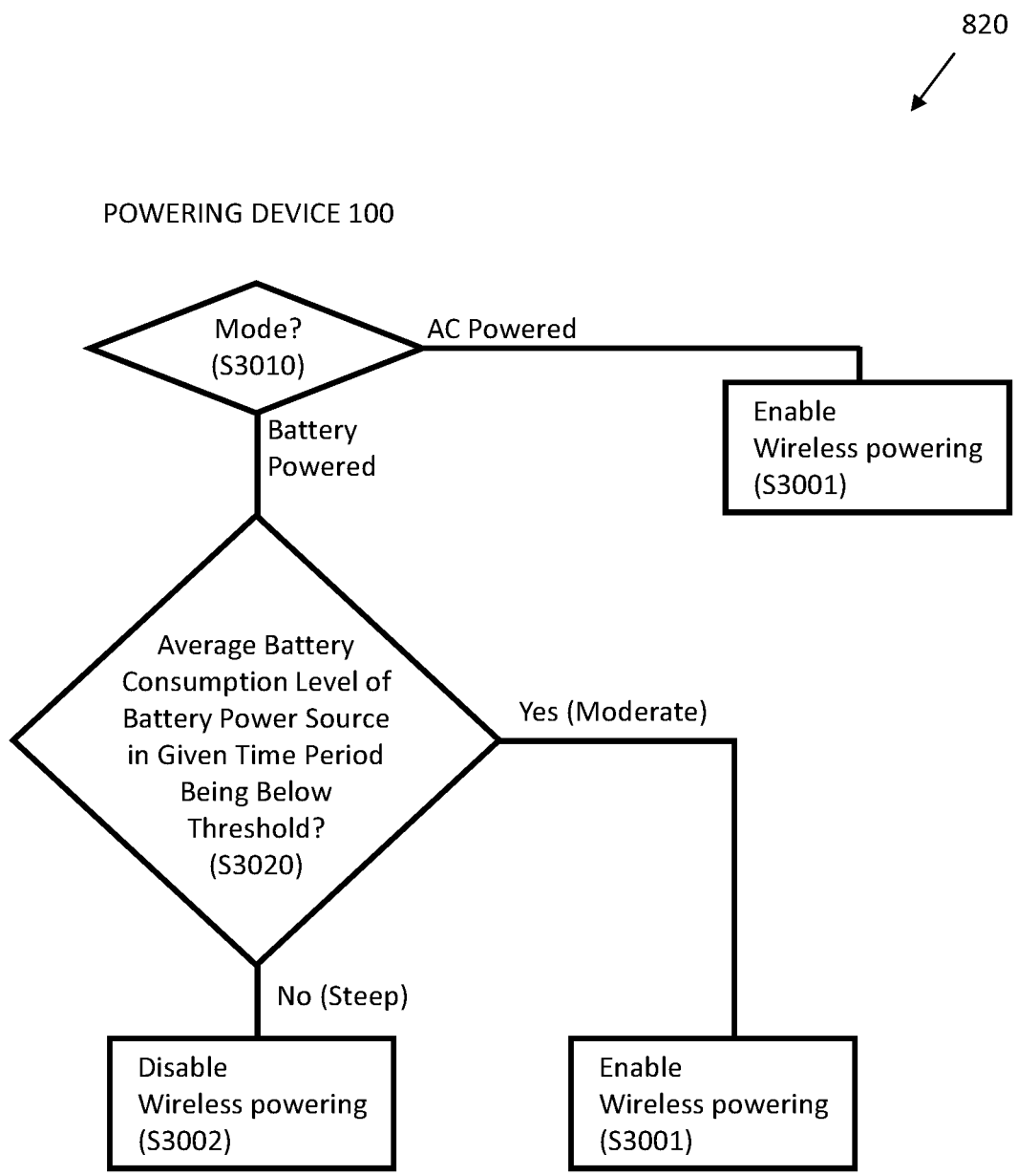

FIG. 42 is a flowchart illustrating a detailed example of the process 820 for conditional enablement of wireless power transfer at the powering device 100, according to some embodiments of the present invention.

Figure 43:
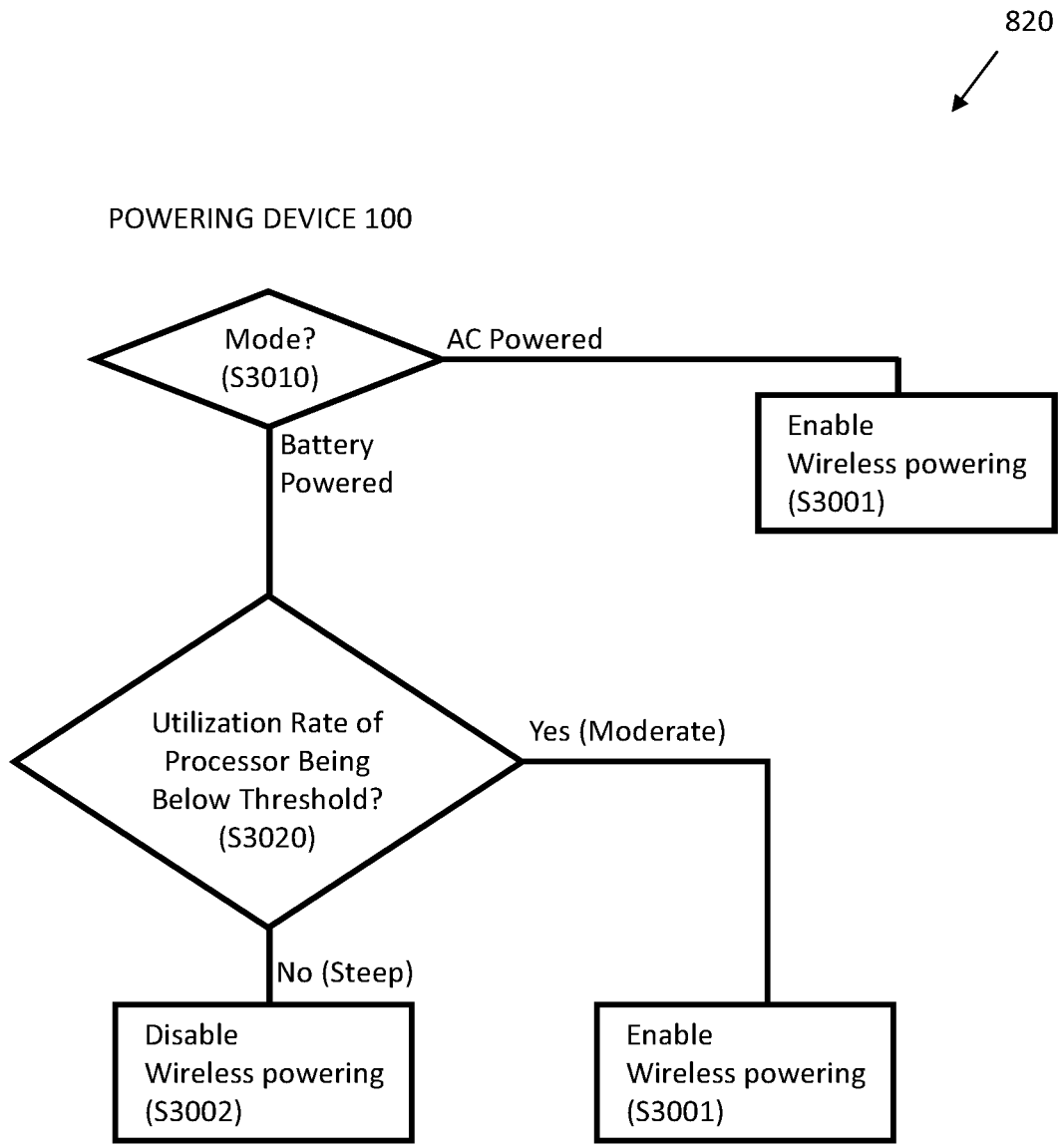

FIG. 43 is a flowchart illustrating a detailed example of the process 820 for conditional enablement of wireless power transfer at the powering device 100, according to some embodiments of the present invention.

Figure 44:
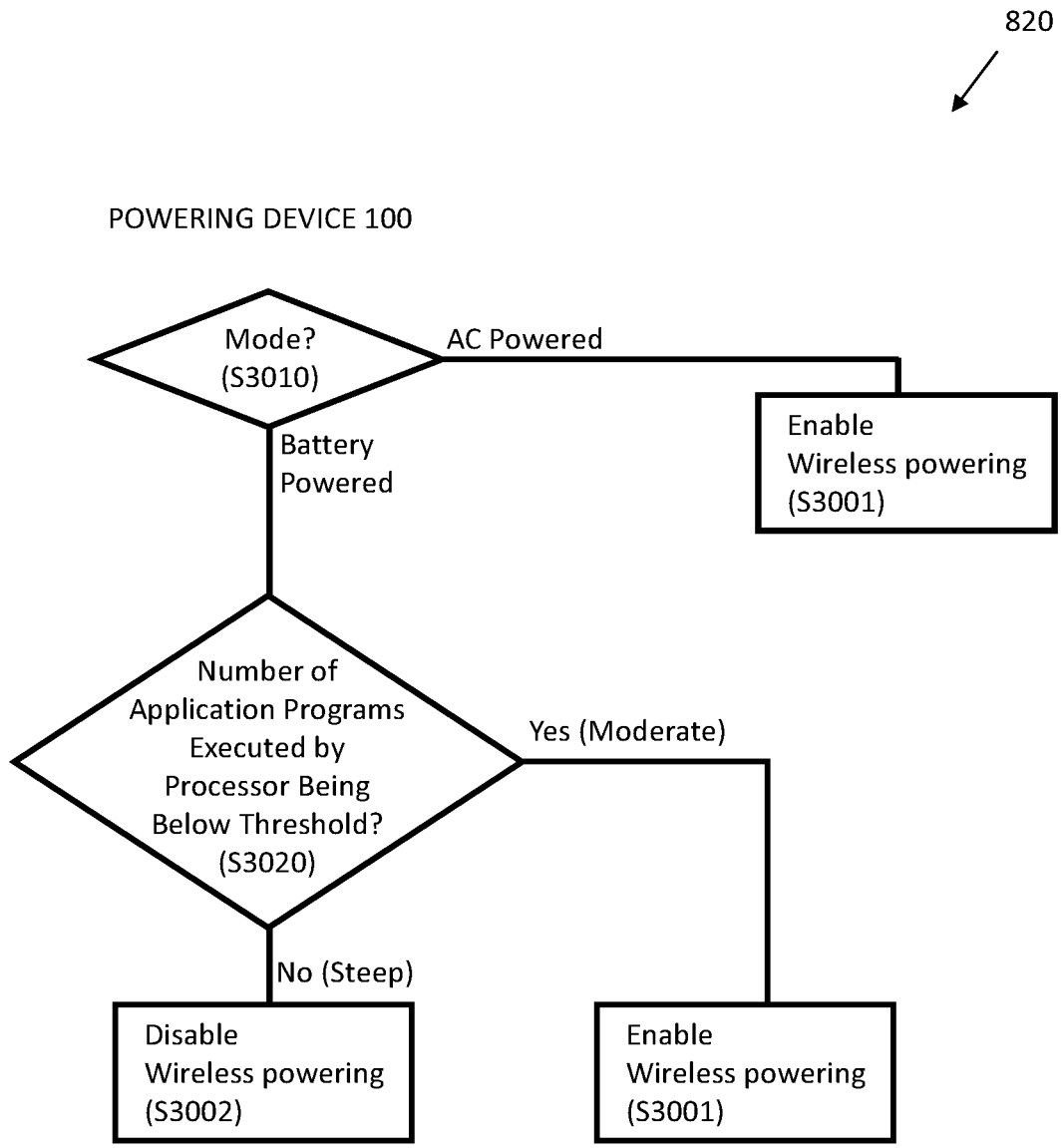

FIG. 44 is a flowchart illustrating a detailed example of the process 820 for conditional enablement of wireless power transfer at the powering device 100, according to some embodiments of the present invention.

DETAILED DESCRIPTION

Power Transfer System

Embodiments of the present invention are described with reference to the drawings. The embodiments described herein are for illustrative purpose only and not intended to limit the scope of protection defined by Claims.

Figure 1:
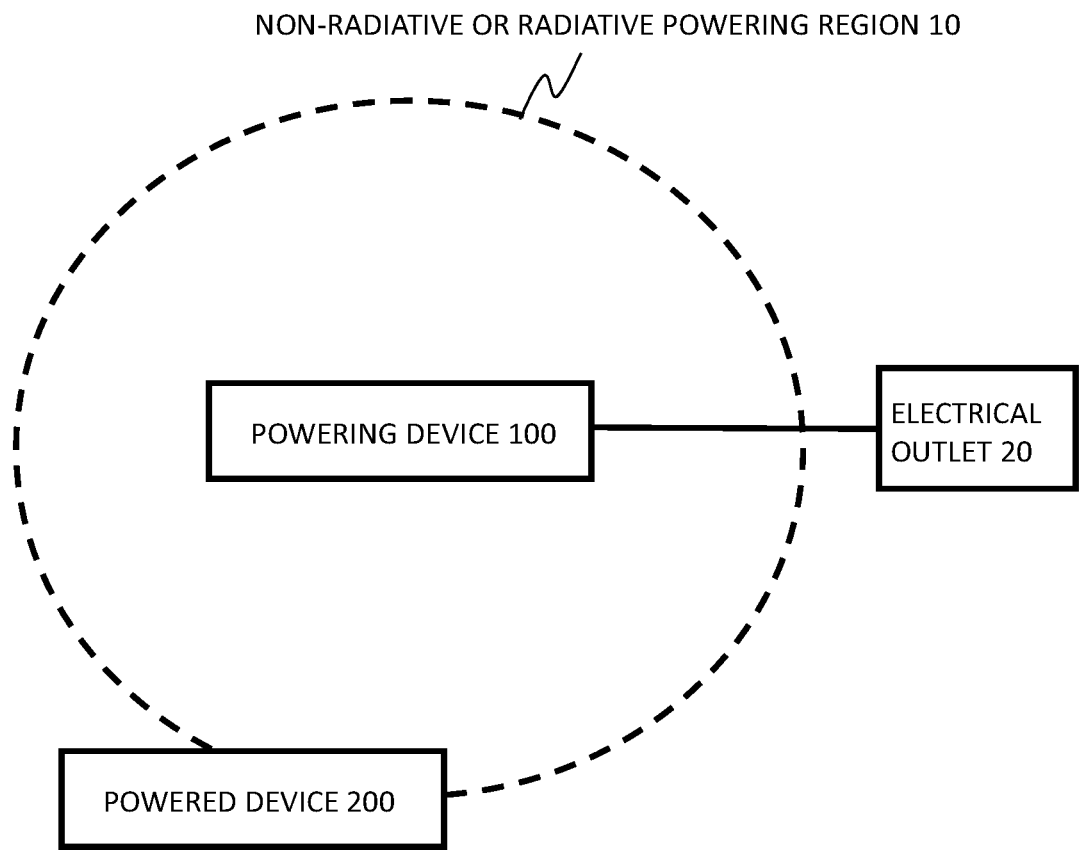
FIG. 1 is a schematic view illustrating a wireless powering system including a powering device 100 and a powered device 200, according to some embodiments of the present invention.

In some embodiments, as depicted in FIG. 1, a wireless power transfer system includes a powering device 100 and a powered device 200. The powering device 100 is configured to wirelessly power the powered device 200 through a powering region 10 based on power supplied from a residential or commercial power distribution system via an electrical outlet 20. The powering region 10 may be a magnetic field provided by way of inductive coupling or resonant inductive coupling between coils of wire where the powering device 100 and the powered device 200 use the coils as a power transmitter and a power receiver respectively, in which case the powering region 10 is non-radiative. The powering region 10 may also be an electric filed provided by way of capacitive coupling or resonant capacitive coupling between metal electrodes where the powering device 100 and the powered device 200 use the electrodes as a power transmitter and a power receiver respectively, in which case the powering region 10 is non-radiative. The powering region 10 may also be electromagnetic waves or sound waves in any frequency and wavelength, such as radio waves, microwaves, and ultrasonic waves, transmitted by a wireless transmitter of the powering device 100 to be received by a receiver of the powered device 200, in which case the powering region 10 is radiative.

Figure 2:
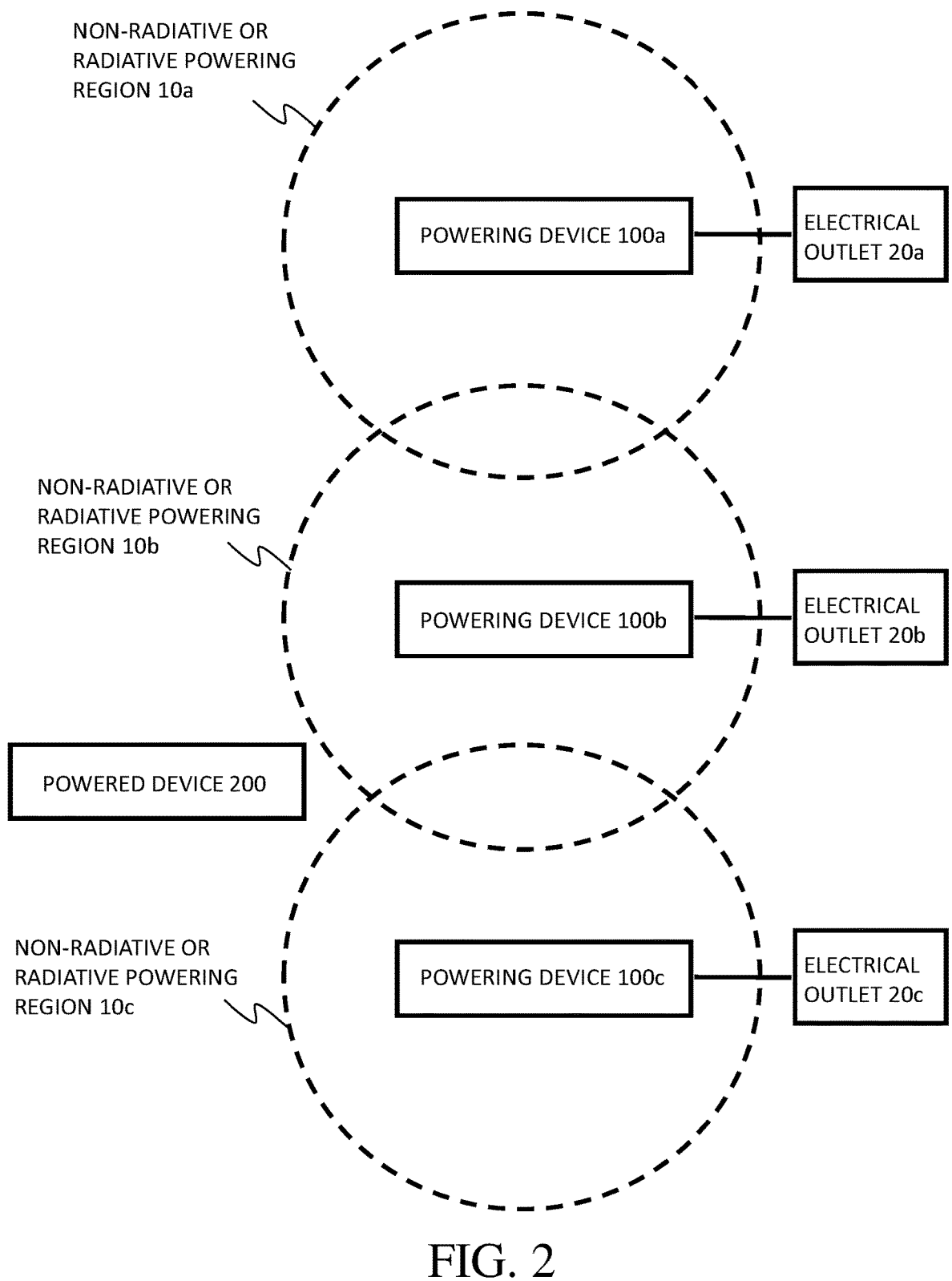
FIG. 2 is a schematic view illustrating a wireless powering system including multiple powering devices 100 and a powered device 200, according to some embodiments of the present invention.

In some embodiments, as depicted in FIG. 2, the power transfer system may include two or more powering devices 100 each of which provides their respective powering regions 10 based on power supplied via electrical outlets 20. In an example shown in FIG. 2, three powering devices 100a, 100b, and 100c provide the powering regions 10a, 10b, and 10c, respectively. The powering devices 100a, 100b, and 100c may be implemented in a way that the powering regions 10a, 10b, and 10c may overlap in part as shown in FIG. 2. In the embodiments, in response to moving across the powering regions 10a, 10b, and 10c, the powered device 200 may "hand over" from a powering region to another, namely, may receive power through the powering regions 10a, 10b, and 10c in turns according to the order or direction of the moving. At an overlapping region where two or more powering regions overlap with one another, the powered device 200 may receive power through one, some, or all of the overlapping powering regions.

Figure 3:
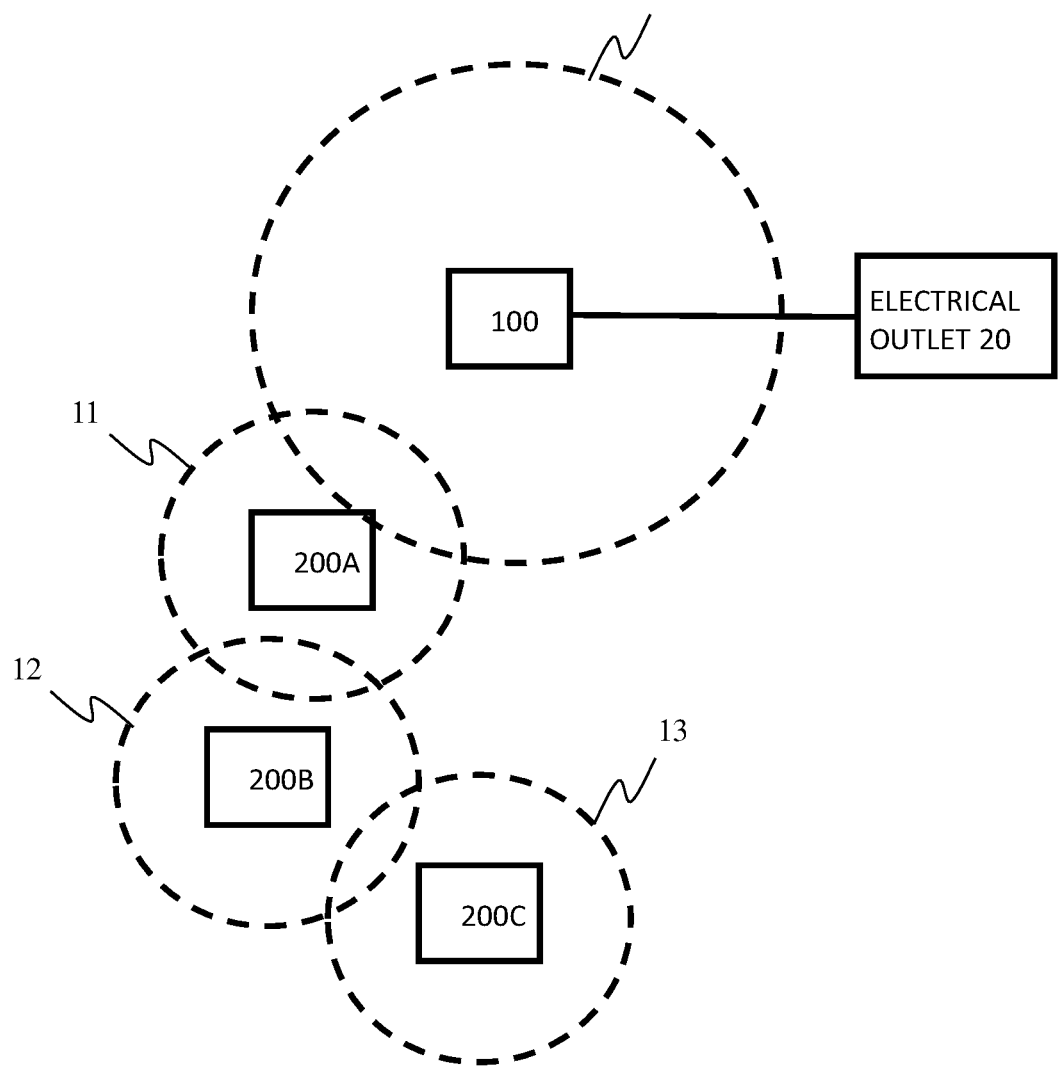
FIG. 3 is a schematic view illustrating a wireless powering system including multiple powered devices 200 present in proximity to one another, according to some embodiments of the present invention.

In some embodiments, as depicted in FIG. 3, the power transfer system may include two or more powered devices 200 each of which is provided with powering circuitry just as a powering device 100 to provide their respective powering regions. In an example shown in FIG. 3, three powered devices 200a, 200b, and 200c are present in the system to provide the powering regions 11, 12, and 13, respectively. The powered devices 200a to 200c are so operative as to provide power in a daisy chain or in parallel with one another to distribute power in the order from the powered device 200a nearest to the powering device 100 to the powered device 200c most distant from the powering device 100. In other words, the powered device 200a may wirelessly power the powered device 200b based on power generated by way of wireless power transfer from the powering device 100, and the powered device 200b may then wirelessly power the powered device 200c based on power generated by way of wireless power transfer from the powered device 200a. The powered device 200c may also perform wireless power transfer based on power generated by way of wireless power transfer from the powered device 200b. In this manner, the system may facilitate wireless power transfer between powered devices 200 in a daisy chain, allowing relay of power from a powered device 200 nearest to the powering device 100 to the last powered device 200 most distant from the powering device 100.

The powering device 100 may be a fixed or non-mobile power station installed in a house, office, or other buildings, or outside where the device 100 has access to at least one of the residential and commercial power distribution systems. The powering device 100 may also be a mobile, portable, or handheld power station that a user is able to carry to place at any desired location in the house, office, or other buildings, or outside where the device 100 has access to at least one of the residential and commercial power distribution systems. The powering device 100 may also be a powering port above or on which a vehicle or robot such as an unmanned air vehicle (UAV) or drone hovers or rests to get charged.

The powered device 200 may be a battery-charged device in any form, including but not limited to a mobile, portable, or handheld device such as a smartphone, laptop, and handheld home appliance, a peripheral or slave device operative in connection with the powering device 100, and an Internet-of-Things (IoT) device such as a sensor operative to communicate with other powered devices 200 and/or with the powering device 100. The powered device 200 may also be a vehicle or robot such as a UAV or drone which is operative to rest on or hover above the powering device 100 for charging.

Powering Device

Figure 4:
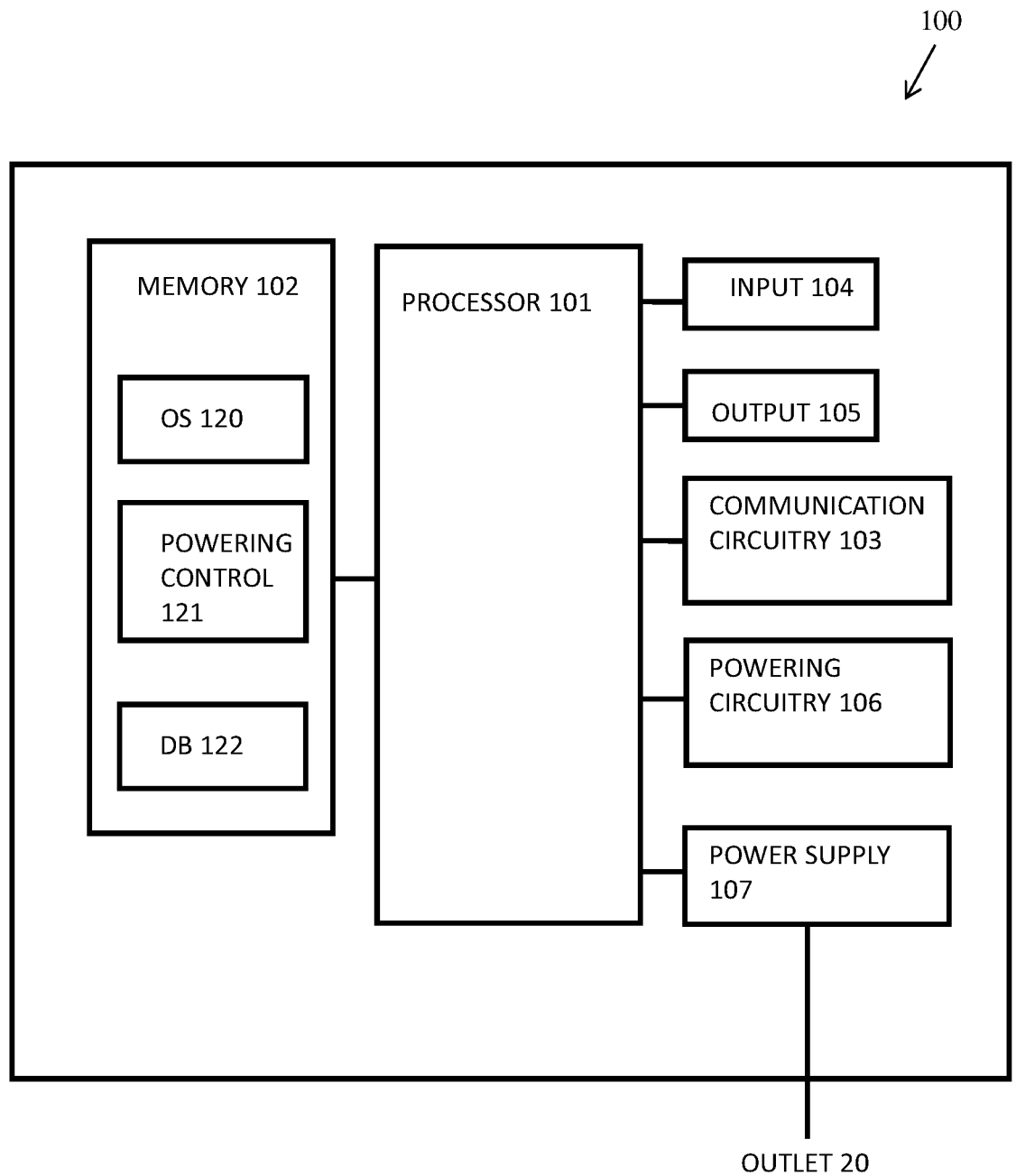
FIG. 4 is a block diagram illustrating an exemplary configuration of a powering device 100, according to some embodiments of the present invention.

In some embodiments, as depicted in FIG. 4, the powering device 100 includes a processor 101, a memory 102, communication circuitry 103, an input 104, an output 105, powering circuitry 106, and a power supply 107.

The processor 101 is a processing unit operative to execute computer programs resident on the memory 102 to process various data and to control the components coupled to the processor 101. The processor 101 may be a central processing unit (CPU), a micro processing unit (MPU), a digital signal processor (DSP), another general or dedicated processing unit, or combination thereof.

The memory 102 is coupled to the processor 101 and is operative to store one or more computer programs and/or various data for execution and/or use by the processor 101. The memory 102 may be a read only memory (ROM), a random access memory (RAM), another memorizing component or computer-readable medium, or combination thereof. In some embodiments, the memory 102 stores at least an operating system (OS) 120, a powering control program 121, and a database (DB) 122. The powering control program 121 is an application program configured to run on the OS 120 or part of the OS 120, to control operation of wireless power transfer using the powering circuitry 106. The DB 122 includes information indicative of the identifier of the powered device 200 and/or the status of wireless power transfer to the powered device 200.

The communication circuitry 103 is coupled to the processor 101 and is operative to perform a wireless communication in accordance with at least one wireless communication standard for wireless communication with the powered device 200. The communication circuitry 103 may be a single circuit designed to perform a communication in compliance with a single communication standard, or may be one or more single or combined circuits designed to perform communication in compliance with multiple communication standards. The wireless communication herein may include a wireless local area network (WLAN) or Wi-Fi communication in accordance with IEEE 802.11 standards; a wireless personal area network (WPAN) communication such as the Bluetooth and ZigBee in accordance with IEEE 802.15 standards, a Radio-Frequency Identification (RFID) communication, a Near-Field Communication (NFC), a ultrasonic communication, an IR communication, and the likes.

The input 104 is coupled to the processor 101. The input 104 is operative to receive a user input made on the input 104 and feed signals indicative of the user input to the processor 101. The input 104 may be a keyboard, keypad, or other similar mechanical key assembly with one or more mechanical keys. The input 104 may also be a touch-screen device integrated with a display, in which case the display 104 is operative to display a graphical user interface through which to receive the user input by detecting touches or taps made by the user onto the surface of the touch-screen device.

The output 105 is coupled to the processor 101. The output 105 is operative to receive, from the processor 101, graphical, visual, audible, or otherwise perceptual data to output video or sound, or otherwise generate perceptual output for notifying the user of some information in relation to the powering device 100. For example, the output 105 may notify the user of the status of the operation of the powering device 100. The output 105 may be a display such as a liquid crystal display (LCD) and an electro-luminance (EL) display for visual output using graphics. The output 105 may also be a lighting or luminance device for visual output using one or more lighting sources each of which emits light in one or more colors. The output 105 may also be a loudspeaker for audible output using one or more tones.

The powering circuitry 106 is coupled to the processor 101. Under control of the processor 101, the powering circuitry 106 is turned on and off to be active or not active. The powering circuitry 106 is operative to wirelessly transfer power to the powered device 200 by providing the powering region 10 in accordance with a wireless power transfer technique. An example of the power transfer technique may be inductive coupling or resonant inductive coupling, in which case the powering circuitry 106 may include a coil of wire and an oscillator. In the example, when the powering circuitry 106 is activated, the oscillator uses power supplied from the power supply 107 to feed a high frequency alternating current (AC) on the coil so that a magnetic filed is created as the non-radiative powering region 10 between the coil and a coil of wire of the powered device 200 (i.e., a coil of wire in an after-mentioned powered circuitry 206). Another example of the power transfer may be capacitive coupling or resonant capacitive coupling, in which case the powering circuitry 106 may include at least one electrode such as a metal plate and an oscillator. In the example, when the powering circuitry 106 is activated, the oscillator uses power supplied from the power supply 107 to apply an alternating voltage on the electrode so that an electric field is created as the non-radiative powering region 10 between the electrode and an electrode of the powered device 200 (i.e., an electrode in after-mentioned powered circuitry 206). Another example of the power transfer may also be electromagnetic waves or sound waves in any frequency and wavelength, such as radio waves, microwaves, and ultrasonic waves, in which case the powering circuitry 106 may include a transmitter operative to emit the corresponding waves to provide the radiative powering region 10 within which a receiver of the powered device 200 (i.e., a receiver in an after-mentioned powered circuitry 206) receives the waves.

The power supply 107 is coupled to the processor 101. The power supply 107 is operative to generate power based on power from a residential or commercial power distribution system via an electrical outlet 20, and to supply the power to all of or at least part of the components of the powering device 100, namely, the components 101 to 106. The power supply 107 may be supplied with power directly through a cable plugged into the outlet 20, or by way of an AC adapter with the cable.

Figure 5:
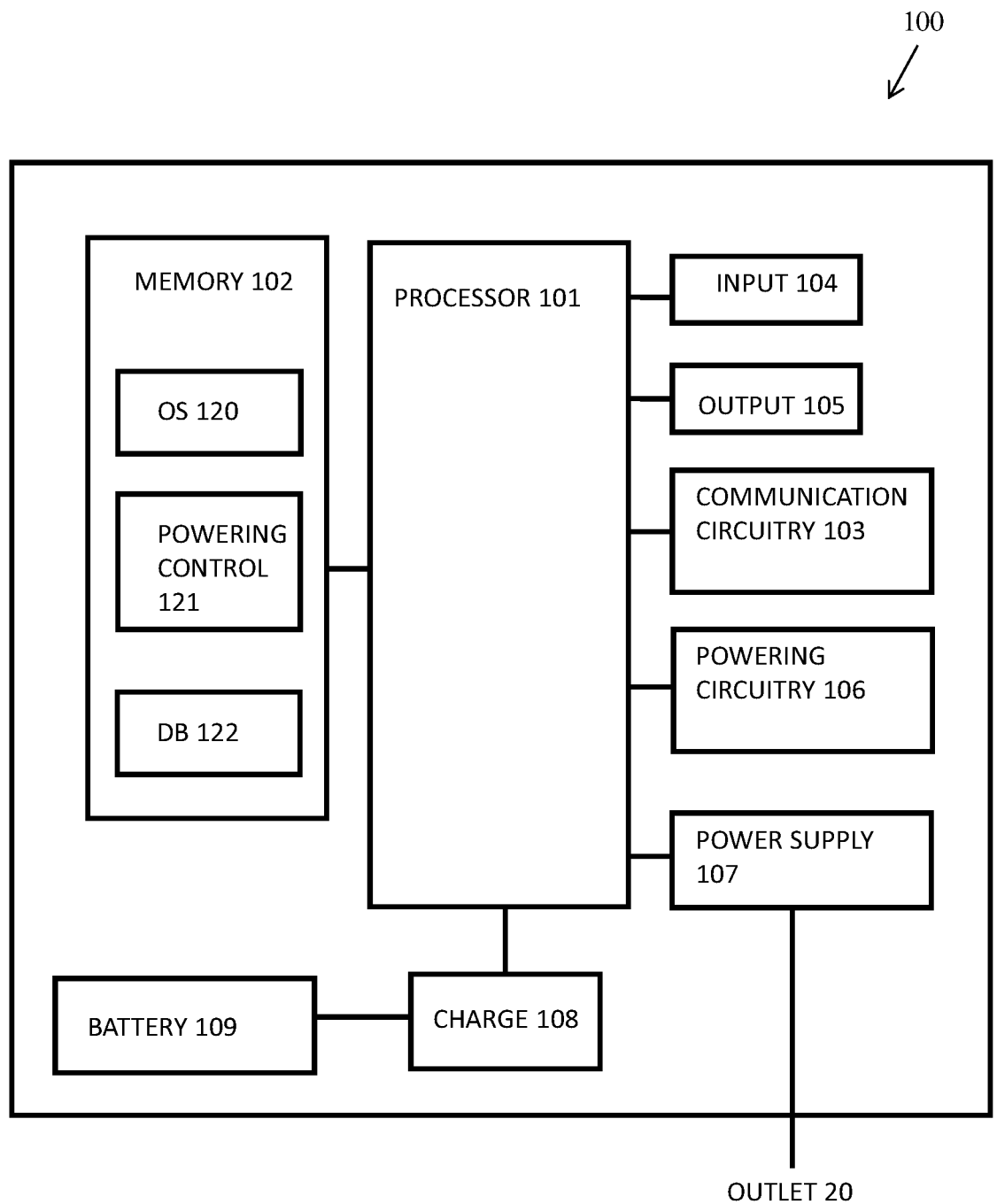
FIG. 5 is a block diagram illustrating an exemplary configuration of a powering device 100 with a battery for battery-powered operation, according to some embodiments of the present invention.

In some embodiments, as depicted in FIG. 5, the powering device 100 may further include charging circuitry 108 and a battery 109 to be battery-operated. The charging circuitry 108 is coupled to the processor 101. The charging circuitry 108 is operative to charge the battery 109 using power supplied from the power supply 107, using a rectifier, voltage controller, and/or other components well known in the art. The battery 109, charged by the charging circuitry 108, is a power source other than the power supply to store the charged power and supply the power to all of or at least part of the components of the powering device 100, namely, the components 101 to 107. The battery 109 may be a battery in any form, including but not limited to a lithium-ion rechargeable battery. In the embodiments, under control of the processor 101, the powering device 100 may operate in either one of a first mode where the powering device 100 is powered by the power supply 107 without being powered by the battery 109 and a second mode where the powering device 100 is powered by the battery 109 without being powered by the power supply 107. The powering device 100 may automatically choose to operate in the first mode when the powering device 100 is plugged into the outlet 20 so the power supply 107 is receiving power via the outlet 20. The powering device 100 may automatically choose to operate in the second mode when the powering device 100 is not plugged into the outlet 20 so the power supply 107 is not receiving power via the outlet 20. More particularly, the processor 101 may automatically change the mode from the first one to the second one in response to detection of termination or failure of power supply via the outlet 20 whereas may automatically change the mode from the second one to the first one in response to detection of initiation or presence of power supply via the outlet 20. Alternatively, the processor 101 may change the mode between the first and second ones in response to a manual user input using the input 104.

Powered Device

Figure 6:
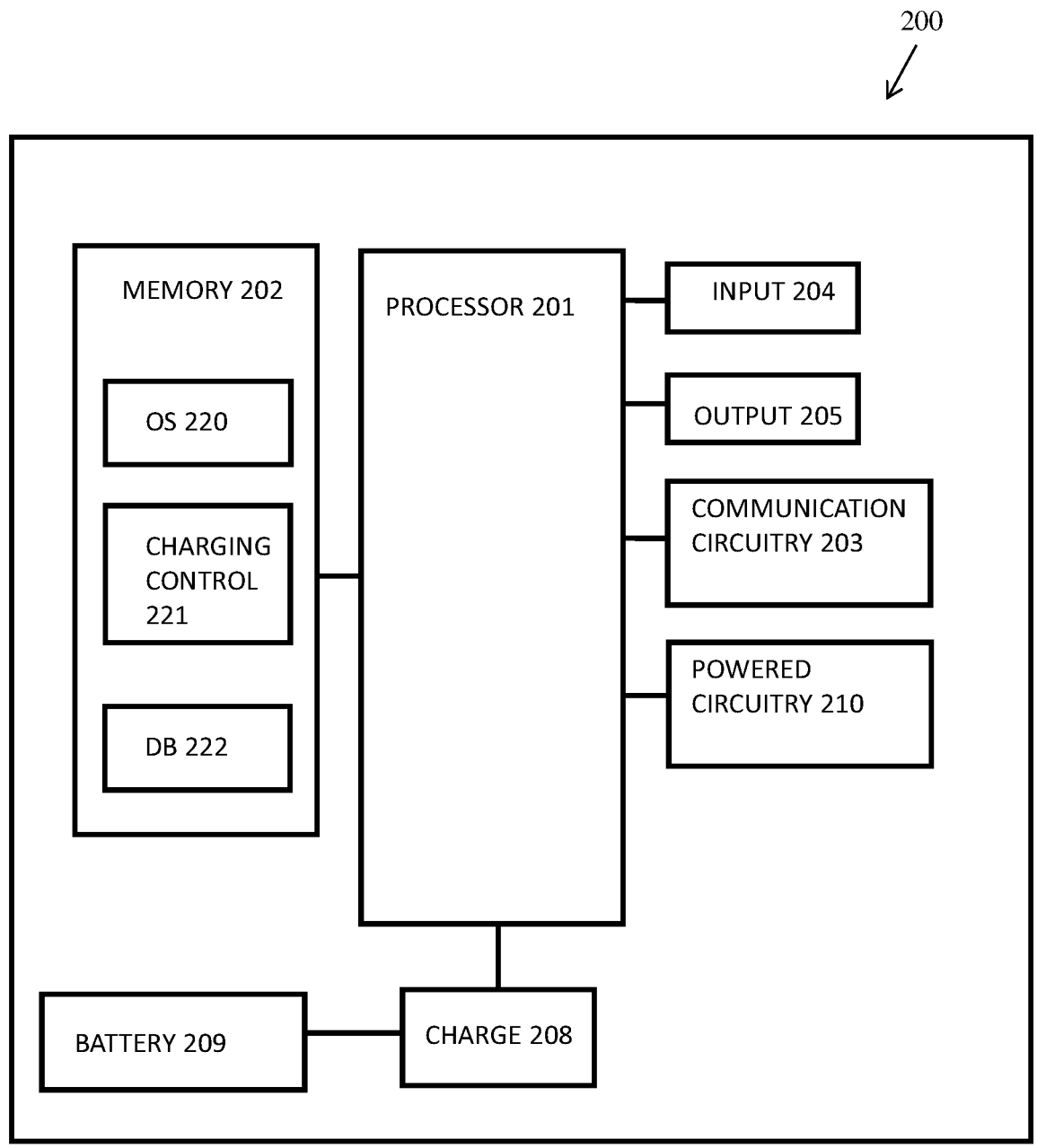
FIG. 6 is a block diagram illustrating an exemplary configuration of a powered device 200, according to some embodiments of the present invention.

In some embodiments, as depicted in FIG. 6, the powered device 200 includes a processor 201, a memory 202, communication circuitry 203, an input 204, an output 205, powered circuitry 210, charging circuitry 208, and a battery 209.

The processor 201 is a processing unit operative to execute computer programs resident on the memory 202 to process various data and to control the components coupled to the processor 201. The processor 201 may be a central processing unit (CPU), a micro processing unit (MPU), a digital signal processor (DSP), another general or dedicated processing unit, or combination thereof.

The memory 202 is coupled to the processor 201 and is operative to store one or more computer programs and/or various data for execution and/or use by the processor 201. The memory 202 may be a read only memory (ROM), a random access memory (RAM), another memorizing component or computer-readable medium, or combination thereof. In some embodiments, the memory 202 stores at least an operating system (OS) 220, a charging control program 221, and a database (DB) 222. The charging control program 221 is an application program configured to run on the OS 220 or part of the OS 220, to control reception of wireless power transfer using the powered circuitry 210. The DB 222 includes information indicative of the identifier of the powered device 200 and/or the identifier of the powering device 100.

The communication circuitry 203 is coupled to the processor 201 and is operative to perform a wireless communication in accordance with at least one wireless communication standard for wireless communication with the powering device 100. The communication circuitry 203 may be a single circuit designed to perform a communication in compliance with a single communication standard, or may be one or more single or combined circuits designed to perform communication in compliance with multiple communication standards. The wireless communication herein may include a wireless local area network (WLAN) or Wi-Fi communication in accordance with IEEE 802.11 standards; a wireless personal area network (WPAN) communication such as the Bluetooth and ZigBee in accordance with IEEE 802.15 standards, a Radio-Frequency Identification (RFID) communication, a Near-Field Communication (NFC), a ultrasonic communication, an IR communication, and the likes.

The input 204 is coupled to the processor 201. The input 204 is operative to receive a user input made on the input 204 and feed signals indicative of the user input to the processor 201. The input 204 may be a keyboard, keypad, or other similar mechanical key assembly with one or more mechanical keys. The input 204 may also be a touch-screen device integrated with a display, in which case the display 204 is operative to display a graphical user interface through which to receive the user input by detecting touches or taps made by the user onto the surface of the touch-screen device.

The output 205 is coupled to the processor 201. The output 205 is operative to receive, from the processor 201, graphical, visual, audible, or otherwise perceptual data to output video or sound, or otherwise generate perceptual output for notifying the user of some information in relation to the powered device 200. For example, the output 205 may notify the user of the status of the operation of the powered device 200. The output 205 may be a display such as a liquid crystal display (LCD) and an electro-luminance (EL) display for visual output using graphics. The output 205 may also be a lighting or luminance device for visual output using one or more lighting sources each of which emits light in one or more colors. The output 205 may also be a loudspeaker for audible output using one or more tones.

The powered circuitry 210 is coupled to the processor 201. Under control of the processor 201, the powered circuitry 210 is turned on and off to be active or not active. The powered circuitry 210 is operative to receive power wirelessly transferred by the powering device 100 within the powering region 10 in accordance with a wireless power transfer technique. An example of the power transfer technique may be inductive coupling or resonant inductive coupling, in which case the powered circuitry 210 may include a coil of wire and a rectifier. In the example, when the powered circuitry 210 is activated, the rectifier rectifies an alternating current generated by the coil within a magnetic field created by the coil of the powering device 100 (i.e., the coil in the above-mentioned powering circuitry 106) to feed the rectified power to the charging circuitry 208. A switch may be provided to enable and disable connection between the coil and the rectifier such that the switch is on to enable the connection when the powered circuitry 210 is activated whereas the switch is off to disable the connection when the powered circuitry 210 is deactivated. Another example of the power transfer may be capacitive coupling or resonant capacitive coupling, in which case the powered circuitry 210 may include at least one electrode such as a metal plate and a rectifier. In the example, when the powered circuitry 210 is activated, the rectifier rectifies an alternating current generated from an electric field created between the electrodes of the powering circuitry 106 and the powered circuitry 21 to feed the rectified power to the charging circuitry 208. A switch may be provided to enable and disable connection between the electrode and the rectifier such that the switch is on to enable the connection when the powered circuitry 210 is activated whereas the switch is off to disable the connection when the powered circuitry 210 is deactivated. Another example of the power transfer may also be electromagnetic waves or sound waves in any frequency and wavelength, such as radio waves, microwaves, and ultrasonic waves, in which case the powered circuitry 210 may include a receiver operative to receive the corresponding waves within the radiative powering region 10.

The charging circuitry 208 is coupled to the processor 201. The charging circuitry 208 is operative to charge the battery 209 using power supplied from the powered circuitry 210, using a rectifier, voltage controller, and/or other components well known in the art.

The battery 209, charged by the charging circuitry 208, is a power source to store the charged power and supply the power to all of or at least part of the components of the powered device 200, namely, the components 201 to 210. The battery 209 may be a battery in any form, including but not limited to a lithium-ion rechargeable battery.

Figure 7:
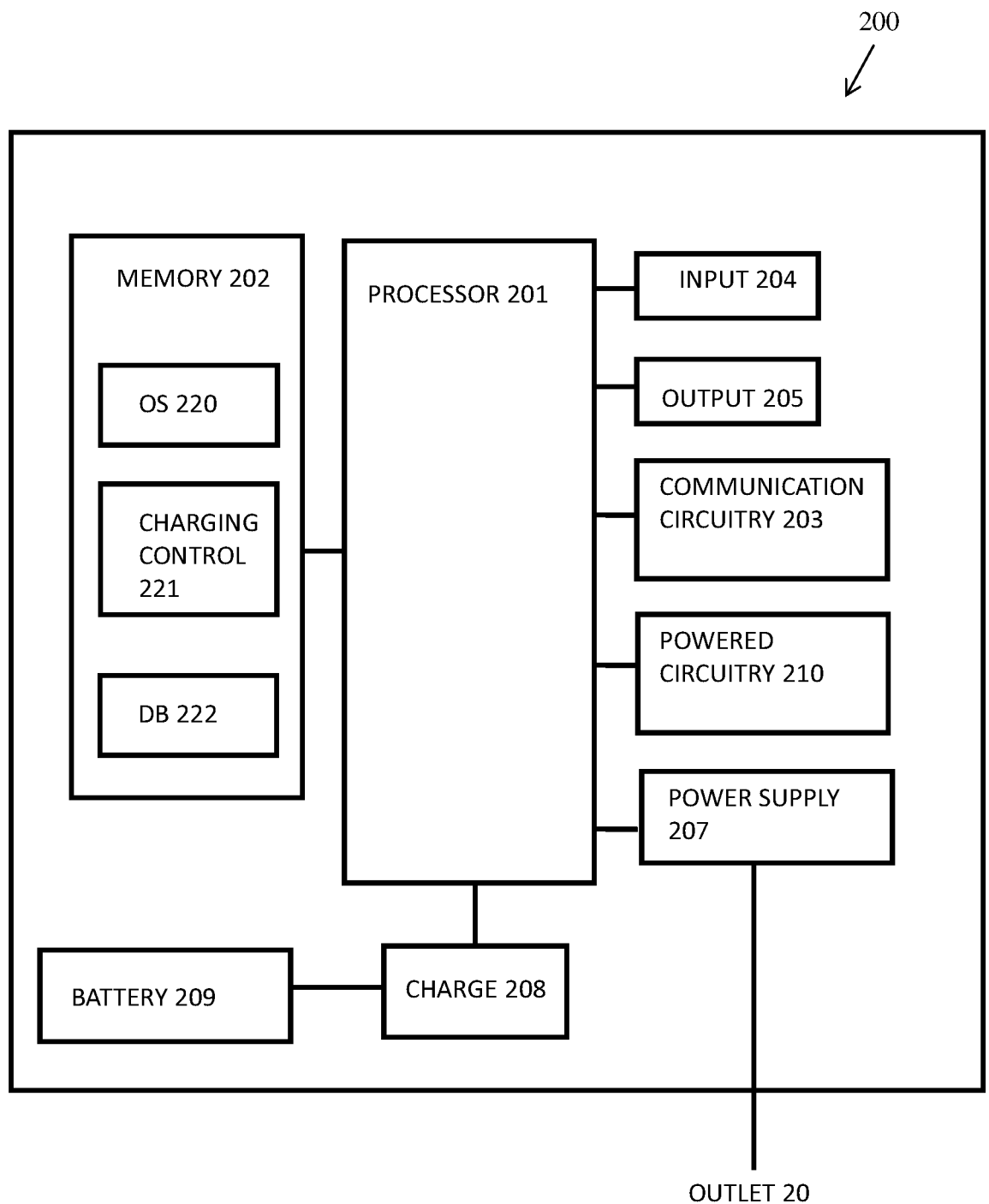
FIG. 7 is a block diagram illustrating an exemplary configuration of a powered device 200 with a power supply for AC-powered operation, according to some embodiments of the present invention.

In some embodiments, as depicted in FIG. 7, the powered device 200 may further include a power supply 207. The power supply 207 is coupled to the processor 201. The power supply 207 is operative to generate power based on power from a residential or commercial power distribution system via an electrical outlet 20, and to supply the power to all of or at least part of the components of the powered device 200, namely, the components 201 to 210. The power supply 207 may be supplied with power directly through a cable plugged into the outlet 20, or by way of an AC adapter with the cable. In the embodiments, under control of the processor 201, the powered device 200 may operate in either one of a first mode where the powered device 200 is powered by the power supply 207 without being powered by the battery 209 and a second mode where the powered device 200 is powered by the battery 209 without being powered by the power supply 207. The powered device 200 may automatically choose to operate in the first mode when the powered device 200 is plugged into the outlet 20 so the power supply 207 is receiving power via the outlet 20. The powered device 200 may automatically choose to operate in the second mode when the powering device 100 is not plugged into the outlet 20 so the power supply 207 is not receiving power via the outlet 20. More particularly, the processor 201 may automatically change the mode from the first one to the second one in response to detection of termination or failure of power supply via the outlet 20 whereas may automatically change the mode from the second one to the first one in response to detection of initiation or presence of power supply via the outlet 20. Alternatively, the processor 201 may change the mode between the first and second ones in response to a manual user input using the input 204.

Figure 8:
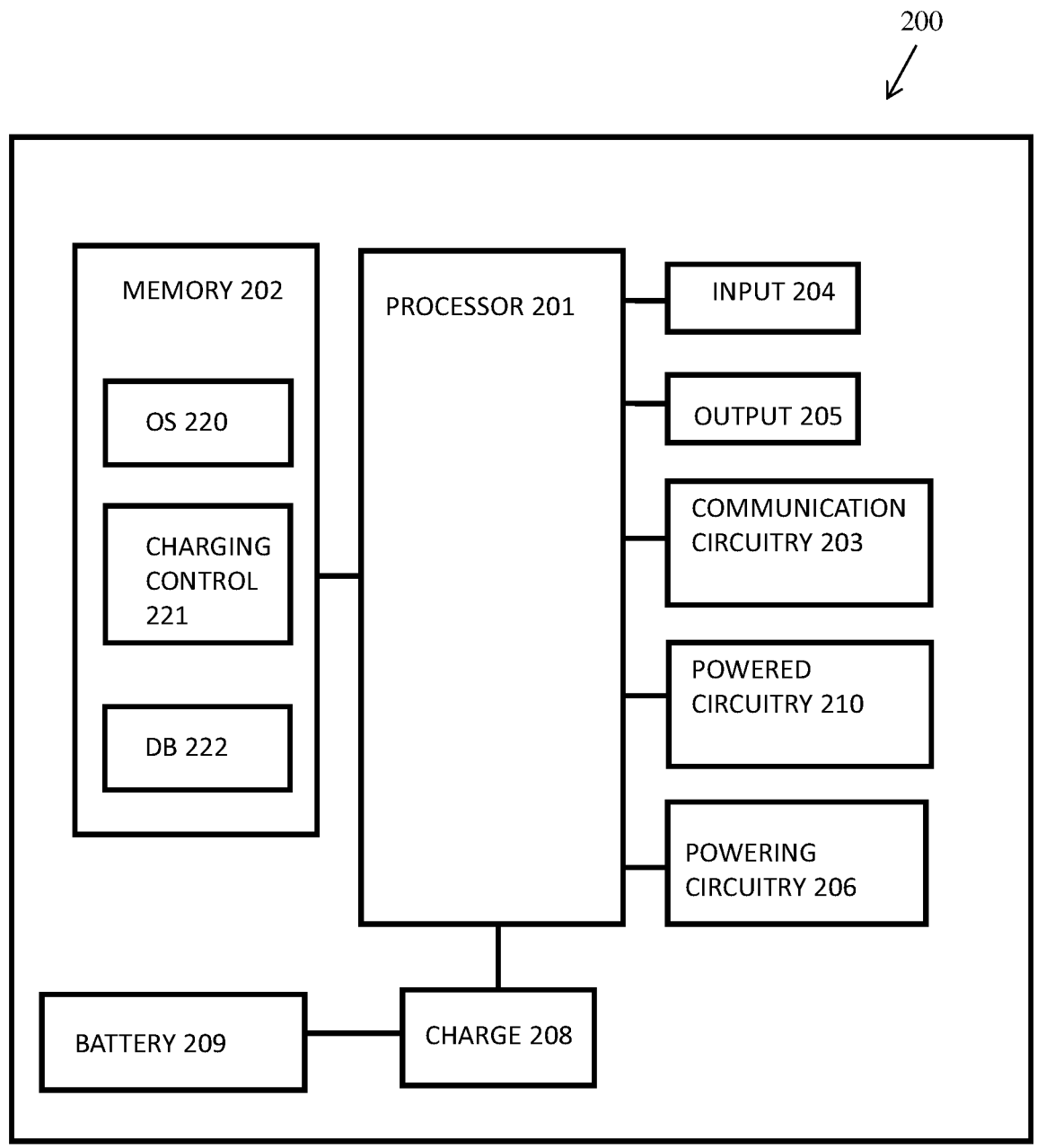
FIG. 8 is a block diagram illustrating an exemplary configuration of a powered device 200 with powering circuitry for wireless power transfer to another powered device, according to some embodiments of the present invention.

In some embodiments, as depicted in FIG. 8, the powered device 200 may further include powering circuitry 206 to be operative not only to receive wireless power transfer but also to provide wireless power transfer to relay wirelessly-received power to another powered device 200. In the embodiments, the powering circuitry 206 may be configured just as the powering circuitry 106 of the powering device 100: Under control of the processor 201, the powering circuitry 206 is turned on and off to be active or not active. The powering circuitry 206 is operative to wirelessly transfer power to another powered device 200 by providing the powering region 10 in accordance with a wireless power transfer technique. An example of the power transfer technique may be inductive coupling or resonant inductive coupling, in which case the powering circuitry 206 may include a coil of wire and an oscillator. In the example, when the powering circuitry 206 is activated, the oscillator uses power generated by the powered circuitry 210 to feed a high frequency alternating current (AC) on the coil so that a magnetic field is created as the non-radiative powering region 10 between the coil and a coil of wire of another powered device 200 (i.e., a coil of wire in powered circuitry 206 of another powered device 200). Another example of the power transfer may be capacitive coupling or resonant capacitive coupling, in which case the powering circuitry 206 may include at least one electrode such as a metal plate and an oscillator. In the example, when the powering circuitry 206 is activated, the oscillator uses power generated by the powered circuitry 210 to apply an alternating voltage on the electrode so that an electric field is created as the non-radiative powering region 10 between the electrode and an electrode of another powered device 200 (i.e., an electrode in powered circuitry 206 of another powered device 200). Another example of the power transfer may also be electromagnetic waves or sound waves in any frequency and wavelength, such as radio waves, microwaves, and ultrasonic waves, in which case the powering circuitry 206 may include a transmitter operative to emit the corresponding waves to provide the radiative powering region 10 within which a receiver of another powered device 200 (i.e., a receiver in powered circuitry 206 of another powered device 200) receives the waves.

DB122 DB222

In some embodiments, the powering device 100 may manage wireless power transfer to the powered device 200 using the DB 122. In the embodiments, the DB 122 may be generated by the processor 101 and stored on the memory 102. The OS 120 or the powering control program 121 may have the computer program instructions for the generation of the DB 122. The DB 122 manages one or more identifiers (IDs) each of which is unique to each powered device 200 for authentication to enable and disable wireless power transfer and for confirmation of the status of operation of each powered device 200. As depicted in FIG. 9, the DB 122 lists each unique ID (ID 1 through ID 5) uniquely assigned to a powered device 200 which is allowed or authorized to receive wireless power transfer from the powering device 100. The DB 122 may indicate, for example as depicted in the column 122a, the communication status for each listed powered device 200 where "yes" is entered for each ID of powered devices 200 which are in communication with the powering device 100 while "No" is entered for each ID of powered devices 200 which are not in communication with the powering device 100. The DB 122 may also indicate the status of reception of wireless power transfer for each listed powered device 200. As depicted in the column 122b, examples of the status include "charging" indicating that the corresponding powered device 200 is receiving wireless power transfer from the powering device 100 and charging the battery 209; "standby" indicating that the corresponding powered device 200 is ready for reception of wireless power transfer within the powering region 10 but is not receiving the wireless power transfer; and "N/A" indicating that the corresponding powered device 200 is not found within the powering region 10.

In some embodiments, the powered device 200 may manage reception of wireless power transfer from the powering device 100 using the DB 222. In the embodiments, the DB 222 may be generated by the processor 201 and stored on the memory 202. The OS 220 or the charging control program 221 may have the computer program instructions of the generation of the DB 222. The DB 222 manages one or more identifiers (IDs) each of which is unique to each powering device 100 for authentication to enable and disable reception of wireless power transfer. As depicted in FIG. 9, the DB 222 lists each unique ID (ID A through ID E) uniquely assigned to a powering device 100 from which the powered device 200 is allowed or authorized to receive wireless power transfer.

At least one of the DBs 122 and 222 may be generated by way of, upon, or in response to pairing of the powering device 100 and the powered device 200 through a wireless communication using the communication circuitry 103 and 203. The pairing may include the powering device 100 and the powered device 200 discovering one another by inter-communicating their respective unique IDs and/or other data related to security assurance with one another within a range of the wireless communication.

Pairing/Discovery Process

Figure 10:
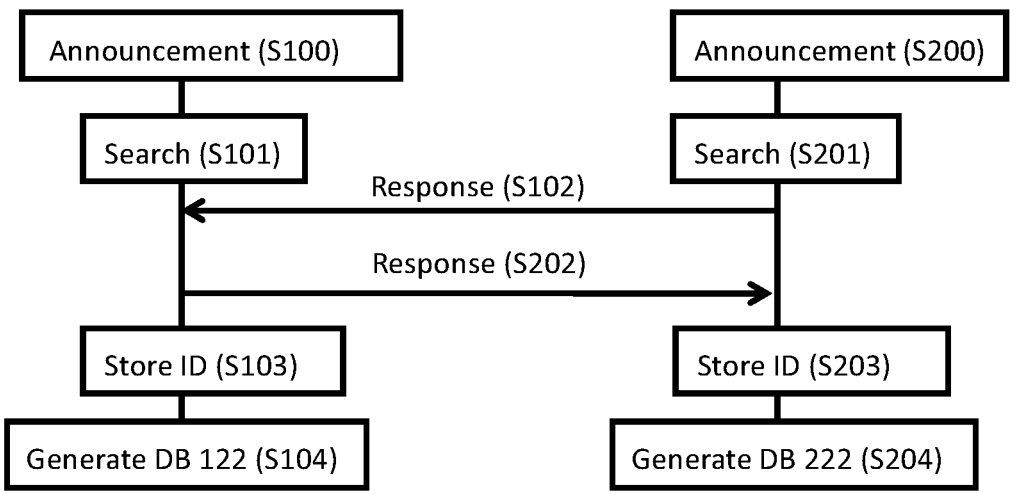
FIG. 10 is a flowchart illustrating a process for the powering device 100 and the powered device 200 discovering each other, according to some embodiments of the present invention.

An example of the pairing includes pairing by a known discovery process including but not limited to a Web Service Dynamic Discovery (WSD) approved by Organization for the Advancement of Structured Information Standards (OASIS); Domain Name System (DNS)-based Service Discovery (DSN-SD) such as multicast DNS (mDNS) published as RFC 6762, Simple Service Discovery Protocol (SSDP) used in Universal Plug And Play (UPnP), Service Discovery Protocol (SDP) used in Bluetooth; and the likes. Typically, as depicted in FIG. 10, the discovery process may be achieved by way of announcement, advertisement, or notification of the presence by the powering device 100 and the powered device 200 using a multicast message (S100, S200); search for devices of interest by the powering device 100 and the powered device 200 using a multicast message (S101, S201); and response to the search by the powering device 100 and the powered device 200 using a unicast message (S102, S202). The discovery process may be performed, for example, through various wireless communications using the communication circuitry 103 and 203, such as a wireless local area network (WLAN) or Wi-Fi communication in accordance with IEEE 802.11 standards; a wireless personal area network (WPAN) communication such as the Bluetooth and ZigBee in accordance with IEEE 802.15 standards, a RFID communication, a NFC, a ultrasonic communication, an IR communication, and the likes. The discovery process may enable the powering device 100 and the powered device 200 to know the presence of one another and exchange the identifications, such as the media access control (MAC) addresses, IP addresses, Bluetooth Device (BD) addresses, Unique Identifiers (UID), uniquely assigned names, and other identification information depending at least in part on the wireless communication standard pursuant to which the communication circuitry 103 and 203 communicate. The discovery process may finish by the powering device 100 and the powered device 200 storing the exchanged IDs on the memories 102 and 202, respectively (S103, S203). The DBs 122 and 222 may be generated by the processors 101 and 201, respectively, upon or in response to the completion of the discovery process (S104, S204). The OS 120 or the powering control program 121 may have the computer program instructions for the steps S100 to S104 while the OS 220 or the charging control program 221 may have the computer program instructions for the steps S200 to S204.

Figure 11:
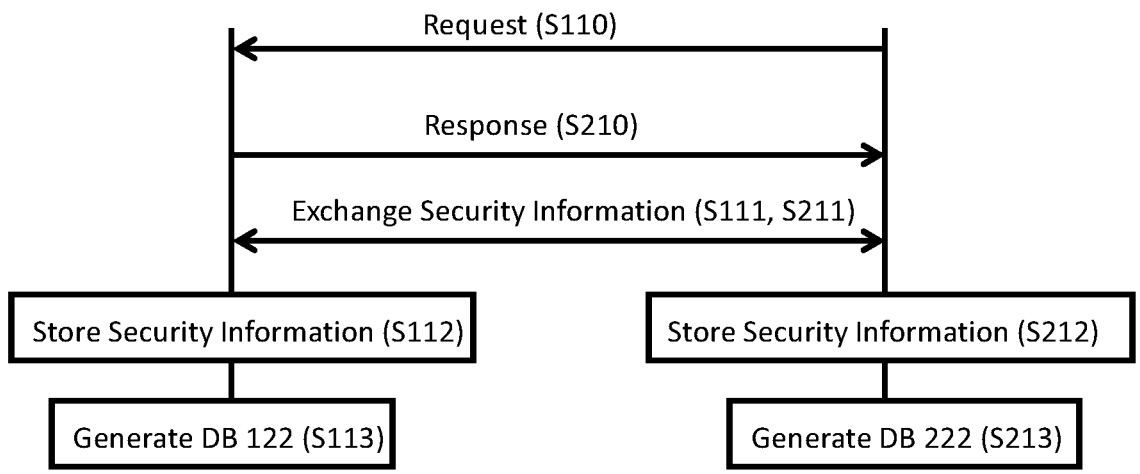
FIG. 11 is a flowchart illustrating a process for the powering device 100 and the powered device 200 discovering each other, according to some embodiments of the present invention.

Another example of the pairing includes pairing by way of exchange or share of security information such as a common encrypted key between the powering device 100 and the powered device 200, following the discovery process, followed by the discovery process, or in the course of the discovery process. Typically, as depicted in FIG. 11, the security information exchange process may be achieved by way of a request for the security information exchange by the powered device 200 operative as a slave (S110); a response to the request by the powering device 100 operative as a master (S210); and exchange of the security information between the powering device 100 and the powered device 200 (S111, S211). An example of the security information exchange includes pairing by exchange of a common encrypted key known as a Personal Information Number (PIN) or link key, in accordance with Bluetooth standard. The security information exchange process may finish by the powering device 100 and the powered device 200 storing the exchanged security information on the memories 102 and 202, respectively (S112, S212). The DB s 122 and 222 may be generated by the processors 101 and 201, respectively, upon or in response to the completion of the security information exchange process (S113, S213). The OS 120 or the powering control program 121 may have the computer program instructions for the steps S110 to S113 while the OS 220 or the charging control program 221 may have the computer program instructions for the steps S210 to S213.

In some embodiments, at least one of the DB s 122 and 222 may be generated manually by a user. In the embodiments, the powering device 100 may receive a user input through the input 104 to enter the ID of the powered device 200, and in response to the input, generate the DB 122 by associating the entered ID with the ID of the powering device 100. Similarly, the powered device 200 may receive a user input through the input 204 to enter the ID of the powering device 100, and in response to the input, generate the DB 222 by associating the entered ID with the ID of the powered device 200.

Power Transfer Peocesses

The following describes the detailed embodiments of wireless power transfer from the powering device 100 to the powered device 200 and/or between the powered devices 200.

FIG. 12 depicts an example of a detailed wireless power transfer process 400 according to some embodiments where wireless power transfer may be accomplished between the powering device 100 and the powered device 200 all the time. In the embodiments, as depicted in FIG. 12, the powering device 100 continuously remains the powering circuitry 106 active irrespective of or regardless of any request from the powered device 200 to continuously perform wireless power transfer (S1000). In other words, the powering device 100 may provide the powering region 10 all the time once the powered device 200 is within the range of the powering region 10. In the embodiments, the powered device 200 remains the powered circuitry 210 active all the time for reception of wireless power transfer (S2000), and continuously, periodically, or intermittently determines whether or not the powered device 200 is receiving wireless power transfer through the powered circuitry 210 to charge the battery 209 (S2001). The determination at the step S2001 may be achieved by determining whether or not the battery 209 is being charged by the charging circuitry 208 using power generated by the powered circuitry 210. The powered device 200 then indicates the status of reception of wireless power transfer depending on the determination result by use of the output 205 (S2002, S2003). Upon determining affirmatively, namely, determining that the battery 209 is being charged by the charging circuitry 208 using power generated by the powered circuitry 210 (S2001: Yes), the powered device 200 provides an indication showing that the powered device 200 is in a "Wireless Charging" mode where the powered device 200 is wirelessly charging the battery 209 using the powered circuitry 210 (S2002), whereas upon determining negatively, namely, determining that the battery 209 is not being charged by the charging circuitry 208 using power generated by the powered circuitry 210 (S2001: No), the powered device 200 provides an indication showing that the powered device 200 is in a "No Power" mode where the powered device 200 is not wirelessly charging the battery 209 using the powered circuitry 210 (S2003). For the process 400, the powering control program 121 may have the computer program instructions for the step S1000 while the charging control program 221 may have the computer program instructions for the steps S2000 to S2003.

FIG. 13 depicts an example of a detailed wireless power transfer process 401 according to some embodiments where wireless power transfer may be accomplished between the powering device 100 and the powered device 200 when the powered device 200 has a low battery level in the battery 209. In the embodiments, as depicted in FIG. 13, the powering device 100 continuously remains the powering circuitry 106 active irrespective of or regardless of any request from the powered device 200 to continuously perform wireless power transfer (S1010). In other words, the powering device 100 may provide the powering region 10 all the time once the powered device 200 is within the range of the powering region 10. In the embodiments, the powered device 200 with the powered circuitry 210 deactivated in a "No Power" mode where the powered device 200 is not wirelessly charging the battery 209, continuously, periodically, or intermittently monitors the battery level of the battery 209 by, for example, determining whether or not the battery level is sufficient above a first predetermined threshold while the powered circuitry 210 is not active (S2010). As long as the battery level is determined to be above the first predetermined threshold (S2010: Yes), the powered device 200 remains the powered circuitry 210 deactivated. Upon determining the battery level to be insufficient below the first predetermined threshold (S2010: No), the powered device 200 activates the powered circuitry 210 (S2011). Once the powered circuitry 210 is activated, the powered device 200 determines whether or not the battery 209 is being charged by the charging circuitry 208 using power generated by the powered circuitry 210 (S2012). If the battery 209 is determined to be not being charged by the charging circuitry 208 using power generated by the powered circuitry 210 (S2012: No), the powered device 200 provides an indication showing that the powered device 200 is in a "Standby" mode where the powered device 200 is not wirelessly charging the battery 209 while the powered circuitry 210 is activated and expecting the wireless charging will soon start (S2013). If the battery 209 is determined to be being charged by the powered circuit 210 (S2012; Yes), the powered device 200 provides an indication showing that the powered device 200 is in a "Wireless Charging" mode where the powered device 200 is wirelessly charging the battery 209 using the powered circuitry 210 (S2014). When in the "Wireless Charging" mode, the powered device 200 continuously, periodically, or intermittently monitors the battery level of the battery 209 by, for example, determining whether or not the battery level is sufficient above a second predetermined threshold (S2015). Preferably, the second predetermined threshold is set to be higher than the first predetermined threshold: For example, the first threshold may be set to be very low below the middle between the empty level and the fully-charged level, whereas the second threshold may be set to be relatively high near the fully-charged level of the battery 209. As long as the battery level of the battery 209 is determined to be below the second predetermined threshold, meaning that the battery 209 has been not yet charged sufficiently (S2015: No), the powered device 200 remains the powered circuitry 210 activated in order for the battery 209 to be charged through the powered circuitry 210. Upon determining that the battery level is above the second predetermined level as a result of the battery 209 being charged sufficiently (S2015: Yes), the powered device 200 deactivates the powered circuitry 210 (S2016). The powered device 200 then provides an indication showing that the powered device 200 is now in a "No Power" mode where the powered device 200 is not wirelessly receiving power transfer for charging the battery 209 (S2017), and returns to the battery level determination at the step S2010. For the process 401, the powering control program 121 may have the computer program instructions for the step S1010 while the charging control program 221 may have the computer program instructions for the steps S2010 to S2017.

FIG. 14 depicts an example of a detailed wireless power transfer process 402 according to some embodiments where wireless power transfer may be accomplished and kept on the condition that the powered device 200 responds to wireless power transfer provided by the powering device 100. In the embodiments, as depicted in FIG. 14, the powering device 100 first operates in a "Beacon" mode where the powering device 100 does not remains the powering circuitry 106 always activated but instead just intermittently and instantaneously activates the powering circuitry 106 to "beacon" wireless power transfer (S1020). At the step S1020, the powering device 100 may provide an instantaneous wireless power transfer once in every predetermined beacon period. In the "Beacon" mode, the powering device 100 waits for a response to be received by the communication circuitry 103 from the powered device 200 (S1021). The response is designed as a responsive signal to be broadcasted by the powered device 200 through the communication circuitry 203 in response to the powered device 200 receiving the wireless power transfer. Absence of the response keeps the powering device 100 operative in the "Beacon" mode (S1021: No). In response to reception of the response through the communication circuitry 103 (S1021: Yes), the powering device 100 initiates continuous activation of the powering circuitry 106 to operate in a "Powering" mode (S1022). In the "Powering" mode, the powering device 100 remains the powering circuitry 106 active to continuously provide wireless power transfer. In the "Powering" mode, the powering device 100 continuously monitors reception of the responses through the communication circuitry 103 from the powered device 200 (S1023). A response is expected to be broadcasted by the powered device 200 every time the powered device 200 receives wireless power transfer or once in a predetermined period as long as the powered device 200 is receiving wireless power transfer. As long as the powering device 100 successfully receives the responses through the communication circuitry 103, the powering device 100 remains operation in the "Powering" mode (S1023: Yes). Upon failing to receive a predetermined number of responses (S1023: No), the powering device 100 stops continuous activation of the powering circuitry 106 to operate back in the "Beacon" mode (S1024). In the embodiments, the powered device 200 remains the powered circuitry 210 active for reception of wireless power transfer all the time (S2020), and continuously, periodically, or intermittently determines whether or not the powered device 200 is receiving wireless power transfer through the powered circuitry 210 to charge the battery 209 (S2021). The determination at the step S2021 may be achieved by determining whether or not the battery 209 is being charged by the charging circuitry 208 using power generated by the powered circuitry 210. The powered device 200 then indicates the status of reception of wireless power transfer depending on the determination result by use of the output 205 (S2022, S2024). Upon determining affirmatively, namely, determining that the battery 209 is being charged by the charging circuitry 208 using power generated by the powered circuitry 210 (S2021: Yes), the powered device 200 provides an indication showing that the powered device 200 is in a "Wireless Charging" mode where the powered device 200 is wirelessly charging the battery 209 using the powered circuitry 210 (S2022), whereas upon determining negatively, namely, determining that the battery 209 is not being charged by the charging circuitry 208 using power generated by the powered circuitry 210 (S2021: No), the powered device 200 provides an indication showing that the powered device 200 is in a "No Power" mode where the powered device 200 is not wirelessly charging the battery 209 using the powered circuitry 210 (S2024). In the "Wireless Charging" mode, the powered device 200 continuously, periodically, or intermittently broadcasts response, namely, responsive signals designed to be broadcasted in response to reception of wireless power transfer using the communication circuitry 203 (S2023). According to the steps S1020 to S1024 and the steps S2020 to S2024, the continuous wireless power transfer is initiated when the powered device 200 comes in the powering region 10 and responds to the beaconed wireless power transfer. Thereafter, the continuous wireless power transfer is terminated when the powered device 200 departs from the powering region 10 and cannot respond to the continuous power transfer. For the process 402, the powering control program 121 may have the computer program instructions for the steps S1020 to S1024 while the charging control program 221 may have the computer program instructions for the steps S2020 to S2024.

FIG. 15 depicts an example of a detailed wireless power transfer process 403 according to some embodiments where wireless power transfer may be accomplished and kept on the condition that the powered device 200 responds to wireless power transfer provided by the powering device 100. In the embodiments, as depicted in FIG. 15, the powering device 100 first operates in a "Beacon" mode where the powering device 100 does not remains the powering circuitry 106 always activated but instead just intermittently and instantaneously activates the powering circuitry 106 to "beacon" wireless power transfer (S1030). At the step S1030, the powering device 100 may provide an instantaneous wireless power transfer once in every predetermined beacon period. In the "Beacon" mode, the powering device 100 waits for a response to be received by the communication circuitry 103 from the powered device 200 (S1031). The response is designed as a responsive signal to be broadcasted by the powered device 200 through the communication circuitry 203 in response to the powered device 200 receiving the wireless power transfer. Absence of the response keeps the powering device 100 operative in the "Beacon" mode (S1031: No). In response to reception of the response through the communication circuitry 103 (S1031: Yes), the powering device 100 initiates continuous activation of the powering circuitry 106 to operate in a "Powering" mode (S1032). In the "Powering" mode, the powering device 100 remains the powering circuitry 106 active to continuously provide wireless power transfer. In the "Powering" mode, the powering device 100 continuously monitors reception of the responses through the communication circuitry 103 from the powered device 200 (S1033). A response is expected to be broadcasted by the powered device 200 every time the powered device 200 receives wireless power transfer or once in a predetermined period as long as the powered device 200 is receiving wireless power transfer. As long as the powering device 100 successfully receives the responses through the communication circuitry 103, the powering device 100 remains operation in the "Powering" mode (S1033: Yes). Upon failing to receive a predetermined number of responses (S1033: No), the powering device 100 stops continuous activation of the powering circuitry 106 to operate back in the "Beacon" mode (S1034). In the embodiments, the powered device 200 with the powered circuitry 210 deactivated in a "No Power" mode where the powered device 200 is not wirelessly charging the battery 209, continuously, periodically, or intermittently monitors the battery level of the battery 209 by, for example, determining whether or not the battery level is sufficient above a first predetermined threshold while the powered circuitry 210 is not active (S2030). As long as the battery level is determined to be above the first predetermined threshold (S2030: Yes), the powered device 200 remains the powered circuitry 210 deactivated. Upon determining the battery level to be insufficient below the first predetermined threshold (S2030: No), the powered device 200 activates the powered circuitry 210 (S2031). While the powered circuitry 210 is activated, the powered device 200 determines whether or not the battery 209 is being charged by the charging circuitry 208 using power generated by the powered circuitry 210 (S2032). If the battery 209 is determined to be not being charged by the charging circuitry 208 using power generated by the powered circuitry 210 (S2032: No), the powered device 200 provides an indication showing that the powered device 200 is in a "Standby" mode where the powered device 200 is not wirelessly charging the battery 209 while the powered circuitry 210 is activated and expecting the wireless charging will soon start (S2033). If the battery 209 is determined to be being charged by the powered circuit 210 (S2032; Yes), the powered device 200 provides an indication showing that the powered device 200 is in a "Wireless Charging" mode where the powered device 200 is wirelessly charging the battery 209 using the powered circuitry 210 (S2034). In the "Wireless Charging" mode, the powered device 200 continuously, periodically, or intermittently broadcasts response, namely, responsive signals designed to be broadcasted in response to reception of wireless power transfer using the communication circuitry 203 (S2035). Also, in the "Wireless Charging" mode, the powered device 200 continuously, periodically, or intermittently monitors the battery level of the battery 209 by, for example, determining whether or not the battery level is sufficient above a second predetermined threshold (S2036). Preferably, the second predetermined threshold is set to be higher than the first predetermined threshold: For example, the first threshold may be set to be very low below the middle between the empty level and the fully-charged level, whereas the second threshold may be set to be relatively high near the fully-charged level of the battery 209. As long as the battery level of the battery 209 is determined to be below the second predetermined threshold, meaning that the battery 209 has been not yet charged sufficiently (S2036: No), the powered device 200 remains the powered circuitry 210 activated in order for the battery 209 to be charged through the powered circuitry 210. Upon determining that the battery level is above the second predetermined level as a result of the battery 209 having been charged sufficiently (S2036: Yes), the powered device 200 deactivates the powered circuitry 210 (S2037). The powered device 200 then provides an indication showing that the powered device 200 is now in a "No Power" mode where the powered device 200 is not wirelessly receiving power transfer for charging the battery 209 (S2038), and returns to the battery level determination at the step S2030. According to the steps S1030 to S1034 and the steps S2030 to S2038, the powered device 200 responds to the beaconed wireless power transfer to make the powering device 100 start continuous wireless power transfer when the powered device 200 finds the battery 209 running short below the first predetermined level, whereas the powered device 200 does not make the powering device 100 start the continuous wireless power transfer even if the powered device 200 is within the range of the powering region 10 when the level of the battery 209 is sufficient. For the process 403, the powering control program 121 may have the computer program instructions for the steps S1030 to S1034 while the charging control program 221 may have the computer program instructions for the steps S2030 to S2038.

FIG. 16 depicts an example of a detailed wireless power transfer process 404 according to some embodiments where wireless power transfer may be initiated in response to the powering device 100 and the powered device 200 discovering each other through a communication using the communication circuitry 103 and 203. In the embodiments, the powering device 100 operates in a "No Powering" mode where the powering device 100 does not provide wireless power transfer by remaining the powering circuitry 106 deactivated until a discovery, such as one in accordance with a discovery process as described above with reference to FIGS. 10 and 11, occurs. As depicted in FIG. 16, upon discovering the powered device 200 through the communication circuitry 103 in accordance with a discovery process (S1040), the powering device 100 initiates continuous activation of the powering circuitry 106 to operate in a "Powering" mode (S1041). In the "Powering" mode, the powering device 100 remains the powering circuitry 106 active to continuously provide wireless power transfer. In the "Powering" mode, the powering device 100 continuously, periodically, or intermittently determines whether or not the powering device 100 keeps discovering the powered device 200 (S1042). The powered device 200 is expected to be continuously discovered by the powering device 100 as long as the powered device 200 is near the powering device 100 enough for successful establishment of the communication through the communication circuitry 103 and 203. As long as the powering device 100 successfully discovers the powered device 200, the powering device 100 remains operation in the "Powering" mode (S1042: Yes). Upon failing to discover the powered device 200 (S1042: No), the powering device 100 stops continuous activation of the powering circuitry 106 to operate back in the "No Powering" mode (S1043). In the embodiments, the powered device 200, with the powered circuitry 210 deactivated, operates in a "No Power" mode where the powered device 200 is not wirelessly charging the battery 209 using the powered circuitry 210 until a discovery, such as one in accordance with a discovery process as described above with reference to FIGS. 10 and 11, occurs. As depicted in FIG. 16, upon discovering the powering device 100 through the communication circuitry 203 (S2040), the powered device 200 activates the powered circuitry 210 for reception of wireless power transfer (S2041). Upon activation of the circuitry 210, the powered device 200 provides, using the output 205, an indication showing that the powered device 200 is in a "Standby" mode where the powered device 200 is expecting that the wireless charging will start soon because the powering device 100 is sufficiently near the powered device 200 (S2042). In the "Standby" mode, the powered device 200 continuously, periodically, or intermittently determines whether or not the battery 209 is being charged by the charging circuitry 208 using power generated by the powered circuitry 210 (S2043). As long as the battery 209 is determined to be being charged by the charging circuitry 208 using power generated by the powered circuitry 210 (S2043; Yes), the powered device 200 provides, using the output 205, an indication showing that the powered device 200 is in a "Wireless Charging" mode where the powered device 200 is wirelessly charging the battery 209 using the powered circuitry 210 (S2044). If the battery 209 is determined to be not being charged by the charging circuitry 208 using power generated by the powered circuitry 210 (S2043: No), the process 404 goes to a process 500 as depicted in FIG. 17.

The process 500 starts by determination as to whether or not the powered device 200 is discovering the powering device 100 through the communication using the communication circuitry 203 (S2050). Upon determining that the powered device 200 is discovering the powering device 100 (S2050: Yes), the powered device 200 provides an indication showing that the powered device 200 is in the "Standby" mode where the powered device 200 is not wirelessly charging the battery 209 but expecting that the wireless charging will start soon because the powering device 100 is sufficiently near the powered device 200 (S2051), and then the process 500 returns to the process 404 at the step S2043. On the contrary, upon determining that the powered device 200 is no longer discovering the powering device 100 (S2050: No), the powered device 200 deactivates the powered circuitry 210 (S2052), and provides an indication showing that the powered device 200 is in a "No Power" mode where the powered device 200 is not wirelessly charging the battery 209 (S2053). The process 500 ends at the step S2053, and the process 404 does not proceed until the powered device 200 discovers the powering device 100 again at the step S2040. For the process 404, the powering control program 121 may have the computer program instructions for the steps S1040 to S1043 while the charging control program 221 may have the computer program instructions for the steps S2040 to S2044. For the process 500, the charging control program 221 may have the computer program instructions for the steps S2050 to S2053.

FIG. 18 depicts an example of a detailed wireless power transfer process 406 according to some embodiments where wireless power transfer may be accomplished in response to the battery level of the battery 209 running short when the powering device 100 and the powered device 200 have discovered each other through a communication using the communication circuitry 103 and 203. In the embodiments, the powering device 100 operates in a "No Powering" mode where the powering device 100 does not provide wireless power transfer by remaining the powering circuitry 106 deactivated until a discovery, such as one in accordance with a discovery process as described above with reference to FIGS. 10 and 11, occurs. As depicted in FIG. 18, upon discovering the powered device 200 through the communication circuitry 103 in accordance with a discovery process (S1060), the powering device 100 initiates continuous activation of the powering circuitry 106 to operate in a "Powering" mode (S1061). In the "Powering" mode, the powering device 100 remains the powering circuitry 106 active to continuously provide wireless power transfer. In the "Powering" mode, the powering device 100 continuously, periodically, or intermittently determines whether or not the powering device 100 keeps discovering the powered device 200 (S1062). The powered device 200 is expected to be continuously discovered by the powering device 100 as long as the powered device 200 is near the powering device 100 enough for successful establishment of the communication through the communication circuitry 103 and 203. As long as the powering device 100 successfully discovers the powered device 200, the powering device 100 remains operation in the "Powering" mode (S1062: Yes). Upon failing to discover the powered device 200 (S1062: No), the powering device 100 stops continuous activation of the powering circuitry 106 to operate back in the "No Powering" mode (S1063). In the embodiments, the powered device 200, with the powered circuitry 210 deactivated, operates in a "No Power" mode where the powered device 200 is not wirelessly charging the battery 209 using the powered circuitry 210 until a discovery, such as one in accordance with a discovery process as described above with reference to FIGS. 10 and 11, occurs. As depicted in FIG. 18, upon discovering the powering device 100 through the communication circuitry 203 (S2060), the powered device 200 provides an indication, using the output 205, showing that the powered device 200 is now operating in a "Standby" mode where the powered device 200 is ready for activation of the powered circuitry 210 (S2061). In the "Standby" mode, the powered device 200 continuously, periodically, or intermittently monitors the battery level of the battery 209 by, for example, determining whether or not the battery level is sufficient above a first predetermined threshold (S2062). As long as the battery level is determined to be above the first predetermined threshold (S2062: Yes), the powered device 200 remains the powered circuitry 210 deactivated. Upon determining the battery level to be insufficient below the first predetermined threshold (S2062: No), the powered device 200 activates the powered circuitry 210 (S2063). While the powered circuitry 210 is activated, the powered device 200 continuously, periodically, or intermittently determines whether or not the battery 209 is being charged by the charging circuitry 208 using power generated by the powered circuitry 210 (S2064). As long as the battery 209 is determined to be being charged by the charging circuitry 208 using power generated by the powered circuitry 210 (S2064: Yes), the powered device 200 provides an indication, using the output 205, showing that the powered device 200 is in a "Wireless Charging" mode where the powered device 200 is wirelessly charging the battery 209 using the powered circuitry 210 (S2065). If the battery 209 is determined to be not being charged by the charging circuitry 208 using power generated by the powered circuitry 210 (S2064: No), the process 406 goes to the process 500 as discussed above with reference to FIG. 17. In the embodiments, the process 500 returns to the process 406 at the step S2064. In the embodiments, if the process 500 ends at the step S2053, the process 406 does not proceed until the powered device 200 discovers the powering device 100 again at the step S2060. In the "Wireless Charging" mode, the powered device 200 continuously, periodically, or intermittently monitors the battery level of the battery 209 by, for example, determining whether or not the battery level is sufficient above a second predetermined threshold (S2066). Preferably, the second predetermined threshold is set to be higher than the first predetermined threshold: For example, the first threshold may be set to be very low below the middle between the empty level and the fully-charged level, whereas the second threshold may be set to be relatively high near the fully-charged level of the battery 209. As long as the battery level of the battery 209 is determined to be below the second predetermined threshold, meaning that the battery 209 has been not yet charged sufficiently (S2066: No), the powered device 200 remains the powered circuitry 210 activated in order for the battery 209 to be charged through the powered circuitry 210. Upon determining that the battery level is above the second predetermined level as a result of the battery 209 having been charged sufficiently (S2066: Yes), the powered device 200 deactivates the powered circuitry 210 (S2067) to operate back in the "Standby" mode (S2061). For the process 406, the powering control program 121 may have the computer program instructions for the steps S1060 to S1063 while the charging control program 221 may have the computer program instructions for the steps S2060 to S2067.

FIG. 19 depicts an example of a detailed wireless power transfer process 407 according to some embodiments where wireless power transfer may be initiated in response to an explicit request from the powered device 200 when the battery level of the battery 209 has run short. In the embodiments, the powering device 100 operates in a "No Powering" mode where the powering device 100 does not provide wireless power transfer by remaining the powering circuitry 106 deactivated until a discovery, such as one in accordance with a discovery process as described above with reference to FIGS. 10 and 11, occurs. As depicted in FIG. 19, upon discovering the powered device 200 through the communication circuitry 103 in accordance with a discovery process (S1070), the powering device 100 operates in a "Standby" mode where the powering device 100 still remains the powering circuit 106 deactivated but stands by for an explicit request for wireless power transfer from the powered device 200 (S1071). In the "Standby" mode, in response to the request for wireless power transfer from the powered device 200 through a communication using the communication circuitry 103 (S2074), the powering device 100 initiates continuous activation of the powering circuitry 106 to operate in a "Powering" mode (S1072). In the "Powering" mode, the powering device 100 remains the powering circuitry 106 active to continuously provide wireless power transfer unless an explicit request is made from the powered device 200 for termination of the wireless power transfer. In the "Powering" mode, in response to the request for the termination of the wireless power transfer from the powered device 200 through a communication using the communication circuitry 103 (S2078), the powering device 100 stops continuous activation of the powering circuitry 106 to operate back in the "Standby" mode (S1073). In the embodiments, the powered device 200, with the powered circuitry 210 deactivated, operates in a "No Power" mode where the powered device 200 is not wirelessly charging the battery 209 using the powered circuitry 210 until a discovery, such as one in accordance with a discovery process as described above with reference to FIGS. 10 and 11, occurs. As depicted in FIG. 19, upon discovering the powering device 100 through the communication circuitry 203 (S2070), the powered device 200 provides an indication, using the output 205, showing that the powered device 200 is now operating in a "Standby" mode where the powered device 200 is ready for activation of the powered circuitry 210 (S2071). In the "Standby" mode, the powered device 200 continuously, periodically, or intermittently monitors the battery level of the battery 209 by, for example, determining whether or not the battery level is sufficient above a first predetermined threshold (S2072). As long as the battery level is determined to be above the first predetermined threshold (S2072: Yes), the powered device 200 remains the powered circuitry 210 deactivated. Upon determining the battery level to be insufficient below the first predetermined threshold (S2072: No), the powered device 200 activates the powered circuitry 210 (S2073), and also sends a request for wireless power transfer to the powering device 100 over a communication using the communication circuitry 203 (S2074). After the transmission of the request, while the powered circuitry 210 is activated, the powered device 200 continuously, periodically, or intermittently determines whether or not the battery 209 is being charged by the charging circuitry 208 using power generated by the powered circuitry 210 (S2075). As long as the battery 209 is determined to be being charged by the charging circuitry 208 using power generated by the powered circuitry 210 (S2075: Yes), the powered device 200 provides an indication showing that the powered device 200 is in a "Wireless Charging" mode where the powered device 200 is wirelessly charging the battery 209 using the powered circuitry 210 (S2076). If the battery 209 is determined to be not being charged by the charging circuitry 208 using power generated by the powered circuitry 210 (S2075: No), the process 407 goes to the process 500 as discussed above with reference to FIG. 17. In the embodiments, the process 500 returns to the process 407 at the step S2075. In the embodiments, if the process 500 ends at the step S2053, the process 407 does not proceed until the powered device 200 discovers the powering device 100 again at the step S2070. In the "Wireless Charging" mode, the powered device 200 continuously, periodically, or intermittently monitors the battery level of the battery 209 by, for example, determining whether or not the battery level is sufficient above a second predetermined threshold (S2077). Preferably, the second predetermined threshold is set to be higher than the first predetermined threshold: For example, the first threshold may be set to be very low below the middle between the empty level and the fully-charged level, whereas the second threshold may be set to be relatively high near the fully-charged level of the battery 209. As long as the battery level of the battery 209 is determined to be below the second predetermined threshold, meaning that the battery 209 has been not yet charged sufficiently (S2077: No), the powered device 200 remains the powered circuitry 210 activated in order for the battery 209 to be charged through the powered circuitry 210. Upon determining that the battery level is above the second predetermined level as a result of the battery 209 having been charged sufficiently (S2077: Yes), the powered device 200 sends a request for termination of the wireless power transfer to the powering device 100 over a communication using the communication circuitry 203 (S2078), and also deactivates the powered circuitry 210 (S2079) to operate back in the "Standby" mode (S2071). For the process 407, the powering control program 121 may have the computer program instructions for the steps S1070 to S1073 while the charging control program 221 may have the computer program instructions for the steps S2070 to S2079.

FIG. 20 depicts an example of a detailed wireless power transfer process 408 according to some embodiments where wireless power transfer may be initiated in response to discovery through a communication using the communication circuitry 103 and 203 which occurs only when the battery 209 has run short. In the embodiments, the powering device 100 operates in a "No Powering" mode where the powering device 100 does not provide wireless power transfer by remaining the powering circuitry 106 deactivated until a discovery, such as one in accordance with a discovery process as described above with reference to FIGS. 10 and 11, occurs. As depicted in FIG. 20, upon discovering the powered device 200 through the communication circuitry 103 in accordance with a discovery process (S1082), the powering device 100 initiates continuous activation of the powering circuitry 106 to operate in a "Powering" mode (S1083). In the "Powering" mode, the powering device 100 remains the powering circuitry 106 active to continuously provide wireless power transfer. In the "Powering" mode, the powering device 100 continuously, periodically, intermittently determines whether or not the powering device 100 keeps discovering the powered device 200 (S1084). The powered device 200 is expected to be continuously discovered by the powering device 100 as long as the powered device 200 is near the powering device 100 enough for successful establishment of the communication through the communication circuitry 103 and 203. As long as the powering device 100 successfully discovers the powered device 200, the powering device 100 remains operation in the "Powering" mode (S1084: Yes). Upon failing to discover the powered device 200 (S1084: No), the powering device 100 stops continuous activation of the powering circuitry 106 to operate back in the "No Powering" mode (S1085). In the embodiments, the powered device 200 with the powered circuitry 210 and the communication circuitry 203 both deactivated in a "No Power" mode where the powered device 200 is not wirelessly charging the battery 209, continuously, periodically, or intermittently monitors the battery level of the battery 209 by, for example, determining whether or not the battery level is sufficient above a first predetermined threshold (S2080). As long as the battery level is determined to be above the first predetermined threshold (S2080: Yes), the powered device 200 remains the powered circuitry 210 and the communication circuitry 203 deactivated. Upon determining the battery level to be insufficient below the first predetermined threshold (S2080: No), the powered device 200 activates the communication circuitry 203 (S2081). As a result of the activation of the communication circuitry 203, the powered device 200 discovers the powering device 100 in accordance with a discovery process as described above with reference to FIGS. 10 and 11 (S2082). The discovery at the step S2082 accompanying with the discovery at the step S1082 function as a request for wireless power transfer and reception of the request, respectively. Accordingly, once the discovery at the steps S1082 and S2082 have occurred, wireless power transfer is expected to be initiated by the powering device 100. Upon the activation of the communication circuitry 203, the powered device 200 also, preferably substantially simultaneously, activates the powered circuitry 210 (S2083). Upon activation of the communication circuitry 203 and the powered circuitry 210, the powered device 200 provides an indication, using the output 205, showing that the powered device 200 is now operating in a "Standby" mode where the powered device 200 will soon be wirelessly charged by the powering device 100 (S2084). In the "Standby" mode, the powered device 200 continuously, periodically, or intermittently determines whether or not the battery 209 is being charged by the charging circuitry 208 using power generated by the powered circuitry 210 (S2085). As long as the battery 209 is determined to be being charged by the charging circuitry 208 using power generated by the powered circuitry 210 (S2085: Yes), the powered device 200 provides an indication, using the output 205, showing that the powered device 200 is in a "Wireless Charging" mode where the powered device 200 is wirelessly charging the battery 209 using the powered circuitry 210 (S2086). If the battery 209 is determined to be not being charged by the charging circuitry 208 using power generated by the powered circuitry 210 (S2085: No), the process 408 goes to a process 510 as depicted in FIG. 21. The process 510 starts by determination as to whether or not the powered device 200 is discovering the powering device 100 through the communication using the communication circuitry 203 (S2092). Upon determining that the powered device 200 is discovering the powering device 100 (S2092: Yes), the powered device 200 provides an indication showing that the powered device 200 is in a "Standby" mode where the powered device 200 is not wirelessly charging the battery 209 but expecting that the wireless charging will start soon (S2093), and then the process 510 returns to the process 408 at the step S2085. On the contrary, upon determining that the powered device 200 is no longer discovering the powering device 100 (S2092: No), the powered device 200 deactivates the powered circuitry 210 (S2094), and also, preferably substantially simultaneously deactivates the communication circuitry 203 (S2095). Upon deactivation of the powered circuitry 210 and the communication circuitry 203, the powered device 200 provides an indication showing that the powered device 200 is in a "No Power" mode where the powered device 200 is not wirelessly charging the battery 209 (S2096). The powered device 200 then starts counting a predetermined time, for example, a few seconds, several tens of seconds, or a few minutes for re-activation of the communication circuitry 203 (S2097). Upon completion of the counting of the predetermined time (S2097: Yes), the process 510 returns to the process 408 at the step S2080 for re-activation of the communication circuitry 203 depending on the battery level of the battery 209. For the process 408, the powering control program 121 may have the computer program instructions for the steps S1082 to S1085 while the charging control program 221 may have the computer program instructions for the steps S2080 to S2090. For the process 510, the charging control program 221 may have the computer program instructions for the steps S2092 to S2097.

According to preferable implementation for the processes 404 to 408 where the communication through the communication circuitry 103 and 203 is employed together with wireless power transfer through the powering circuitry 106 and the powered circuitry 210, the range of the communication through the communication circuitry 103 and 203 may be substantially as wide as or narrower to some extent than the range of the powering region 10. More particularly, according to the preferable implementation, for example, the transmission power of the communication circuitry 103 may be preset to provide the communication range that is substantially as wide as or narrower to some extent than the range of the powering region 10, or the powering device 100 controls the transmission power of the communication circuitry 103 to provide the communication range that is substantially as wide as or narrower to some extent than the range of the powering region 10 (S1044, S1064, S1074, and S1086 in FIGS. 16, 18, 19, and 20).

FIG. 22 depicts an example of a detailed wireless power transfer process 604 according to some embodiments where authority confirmation steps using the DB 122 and/or DB 222 are added to the above-mentioned process 404. In the embodiments, upon the discovery at the step S1040, the powering device 100, remaining in the "No Powering" mode with the powering circuitry 106 deactivated, checks the authority of the discovered powered device 200, namely, determines whether or not the discovered powered device 200 is authorized to be wirelessly powered by the powering device 100 with reference to the DB 122 (S1100). More particularly, if the powering device 100 finds the ID of the powered device 200 received in association with the discovery process being listed in the DB 122 as an authorized powered device, the powering device 100 determines that the discovered powered device 200 is authorized to receive wireless power transfer from the powering device 100. On the contrary, if the powering device 100 does not find the ID of the powered device 200 in the DB 122 as an authorized powered device, the powering device 100 determines that the discovered powered device 200 is not authorized to receive wireless power transfer from the powering device 100. Upon determining that the discovered powered device 200 is not authorized to receive wireless power transfer (S1100: No), the powering device 100 does not proceed to the "Powering" mode, and the then the process 604 ends. Upon determining that the discovered powered device 200 is authorized to receive wireless power transfer (S1100: Yes), the process 604 proceeds to the steps S1041 to S1043. In the embodiments, at the step S1041, the powering device 100 initiates continuous activation of the powering circuitry 106 in the "Powering" mode in response to the affirmative determination at the step S1100. In the embodiments, upon the discovery at the step S2040, the powered device 200, remaining in the "No Power" mode with the powered circuitry 210 deactivated, checks the authority of the powered device 200 itself, namely, determines whether or not the powered device 200 is authorized to be wirelessly powered by the powering device 100 with reference to the DB 222 (S2100). More particularly, if the powered device 200 finds the ID of the powering device 100 received in association with the discovery process being listed in the DB 222 as a connectable power source, the powered device 200 determines that the powered device 200 is authorized to receive wireless power transfer from the discovered powering device 100. On the contrary, if the powered device 200 does not find the ID of the discovered powering device 100 in the DB 222 as a connectable power source, the powered device 200 determines that the powered device 200 is not authorized to receive wireless power transfer from the discovered powering device 100. Upon determining that the powered device 200 is authorized to receive wireless power transfer (S2100: Yes), the process 604 proceeds to the steps S2041 to S2043. In the embodiments, at the step S2041, the powered device 200 activates the powered circuitry 210 to operate in the "Wireless Charging" mode in response to the affirmative determination at the step S2100. On the contrary, upon determining that the powered device 200 is not authorized to receive wireless power transfer (S2100: No), the powered device 200 deactivates the communication circuitry 203 in order to prevent the discovery at the step S2040 from occurring for a predetermined time (S2101). The powered device 200 starts counting the predetermined time (S2102), and re-activates the communication circuitry 203 upon lapse of the predetermined time (S2103). For the process 604, the powering control program 121 may have the computer program instructions for the step S1100 while the charging control program 221 may have the computer program instructions for the steps S2100 to S2103. In the embodiments, the process 604 may include either one of the authority confirmation steps S1100 at the powering device 100 and the authority confirmation steps S2100 to S2103 at the powered device 200, or may include both.

FIG. 23 depicts an example of a detailed wireless power transfer process 606 according to some embodiments where authority confirmation steps using the DB 122 and/or DB 222 are added to the above-mentioned process 406. In the embodiments, upon the discovery at the step S1060, the powering device 100, remaining in the "No Powering" mode with the powering circuitry 106 deactivated, checks the authority of the discovered powered device 200, namely, determines whether or not the discovered powered device 200 is authorized to be wirelessly powered by the powering device 100 with reference to the DB 122 (S1200). More particularly, if the powering device 100 finds the ID of the powered device 200 received in association with the discovery process being listed in the DB 122 as an authorized powered device, the powering device 100 determines that the discovered powered device 200 is authorized to receive wireless power transfer from the powering device 100. On the contrary, if the powering device 100 does not find the ID of the powered device 200 in the DB 122 as an authorized powered device, the powering device 100 determines that the discovered powered device 200 is not authorized to receive wireless power transfer from the powering device 100. Upon determining that the discovered powered device 200 is not authorized to receive wireless power transfer (S1200: No), the powering device 100 does not proceed to the "Powering" mode, and the then the process 606 ends. Upon determining that the discovered powered device 200 is authorized to receive wireless power transfer (S1200: Yes), the process 606 proceeds to the steps S1061 to S1063. In the embodiments, at the step S1061, the powering device 100 initiates continuous activation of the powering circuitry 106 in the "Powering" mode in response to the affirmative determination at the step S1200. In the embodiments, upon the discovery at the step S2060, the powered device 200, remaining in the "No Power" mode with the powered circuitry 210 deactivated, checks the authority of the powered device 200 itself, namely, determines whether or not the powered device 200 is authorized to be wirelessly powered by the powering device 100 with reference to the DB 222 (S2200). More particularly, if the powered device 200 finds the ID of the powering device 100 received in association with the discovery process being listed in the DB 222 as a connectable power source, the powered device 200 determines that the powered device 200 is authorized to receive wireless power transfer from the discovered powering device 100. On the contrary, if the powered device 200 does not find the ID of the discovered powering device 100 in the DB 222 as a connectable power source, the powered device 200 determines that the powered device 200 is not authorized to receive wireless power transfer from the discovered powering device 100. Upon determining that the powered device 200 is authorized to receive wireless power transfer (S2200: Yes), the process 606 proceeds to the steps S2061 to S2067. In the embodiments, at the step S2061, the powered device 200 starts operating in the "Standby" mode in response to the affirmative determination at the step S2200. On the contrary, upon determining that the powered device 200 is not authorized to receive wireless power transfer (S2200: No), the powered device 200 deactivates the communication circuitry 203 in order to prevent the discovery at the step S2060 from occurring for a predetermined time (S2201). The powered device 200 starts counting the predetermined time (S2202), and re-activates the communication circuitry 203 upon lapse of the predetermined time (S2203). For the process 606, the powering control program 121 may have the computer program instructions for the step S1200 while the charging control program 221 may have the computer program instructions for the steps S2200 to S2203. In the embodiments, the process 606 may include either one of the authority confirmation steps S1200 at the powering device 100 and the authority confirmation steps S2200 to S2203 at the powered device 200, or may include both.

FIG. 24 depicts an example of a detailed wireless power transfer process 607 according to some embodiments where authority confirmation steps using the DB 122 and/or DB 222 are added to the above-mentioned process 407. In the embodiments, in the "Standby" mode after the step S1070, in response to the request at the step S2074, the powering device 100, remaining in the "Standby" mode with the powering circuitry 106 deactivated, checks the authority of the discovered powered device 200, namely, determines whether or not the discovered powered device 200 is authorized to be wirelessly powered by the powering device 100 with reference to the DB 122 (S1300). More particularly, if the powering device 100 finds the ID of the powered device 200 received in association with the discovery process being listed in the DB 122 as an authorized powered device, the powering device 100 determines that the discovered powered device 200 is authorized to receive wireless power transfer from the powering device 100. On the contrary, if the powering device 100 does not find the ID of the powered device 200 in the DB 122 as an authorized powered device, the powering device 100 determines that the discovered powered device 200 is not authorized to receive wireless power transfer from the powering device 100. Upon determining that the discovered powered device 200 is not authorized to receive wireless power transfer (S1300: No), the powering device 100 does not proceed to the "Powering" mode, and the then the process 607 ends. Upon determining that the discovered powered device 200 is authorized to receive wireless power transfer (S1300: Yes), the process 607 proceeds to the steps S1072 to S1073. In the embodiments, at the step S1072, the powering device 100 initiates continuous activation of the powering circuitry 106 in the "Powering" mode in response to the affirmative determination at the step S1300. In the embodiments, upon the discovery at the step S2070, the powered device 200, remaining in the "No Power" mode with the powered circuitry 210 deactivated, checks the authority of the powered device 200 itself, namely, determines whether or not the powered device 200 is authorized to be wirelessly powered by the powering device 100 with reference to the DB 222 (S2300). More particularly, if the powered device 200 finds the ID of the powering device 100 received in association with the discovery process being listed in the DB 222 as a connectable power source, the powered device 200 determines that the powered device 200 is authorized to receive wireless power transfer from the discovered powering device 100. On the contrary, if the powered device 200 does not find the ID of the discovered powering device 100 in the DB 222 as a connectable power source, the powered device 200 determines that the powered device 200 is not authorized to receive wireless power transfer from the discovered powering device 100. Upon determining that the powered device 200 is authorized to receive wireless power transfer (S2300: Yes), the process 607 proceeds to the steps S2071 to S2079. In the embodiments, at the step S2071, the powered device 200 activates the powered circuitry 210 to operate in the "Wireless Charging" mode in response to the affirmative determination at the step S2300. On the contrary, upon determining that the powered device 200 is not authorized to receive wireless power transfer (S2300: No), the powered device 200 deactivates the communication circuitry 203 in order to prevent the discovery at the step S2070 from occurring for a predetermined time (S2301). The powered device 200 starts counting the predetermined time (S2302), and re-activates the communication circuitry 203 upon lapse of the predetermined time (S2303). For the process 607, the powering control program 121 may have the computer program instructions for the step S1300 while the charging control program 221 may have the computer program instructions for the steps S2300 to S2303. In the embodiments, the process 607 may include either one of the authority confirmation steps S1300 at the powering device 100 and the authority confirmation steps S2300 to S2303 at the powered device 200, or may include both.

FIG. 25 depicts an example of a detailed wireless power transfer process 608 according to some embodiments where authority confirmation steps using the DB 122 and/or DB 222 are added to the above-mentioned process 408. In the embodiments, in the "No Powering" mode, upon the discovery at the step S1082, the powering device 100, remaining in the "No Powering" mode with the powering circuitry 106 deactivated, checks the authority of the discovered powered device 200, namely, determines whether or not the discovered powered device 200 is authorized to be wirelessly powered by the powering device 100 with reference to the DB 122 (S1400). More particularly, if the powering device 100 finds the ID of the powered device 200 received in association with the discovery process being listed in the DB 122 as an authorized powered device, the powering device 100 determines that the discovered powered device 200 is authorized to receive wireless power transfer from the powering device 100. On the contrary, if the powering device 100 does not find the ID of the powered device 200 in the DB 122 as an authorized powered device, the powering device 100 determines that the discovered powered device 200 is not authorized to receive wireless power transfer from the powering device 100. Upon determining that the discovered powered device 200 is not authorized to receive wireless power transfer (S1400: No), the powering device 100 does not proceed to the "Powering" mode, and the then the process 608 ends. Upon determining that the discovered powered device 200 is authorized to receive wireless power transfer (S1400: Yes), the process 608 proceeds to the steps S1083 to S1085. In the embodiments, at the step S1083, the powering device 100 initiates continuous activation of the powering circuitry 106 in the "Powering" mode in response to the affirmative determination at the step S1400. In the embodiments, upon the discovery at the step S2082 when the communication circuitry 203 is activated in accordance with the steps S2080 to S2081, the powered device 200, remaining in the "No Power" mode with the powered circuitry 210 deactivated, checks the authority of the powered device 200 itself, namely, determines whether or not the powered device 200 is authorized to be wirelessly powered by the powering device 100 with reference to the DB 222 (S2400). More particularly, if the powered device 200 finds the ID of the powering device 100 received in association with the discovery process being listed in the DB 222 as a connectable power source, the powered device 200 determines that the powered device 200 is authorized to receive wireless power transfer from the discovered powering device 100. On the contrary, if the powered device 200 does not find the ID of the discovered powering device 100 in the DB 222 as a connectable power source, the powered device 200 determines that the powered device 200 is not authorized to receive wireless power transfer from the discovered powering device 100. Upon determining that the powered device 200 is authorized to receive wireless power transfer (S2400: Yes), the process 608 proceeds to the steps S2083 to S2090. In the embodiments, at the step S2083, the powered device 200 activates the powered circuitry 210 in response to the affirmative determination at the step S2400. On the contrary, upon determining that the powered device 200 is not authorized to receive wireless power transfer (S2400: No), the powered device 200 deactivates the communication circuitry 203 in order to prevent the discovery at the step S2082 from occurring for a predetermined time (S2401). The powered device 200 starts counting the predetermined time (S2402), and returns to the step S2080. For the process 608, the powering control program 121 may have the computer program instructions for the step S1400 while the charging control program 221 may have the computer program instructions for the steps S2400 to S2402. In the embodiments, the process 608 may include either one of the authority confirmation steps S1400 at the powering device 100 and the authority confirmation steps S2400 to S2402 at the powered device 200, or may include both.

FIG. 26 depicts an example of a detailed wireless power transfer process 704 according to some embodiments where authority confirmation steps and status management steps using the DB 122 and DB 222 are added to the above-mentioned process 404. In the embodiments, upon the discovery at the step S1040, the powering device 100, remaining in the "No Powering" mode with the powering circuitry 106 deactivated, checks the authority of the discovered powered device 200, namely, determines whether or not the discovered powered device 200 is authorized to be wirelessly powered by the powering device 100 with reference to the DB 122 (S1500). More particularly, if the powering device 100 finds the ID of the powered device 200 received in association with the discovery process being listed in the DB 122 as an authorized powered device, the powering device 100 determines that the discovered powered device 200 is authorized to receive wireless power transfer from the powering device 100. On the contrary, if the powering device 100 does not find the ID of the powered device 200 in the DB 122 as an authorized powered device, the powering device 100 determines that the discovered powered device 200 is not authorized to receive wireless power transfer from the powering device 100. Upon determining that the discovered powered device 200 is not authorized to receive wireless power transfer (S1500: No), the powering device 100 does not proceed to the "Powering" mode, and the then the process 704 ends. Upon determining that the discovered powered device 200 is authorized to receive wireless power transfer (S1500: Yes), the powering device 100 sends to the powered device 200 through the communication using the communication circuitry 103 a positive acknowledgement indicating that the powered device 200 is authorized to receive wireless power transfer from the powering device 100 (S1501). In parallel to the transmission of the positive acknowledgement, the powering device 100 also expects reception of the same kind of positive acknowledgement from the powered device 200, namely, the acknowledgement (S2501) indicating that the powered device 200 is authorized to receive wireless power transfer from the powering device 100. Upon receiving the positive acknowledgement along with the ID of the powered device 200 from the powered device 200 through the communication using the communication circuitry 103 (S1502: Yes), the powering device 100 enters the positive communication status, for example "Yes" as illustrated in the column 122a in FIG. 9, for the ID of the powered device 200 in the DB 122 (S1503). If the powering device 100 fails to receive the positive communication acknowledgement from the powered device 200 within a predetermined time (S1502: No), the powering device 100 does not proceed to the "Powering" mode, and then the process 704 ends. The step S1503 results in the DB 122 indicating that the powering device 100 is in communication with the powered device 200 through the communication using the communication circuitry 103. Upon the entrance at the step S1503, the powering device 100 determines whether or not the powering circuitry 106 is already active for wireless power transfer (S1504). The powering circuitry 106 is expected to be already active if the powering device 100 has discovered at least one other powered device and already started activation of the powering circuitry 106 for wirelessly powering the other powered device for which the positive communication status has been entered in the DB 122. If the powering circuitry 106 is already activated (S1504: Yes), the powering device 100 remains the powering circuitry 106 activated. Upon determining that the powering circuitry 106 deactivated (S1504: No), the powering device 100 starts activation of the powering circuitry 106 (S1505). During the wireless power transfer, the powering device 100 expects reception of status information indicative of any one operation status of the powered device 200 from the powered device 200. Upon receiving status information (S2503) indicative of a "Standby" mode from the powered device 200 through the communication using the communication circuitry 106, the powering device 100 enters the "Standby" status as the operational status for the ID of the powered device 200, for example as illustrated in the column 122b in FIG. 9, in the DB 122 (S1506). While managing the ID of the powered device 200 in the "Standby" status, upon receiving status information (S2504) indicative of a "Wireless Charging" status from the powered device 200 through the communication using the communication circuitry 106, the powering device 100 enters the "Wireless Charging" status as the operational status for the ID of the powered device 200, for example as illustrated in the column 122b in FIG. 9 (S1507). In the embodiments, while managing the ID of the powered device 200 in the positive communication status after the step S1503, the powering device 100 performs a process 710 depicted in FIG. 27 for monitoring the communication with the powered device 200 in parallel to the process 704. As depicted in FIG. 27, the powering device 100 continuously, periodically, or intermittently determines whether or not the powering device 100 keeps discovering the powered device 200 (S1600). The powered device 200 is expected to be continuously discovered by the powering device 100 as long as the powered device 200 is near the powering device 100 enough for successful establishment of the communication through the communication circuitry 103 and 203. Upon failing to discover the powered device 200 (S1600: No), the powering device 100 enters a negative communication status, for example "No" as illustrated in the column 122a in FIG. 9, for the ID of the powered device 200 in the DB 122 (S1601). The step S1601 updates the communication status from the status where the powered device 200 is in communication with the powering device 100 into the status where the powered device 200 is no longer in communication with the powering device 100. The powering device 100 then determines, with reference to the DB 122, whether or not at least one other powered device has the positive communication status, namely, whether or not the powering device 100 is in communication with at least one other powered device 200 through the communication using the communication circuitry 103 (S1602). If no other powered device has the positive communication status, namely, the powering device 100 is not in communication with any other powered device 200 (S1602: No), the powering device 100 deactivates the powering circuitry 106 to stop wireless power transfer (S1603). If at least one other powered device has the positive communication status, namely, the powering device 100 is in communication with at least one other powered device 200 (S1602: Yes), the powering device 100 remains activation of the powering circuitry 106. This is because said at least one other powered device in communication with the powering device 100 is very likely to be receiving wireless power transfer from the powering device 100, and so the wireless power transfer would be interrupted if the powering device 100 stopped the powering circuitry 106. In the embodiments, as depicted in FIG. 26, upon the discovery at the step S2040, the powered device 200, remaining in the "No Power" mode with the powered circuitry 210 deactivated, checks the authority of the powered device 200 itself, namely, determines whether or not the powered device 200 is authorized to be wirelessly powered by the powering device 100 with reference to the DB 222 (S2500). More particularly, if the powered device 200 finds the ID of the powering device 100 received in association with the discovery process being listed in the DB 222 as a connectable power source, the powered device 200 determines that the powered device 200 is authorized to receive wireless power transfer from the discovered powering device 100. On the contrary, if the powered device 200 does not find the ID of the discovered powering device 100 in the DB 222 as a connectable power source, the powered device 200 determines that the powered device 200 is not authorized to receive wireless power transfer from the discovered powering device 100. Upon determining that the powered device 200 is not authorized to receive wireless power transfer (S2500: No), the powering device 100 does not proceed to the "Powering" mode, and then the powered device 200 remains the communication circuitry 203 deactivated for a predetermined time in accordance with the steps S2101 to S2103. Upon determining that the powered device 200 is authorized to receive wireless power transfer (S2500: Yes), the powered device 200 sends to the powering device 100 through the communication using the communication circuitry 203 a positive acknowledgement indicating that the powered device 200 is authorized to receive wireless power transfer from the powering device 100 (S2501). In parallel to the transmission of the positive acknowledgement, the powered device 200 also expects reception of the same kind of positive acknowledgement from the powering device 100, namely, the acknowledgement indicating that the powered device 200 is authorized to receive wireless power transfer from the powering device 100. Upon receiving the positive acknowledgement along with the ID of the powering device 100 from the powering device 100 through the communication using the communication circuitry 203 (S2502: Yes), the powered device 200 starts operation in the "Standby" mode and/or the "Wireless Powering" mode in accordance with the steps S2041 to S2044 and S2050 to S2053. In the course of performance of the steps S2041 to S044 and S2050 to S2053, upon starting operation in the "Standby" mode in accordance with the step S2042 or S2051, the powered device 200 sends to the powering device 100 status information indicative of the "Standby" mode in which the powered device 200 is in operation through the communication using the communication circuitry 203 (S2503). Similarly, upon starting operation in the "Wireless Charging" mode in accordance with the step S2044, the powered device 200 sends to the powering device 100 status information indicative of the "Wireless Charging" mode in which the powered device 200 is in operation through the communication using the communication circuitry 203 (S2504). In the embodiments, for the process 704, the powering control program 121 may have the computer program instructions for the steps S1500 to S1507 while the charging control program 221 may have the computer program instructions for the steps S2500 to S2504. For the process 710, the powering control program 121 may have the computer program instructions for the steps S1600 to S1603.

FIG. 28 depicts an example of a detailed wireless power transfer process 706 according to some embodiments where authority confirmation steps and status management steps using the DB 122 and DB 222 are added to the above-mentioned process 406. In the embodiments, upon the discovery at the step S1060, the powering device 100, remaining in the "No Powering" mode with the powering circuitry 106 deactivated, checks the authority of the discovered powered device 200, namely, determines whether or not the discovered powered device 200 is authorized to be wirelessly powered by the powering device 100 with reference to the DB 122 (S1700). More particularly, if the powering device 100 finds the ID of the powered device 200 received in association with the discovery process being listed in the DB 122 as an authorized powered device, the powering device 100 determines that the discovered powered device 200 is authorized to receive wireless power transfer from the powering device 100. On the contrary, if the powering device 100 does not find the ID of the powered device 200 in the DB 122 as an authorized powered device, the powering device 100 determines that the discovered powered device 200 is not authorized to receive wireless power transfer from the powering device 100. Upon determining that the discovered powered device 200 is not authorized to receive wireless power transfer (S1700: No), the powering device 100 does not proceed to the "Powering" mode, and then the process 706 ends. Upon determining that the discovered powered device 200 is authorized to receive wireless power transfer (S1700: Yes), the powering device 100 sends to the powered device 200 through the communication using the communication circuitry 103 a positive acknowledgement indicating that the powered device 200 is authorized to receive wireless power transfer from the powering device 100 (S1701). In parallel to the transmission of the positive acknowledgement, the powering device 100 also expects reception of the same kind of positive acknowledgement from the powered device 200, namely, the acknowledgement (S2701) indicating that the powered device 200 is authorized to receive wireless power transfer from the powering device 100. Upon receiving the positive acknowledgement (S2701) along with the ID of the powered device 200 from the powered device 200 through the communication using the communication circuitry 103 (S1702: Yes), the powering device 100 enters the positive communication status, for example "Yes" as illustrated in the column 122a in FIG. 9, for the ID of the powered device 200 in the DB 122 (S1703). If the powering device 100 fails to receive the positive communication acknowledgement from the powered device 200 within a predetermined time (S1702: No), the powering device 100 does not proceed to the "Powering" mode, and then the process 706 ends. The step S1703 results in the DB 122 indicating that the powering device 100 is in communication with the powered device 200 through the communication using the communication circuitry 103. While managing the ID of the powered device 200 in the positive communication status, the powering device 100 waits for reception of information indicative of any status of the powered device 200 from the powered device 200. Upon receiving the status information (S2703) indicative of the "Standby" mode from the powered device 200 through the communication using the communication circuitry 103, the powering device 100 enters the "Standby" status as the operational status for the ID of the powered device 200, for example as illustrated in the column 122b in FIG. 9, in the DB 122 (S1704). Upon entrance of the "Standby" status at the step S1704, the powering device 100 determines whether or not the powering circuitry 106 is already active for wireless power transfer (S1705). The powering circuitry 106 is expected to be already active if the powering device 100 has discovered at least one other powered device and already started activation of the powering circuitry 106 for wirelessly powering the other powered device for which the positive communication status has been entered in the DB 122. If the powering circuitry 106 is already activated (S1705: Yes), the powering device 100 remains the powering circuitry 106 activated. Upon determining that the powering circuitry 106 deactivated (S1705: No), the powering device 100 starts activation of the powering circuitry 106 (S1706). During the wireless power transfer with the ID of the powered device 200 being managed in the "Standby" mode in the DB 122, the powering device 100 waits for reception of updated status information indicative of the status of the powered device 200 from the powered device 200. Upon receiving status information (S2704) indicative of a "Wireless Charging" mode from the powered device 200 through the communication using the communication circuitry 106, the powering device 100 enters the "Wireless Charging" status as the operational status for the ID of the powered device 200, for example as illustrated in the column 122b in FIG. 9 (S1707). In the embodiments, while managing the ID of the powered device 200 in the positive communication status after the step S1703, the powering device 100 performs the process 710 depicted in FIG. 27 for monitoring the communication with the powered device 200 in parallel to the process 706. In the embodiments, as depicted in FIG. 28, upon the discovery at the step S2060, the powered device 200, remaining in the "No Power" mode with the powered circuitry 210 deactivated, checks the authority of the powered device 200 itself, namely, determines whether or not the powered device 200 is authorized to be wirelessly powered by the powering device 100 with reference to the DB 222 (S2700). More particularly, if the powered device 200 finds the ID of the powering device 100 received in association with the discovery process being listed in the DB 222 as a connectable power source, the powered device 200 determines that the powered device 200 is authorized to receive wireless power transfer from the discovered powering device 100. On the contrary, if the powered device 200 does not find the ID of the discovered powering device 100 in the DB 222 as a connectable power source, the powered device 200 determines that the powered device 200 is not authorized to receive wireless power transfer from the discovered powering device 100. Upon determining that the powered device 200 is not authorized to receive wireless power transfer (S2700: No), the powering device 100 does not proceed to the "Powering" mode, and then the powered device 200 remains the communication circuitry 203 deactivated for a predetermined time in accordance with the steps S2201 to S2203. Upon determining that the powered device 200 is authorized to receive wireless power transfer (S2700: Yes), the powered device 200 sends to the powering device 100 through the communication using the communication circuitry 203 a positive acknowledgement indicating that the powered device 200 is authorized to receive wireless power transfer from the powering device 100 (S2701). In parallel to the transmission of the positive acknowledgement, the powered device 200 also expects reception of the same kind of positive acknowledgement from the powering device 100, namely, the acknowledgement indicating that the powered device 200 is authorized to receive wireless power transfer from the powering device 100. Upon receiving the positive acknowledgement along with the ID of the powering device 100 from the powering device 100 through the communication using the communication circuitry 203 (S2702: Yes), the powered device 200 starts operation in the "Standby" mode and/or the "Wireless Charging" mode in accordance with the step S2061 to S2067 and S2050 to S2053. In the course of performance of the steps S2061 to S2067 and S2050 to S2053, upon starting operation in the "Standby" mode in accordance with the step S2061 or S2051, the powered device 200 sends to the powering device 100 status information indicative of the "Standby" mode in which the powered device 200 is in operation through the communication using the communication circuitry 203 (S2703). Similarly, upon starting operation in the "Wireless Charging" mode in accordance with the S2065, the powered device 200 sends to the powering device 100 status information indicative of the "Wireless Charging" mode in which the powered device 200 is in operation through the communication using the communication circuitry 203 (S2704).

In the embodiments, for the process 706, the powering control program 121 may have the computer program instructions for the steps S1700 to S1707 while the charging control program 221 may have the computer program instructions for the steps S2700 to S2704.

FIG. 29 depicts an example of a detailed wireless power transfer process 707 according to some embodiments where authority confirmation steps and status management steps using the DB 122 and DB 222 are added to the above-mentioned process 407. In the embodiments, upon the discovery at the step S1070, the powering device 100, remaining in the "No Powering" mode with the powering circuitry 106 deactivated, checks the authority of the discovered powered device 200, namely, determines whether or not the discovered powered device 200 is authorized to be wirelessly powered by the powering device 100 with reference to the DB 122 (S1800). More particularly, if the powering device 100 finds the ID of the powered device 200 received in association with the discovery process being listed in the DB 122 as an authorized powered device, the powering device 100 determines that the discovered powered device 200 is authorized to receive wireless power transfer from the powering device 100. On the contrary, if the powering device 100 does not find the ID of the powered device 200 in the DB 122 as an authorized powered device, the powering device 100 determines that the discovered powered device 200 is not authorized to receive wireless power transfer from the powering device 100. Upon determining that the discovered powered device 200 is not authorized to receive wireless power transfer (S1800: No), the powering device 100 does not proceed to the "Powering" mode, and then the process 707 ends. Upon determining that the discovered powered device 200 is authorized to receive wireless power transfer (S1800: Yes), the powering device 100 sends to the powered device 200 through the communication using the communication circuitry 103 a positive acknowledgement indicating that the powered device 200 is authorized to receive wireless power transfer from the powering device 100 (S1801). In parallel to the transmission of the positive acknowledgement, the powering device 100 also expects reception of the same kind of positive acknowledgement from the powered device 200, namely, the acknowledgement (S2801) indicating that the powered device 200 is authorized to receive wireless power transfer from the powering device 100. Upon receiving the positive acknowledgement (S2801) along with the ID of the powered device 200 from the powered device 200 through the communication using the communication circuitry 103 (S1802: Yes), the powering device 100 enters the positive communication status, for example "Yes" as illustrated in the column 122a in FIG. 9, for the ID of the powered device 200 in the DB 122 (S1803). If the powering device 100 fails to receive the positive communication acknowledgement from the powered device 200 within a predetermined time (S1802: No), the powering device 100 does not proceed to the "Powering" mode, and then the process 707 ends. The step S1803 results in the DB 122 indicating that the powering device 100 is in communication with the powered device 200 through the communication using the communication circuitry 103. While managing the ID of the powered device 200 in the positive communication status, the powering device 100 waits for reception of information indicative of any status of the powered device 200 from the powered device 200. Upon receiving the status information (S2803) indicative of the "Standby" mode from the powered device 200 through the communication using the communication circuitry 103, the powering device 100 enters the "Standby" status as the operational status for the ID of the powered device 200, for example as illustrated in the column 122b in FIG. 9, in the DB 122 (S1804). While managing the ID of the powered device 200 in the positive communication status in the DB 122, the powering device 100 waits for reception of the request (S2074) for wireless power transfer from the powered device 200. Upon receiving the request (S2074) from the powered device 200 through the communication using the communication circuitry 103, the powering device 100 determines whether or not the powering circuitry 106 is already active for wireless power transfer (S1805). The powering circuitry 106 is expected to be already active if the powering device 100 has discovered at least one other powered device and already started activation of the powering circuitry 106 for wirelessly powering the other powered device for which the positive communication status has been entered in the DB 122. If the powering circuitry 106 is already activated (S1805: Yes), the powering device 100 remains the powering circuitry 106 activated. Upon determining that the powering circuitry 106 deactivated (S1805: No), the powering device 100 starts activation of the powering circuitry 106 (S1806). During the wireless power transfer with the ID of the powered device 200 being managed in the "Standby" mode in the DB 122, the powering device 100 waits for reception of updated status information indicative of the status of the powered device 200 from the powered device 200. Upon receiving status information (S2804) indicative of the "Wireless Charging" mode from the powered device 200 through the communication using the communication circuitry 103, the powering device 100 enters the "Wireless Charging" status as the operational status for the ID of the powered device 200, for example as illustrated in the column 122b in FIG. 9 (S1807). While managing the ID of the powered device 200 in the "Wireless Charging" mode in the DB 122, upon receiving the request (S2078) for termination of the wireless power transfer, the powering device 100 enters the "Standby" mode as the operational status, for example as illustrated in the column 122b in FIG. 9, in the DB 122 (S1808). The entrance at the step S1808 results in the operational status of the powered device 200 being changed from the "Wireless Charging" mode back into the "Standby" mode. Upon the entrance of the operational status at the step S1808, the powering device 100 determines whether or not the powering device 100 manages the ID of at least one other powered device in the positive communication status, namely, whether or not the powering device 100 is in communication with at least one other powered device for wireless power transfer (S1809). If the powering device 100 is in communication with at least one other powered device for wireless power transfer (S1809: Yes), the powering device 100 remains the powering circuitry 106 activated because, otherwise, the wireless power transfer for said at least one other powered device would be interrupted. On the contrary, if the powering device 100 is not in communication with any other powered device (S1809: No), the powering device 100 deactivates the powering circuitry 106 to terminate the wireless power transfer (S1810). Also, in the embodiments, while managing the ID of the powered device 200 in the positive communication status after the step S1803, the powering device 100 performs the process 710 depicted in FIG. 27 for monitoring the communication with the powered device 200 in parallel to the process 707. In the embodiments, as depicted in FIG. 29, upon the discovery at the step S2070, the powered device 200, remaining in the "No Power" mode with the powered circuitry 210 deactivated, checks the authority of the powered device 200 itself, namely, determines whether or not the powered device 200 is authorized to be wirelessly powered by the powering device 100 with reference to the DB 222 (S2800). More particularly, if the powered device 200 finds the ID of the powering device 100 received in association with the discovery process being listed in the DB 222 as a connectable power source, the powered device 200 determines that the powered device 200 is authorized to receive wireless power transfer from the discovered powering device 100. On the contrary, if the powered device 200 does not find the ID of the discovered powering device 100 in the DB 122 as a connectable power source, the powered device 200 determines that the powered device 200 is not authorized to receive wireless power transfer from the discovered powering device 100. Upon determining that the powered device 200 is not authorized to receive wireless power transfer (S2800: No), the powering device 100 does not proceed to the "Powering" mode, and then the powered device 200 remains the communication circuitry 203 deactivated for a predetermined time in accordance with the steps S2301 to S2303. Upon determining that the powered device 200 is authorized to receive wireless power transfer (S2800: Yes), the powered device 200 sends to the powering device 100 through the communication using the communication circuitry 203 a positive acknowledgement indicating that the powered device 200 is authorized to receive wireless power transfer from the powering device 100 (S2801). In parallel to the transmission of the positive acknowledgement, the powered device 200 also expects reception of the same kind of positive acknowledgement from the powering device 100, namely, the acknowledgement (S1801) indicating that the powered device 200 is authorized to receive wireless power transfer from the powering device 100. Upon receiving the positive acknowledgement along with the ID of the powering device 100 from the powering device 100 through the communication using the communication circuitry 203 (S2802: Yes), the powered device 200 starts operation in the "Standby" mode and/or the "Wireless Charging" mode in accordance with the steps S2071 to S2079 and S2050 to S2053. In the course of performance of the steps S2071 to S2079 and S2050 to S2053, upon starting operation in the "Standby" mode in accordance with the step S2071 or S2051, the powered device 200 sends to the powering device 100 status information indicative of the "Standby" mode in which the powered device 200 is in operation through the communication using the communication circuitry 203 (S2803). Similarly, upon starting operation in the "Wireless Charging" mode in accordance with the step S2076, the powered device 200 sends to the powering device 100 status information indicative of the "Wireless Charging" mode in which the powered device 200 is in operation through the communication using the communication circuitry 203 (S2804). In the embodiments, for the process 707, the powering control program 121 may have the computer program instructions for the steps S1800 to S1810 while the charging control program 221 may have the computer program instructions for the steps S2800 to S2804.

FIG. 30 depicts an example of a detailed wireless power transfer process 708 according to some embodiments where authority confirmation steps and status management steps using the DB 122 and DB 222 are added to the above-mentioned process 408. In the embodiments, upon the discovery at the step S1080, the powering device 100, remaining in the "No Powering" mode with the powering circuitry 106 deactivated, checks the authority of the discovered powered device 200, namely, determines whether or not the discovered powered device 200 is authorized to be wirelessly powered by the powering device 100 with reference to the DB 122 (S1900). More particularly, if the powering device 100 finds the ID of the powered device 200 received in association with the discovery process being listed in the DB 122 as an authorized powered device, the powering device 100 determines that the discovered powered device 200 is authorized to receive wireless power transfer from the powering device 100. On the contrary, if the powering device 100 does not find the ID of the powered device 200 in the DB 122 as an authorized powered device, the powering device 100 determines that the discovered powered device 200 is not authorized to receive wireless power transfer from the powering device 100. Upon determining that the discovered powered device 200 is not authorized to receive wireless power transfer (S1900: No), the powering device 100 does not proceed to the "Powering" mode, and then the process 708 ends. Upon determining that the discovered powered device 200 is authorized to receive wireless power transfer (S1900: Yes), the powering device 100 sends to the powered device 200 through the communication using the communication circuitry 103 a positive acknowledgement indicating that the powered device 200 is authorized to receive wireless power transfer from the powering device 100 (S1901). In parallel to the transmission of the positive acknowledgement, the powering device 100 also expects reception of the same kind of positive acknowledgement from the powered device 200, namely, the acknowledgement (S2901) indicating that the powered device 200 is authorized to receive wireless power transfer from the powering device 100. Upon receiving the positive acknowledgement (S2901) along with the ID of the powered device 200 from the powered device 200 through the communication using the communication circuitry 103 (S1902: Yes), the powering device 100 enters the positive communication status, for example "Yes" as illustrated in the column 122a in FIG. 9, for the ID of the powered device 200 in the DB 122 (S1903). If the powering device 100 fails to receive the positive communication acknowledgement from the powered device 200 within a predetermined time (S1902: No), the powering device 100 does not proceed to the "Powering" mode, and then the process 708 ends. The step S1903 results in the DB 122 indicating that the powering device 100 is in communication with the powered device 200 through the communication using the communication circuitry 103. Upon entrance of the communication status at the step S1903, the powering device 100 determines whether or not the powering circuitry 106 is already active for wireless power transfer (S1904). The powering circuitry 106 is expected to be already active if the powering device 100 has discovered at least one other powered device and already started activation of the powering circuitry 106 for wirelessly powering the other powered device for which the positive communication status has been entered in the DB 122. If the powering circuitry 106 is already activated (S1904: Yes), the powering device 100 remains the powering circuitry 106 activated. Upon determining that the powering circuitry 106 deactivated (S1904: No), the powering device 100 starts activation of the powering circuitry 106 (S1905). During the wireless power transfer, the powering device 100 expects reception of status information indicative of any one operation status of the powered device 200 from the powered device 200. Upon receiving status information (S2903) indicative of a "Standby" mode from the powered device 200 through the communication using the communication circuitry 106, the powering device 100 enters the "Standby" status as the operational status for the ID of the powered device 200, for example as illustrated in the column 122*b* in FIG. 9, in the DB 122 (S1906). While managing the ID of the powered device 200 in the "Standby" status, upon receiving status information (S2904) indicative of a "Wireless Charging" status from the powered device 200 through the communication using the communication circuitry 106, the powering device 100 enters the "Wireless Charging" status as the operational status for the ID of the powered device 200, for example as illustrated in the column 122*b* in FIG. 9 (S1907). Also, in the embodiments, while managing the ID of the powered device 200 in the positive communication status after the step S1903, the powering device 100 performs the process 710 depicted in FIG. 27 for monitoring the communication with the powered device 200 in parallel to the process 708. In the embodiments, as depicted in FIG. 30, upon the discovery at the step S2082 when the communication circuitry 203 has been activated in accordance with the steps S2080 to S2081, the powered device 200, remaining in the "No Power" mode with the powered circuitry 210 deactivated, checks the authority of the powered device 200 itself, namely, determines whether or not the powered device 200 is authorized to be wirelessly powered by the powering device 100 with reference to the DB 222 (S2900). More particularly, if the powered device 200 finds the ID of the powering device 100 received in association with the discovery process being listed in the DB 222 as a connectable power source, the powered device 200 determines that the powered device 200 is authorized to receive wireless power transfer from the discovered powering device 100. On the contrary, if the powered device 200 does not find the ID of the discovered powering device 100 in the DB 122 as a connectable power source, the powered device 200 determines that the powered device 200 is not authorized to receive wireless power transfer from the discovered powering device 100. Upon determining that the powered device 200 is not authorized to receive wireless power transfer (S2900: No), the powering device 100 does not proceed to the "Powering" mode, and then the powered device 200 remains the communication circuitry 203 deactivated for a predetermined time in accordance with the steps S2401 to S2402. Upon determining that the powered device 200 is authorized to receive wireless power transfer (S2900: Yes), the powered device 200 sends to the powering device 100 through the communication using the communication circuitry 203 a positive acknowledgement indicating that the powered device 200 is authorized to receive wireless power transfer from the powering device 100 (S2901). In parallel to the transmission of the positive acknowledgement, the powered device 200 also expects reception of the same kind of positive acknowledgement from the powering device 100, namely, the acknowledgement (S1901) indicating that the powered device 200 is authorized to receive wireless power transfer from the powering device 100. Upon receiving the positive acknowledgement along with the ID of the powering device 100 from the powering device 100 through the communication using the communication circuitry 203 (S2902: Yes), the powered device 200 starts operation in the "Standby" mode and/or the "Wireless Charging" mode in accordance with the steps S2083 to S2090 and S2092 to S2097. In the course of performance of the steps S2083 to S2090 and S2092 to S2097, upon starting operation in the "Standby" mode in accordance with the step S2084 or S2093, the powered device 200 sends to the powering device 100 status information indicative of the "Standby" mode in which the powered device 200 is in operation through the communication using the communication circuitry 203 (S2903). Similarly, upon starting operation in the "Wireless Charging" mode in accordance with the step S2086, the powered device 200 sends to the powering device 100 status information indicative of the "Wireless Charging" mode in which the powered device 200 is in operation through the communication using the communication circuitry 203 (S2904). In the embodiments, for the process 708, the powering control program 121 may have the computer program instructions for the steps S1900 to S1907 while the charging control program 221 may have the computer program instructions for the steps S2900 to S2904.

Battery-Powered Powering Device 100

In some embodiments, the powering device 100 comprises the battery 109 and the charging circuitry 108, as depicted in FIG. 5, so as to selectively operate using power provided by the battery 109 or using power provided via the outlet 20. The powering device 100 with the battery 109 for the battery-powered operation may be a portable, mobile, or handheld user device such as a smartphone, cellular phone, tablet, laptop, and other gadgets, appliances, and the likes, in which case the powered device 200 may be a peripheral device for use in connection with the powering device 100 such as a microphone, earphone(s), headphone, mouse, keyboard, stylus, and other accessories. FIG. 34 is a block diagram illustrating an exemplary configuration of the powering device 100 as a battery-powered mobile user device. As depicted in FIG. 34, the powering device 100 may include a loudspeaker 110 and a microphone 111, and stores phone-call application 123, browser 124, and a media playback application 125 on the memory 102. In the example of FIG. 34, the communication circuitry 103 may be configured to perform telephony communication in accordance with a cellular telephony protocol and also to get access to the Internet for Internet communications. The phone-call application 123 may include instructions that cause the processor 101 to perform and control telephone calls using the communication circuitry 103, loudspeaker 110, and microphone 111. The browser 124 may include instructions that cause the processor 101 to access to web sites through Internet communication using the communication circuitry 103. The media playback application 125 may include instructions that cause the processor 101 to play back media contents such as video clips, music, photos, etc. stored on the memory 102 or fetched over the Internet through Internet communication using the communication circuitry 103.

In the embodiments, the powering device 100 may enable and disable wireless power transfer depending on whether the powering device 100 is currently battery-powered or AC-powered. FIG. 31 depicts a process 800 for the enablement/disablement. As depicted in FIG. 31, the powering device 100 determines whether the powering device 100 is in operation in an AC-powered mode where the powering device 100 is powered by the power supply 107 via the outlet 20 or is powered by the battery 109 (S3000). Upon determining that the powering device 100 is currently AC-powered (S3000: AC-Powered), the powering device 100 enables or allows wireless power transfer (S3001). On the contrary, upon determining that the powering device 100 is currently battery-powered (S3000: Battery-Powered), the powering device 100 disables or prohibits wireless power transfer (S3002).

In the embodiments, the powering device 100 may enable and disable wireless power transfer depending on the battery level of the battery 109 when in operation in the battery-powered mode (S3000: Battery-Powered). FIG. 32 depicts a process 810 for the enablement/disablement. As depicted in FIG. 32, the powering device 100 determines whether or not the battery level of the battery 109 is sufficient above a predetermined threshold (S3010). Upon determining that the battery level is above the threshold (S3010: Yes), the powering device 100 enables or allows wireless power transfer (S3001). On the contrary, upon determining that the battery level is low below the threshold (S3010: No), the powering device 100 disables or prohibits wireless power transfer (S3002).

In the embodiments, the powering device 100 may enable and disable wireless power transfer depending on whether the battery level of the battery 109 is currently or potentially declining moderately or steeply when in operation in the battery-powered mode (S3000: Battery-Powered). FIG. 33 depicts a process 820 for the enablement/disablement. As depicted in FIG. 33, the powering device 100 determines whether the level of the battery 109 is declining or likely to be declining moderately below a predetermined threshold or steeply above the threshold (S3020). The determination may be one that involves comparing with a threshold that indicates or corresponds to the moderateness, steepness, or intensity in the load on the battery 109. The determination herein may include, for example: determining whether or not the level of drop or decline in the battery level in a given time period is below a threshold, in which case affirmative determination represents the moderate decline while negative determination represents the steep decline (as illustrated in FIG. 41); determining whether or not the current battery consumption level or an average battery consumption level, such as one that may be expressed by a milli-ampere (mA), in a given time period is below a threshold, in which case affirmative determination represents the moderate decline while negative determination represents the steep decline (as illustrated in FIG. 42); determining whether or not the utilization or activity rate of the processor 101 is below a threshold, in which case affirmative determination represents the moderate decline while negative determination represents the steep decline (as illustrated in FIG. 43); determining whether or not the number of the currently active application programs being run by the processor 101 is below a threshold, in which case affirmative determination represents the moderate decline while negative determination represents the steep decline (as illustrated in FIG. 44); determining whether or not at least one specific application program, such as the phone-call application 123 and the media playback application 125, each of which typically causes relatively higher load on the processor 101 resulting in high load on the battery 109 is being run by the processor 101, in which case affirmative determination represents the steep decline while negative determination represents the moderate decline; determining whether or not at least one specific component, such as the loudspeaker 110 and the microphone 111, is being activated by the processor 101 in accordance with the instructions of at least one specific application program such as the phone-call application 123 and the OS 120, in which case affirmative determination represents the steep decline while negative determination represents the moderate decline; and determining whether or not the powering device 100 is in operation in a "Standby", "Sleep", "Hibernation", or similar power saving mode where at least one specific component such as the output 105 is intentionally deactivated or turned off by the processor 101 for saving power, in which case affirmative determination represents the moderate decline while negative determination represents the steep decline. Upon determining the moderate decline in the battery 109 (S3020: Moderate), the powering device 100 enables or allows wireless power transfer (S3001). On the contrary, upon determining the steep decline in the battery 109 (S3020: Steep), the powering device 100 disables or prohibits wireless power transfer (S3002).

In the embodiments, the powering device 100 may perform the determinations at the steps S3000, S3010, and S3020: continuously, periodically, or intermittently during the wireless power transfer processes 400 to 708 as described with reference to FIGS. 12 to 30; or at a given point of time such as, for example, before the activation of the powering circuitry 106 (S1000, S1010, S1022, S1032, S1041, S1061, S1072, S1083, S1505, S1706, S1806, S1905), upon the discovery (S1040, S1060, S1070, S1082), upon the affirmative determination as to reception of the response from the powered device 200 (S1021: Yes, S1031: Yes), upon the reception of the request from the powered device 200 (S2074), upon the affirmative determination as to the authority confirmation (S1100: Yes, S1200: Yes, S1300: Yes, S1400: Yes, S1502: Yes, S1702: Yes, S1802: Yes, S1902: Yes), and upon the entrance of the communication status in the DB 122 (S1503, S1703, S1803, S1903).

In the embodiments, the enablement of wireless power transfer may include enabling or allowing the activation of the powering circuitry 106 at the steps S1000, S1010, S1022, S1032, S1041, S1061, S1072, S1083, S1505, S1706, S1806, and S1905. The disablement of wireless power transfer may include disabling, prohibiting, preventing, or nullifying the activation of the powering circuitry 106 at the steps S1000, S1010, S1022, S1032, S1041, S1061, S1072, S1083, S1505, S1706, S1806, and S1905.

Ac-Powered Powered Device 200

In some embodiments, the powered device 200 comprises the power supply 207, as depicted in FIG. 7, so as to selectively operate using power provided via the outlet 20 or using power provided by the battery 209. In the embodiments, the powered device 200 may enable and disable wireless power charging depending on whether the powered device 200 is currently battery-powered or AC-powered. FIG. 35 depicts a process 850 for the enablement/disablement. As depicted in FIG. 35, the powered device 200 determines whether the powered device 200 is in operation in an AC-powered mode where the powered device 200 is powered by the power supply 207 via the outlet 20 or is powered by the battery 209 (S4000). Upon determining that the powered device 200 is currently battery-powered (S4000: Battery-Powered), the powered device 200 enables or allows wireless power charging (S4001). On the contrary, upon determining that the powered device 200 is currently AC-powered (S4000: AC-Powered), the powered device 200 disables or prohibits wireless power charging (S4002).

In the embodiments, the powered device 200 may perform the determination at the step S4000: continuously, periodically, or intermittently during the wireless power charging processes 400 to 708 as described with reference to FIGS. 12 to 30; or at a given point of time such as, for example, before the activation of the powered circuitry 210 (S2000, S2011, S2020, S2031, S2041, S2063, S2073, S2083), upon the discovery (S2040, S2060, S2070, S2082), upon the negative determination as to the battery level of the battery 209 (S2010: No, S2030: No, S2062: No, S2072: No, S2080: No), and upon the affirmative determination as to the authority confirmation (S2100: Yes, S2200: Yes, S2300: Yes, S2400: Yes, S2502: Yes, S2702: Yes, S2802: Yes, S2902: Yes).

In the embodiments, the enablement of wireless power charging may include enabling or allowing the activation of the powered circuitry 210 at the steps S2000, S2011, S2020, S2031, S2041, S2063, S2073, and S2083. The disablement of wireless power transfer may include disabling, prohibiting, preventing, or nullifying the activation of the powered circuitry 210 at the steps S2000, S2011, S2020, S2031, S2041, S2063, S2073, and S2083.

Daisy Chain Powering

In some embodiments, the powered device 200 may also include powering circuitry 206 just like the powering device 100, as depicted in FIG. 8, to wirelessly power another powered device 200 nearby. As a result, the embodiments may provide daisy-chain powering in an environment including two or more powered devices 200 present in proximity to one another, as depicted in FIG. 3, in which: a powered device 200 in the powering region 10 wirelessly powered by the powering device 100 (200A in FIG. 3) provides another powering region 11 for wireless power transfer to at least one other nearby or neighboring powered device 200 out of the powering region 10; the powered device 200 out of the powering region 10 but wirelessly powered in the powering region 11 (200B in FIG. 3) provides further another powering region 12 for wireless power transfer to at least one other nearby powered device 200 out of the powering regions 10 and 11 (200C in FIG. 3); and accordingly the powering regions 11 to 13 are provided in turn by the multiple powered devices 200 from one closest to the powering device 100 (200A in FIG. 3) to one farthest from the powering device 100 (200C in FIG. 3).

FIG. 36 depicts a process 900 for the daisy-chain powering, illustrating an example of the daisy-chain powering between two powered devices 200A and 200B. In the embodiments, each powered device 200 continuously, periodically, or intermittently determines whether or not the powered device 200 is being charged through the powered circuitry 210 (S5000, S5010). The determination at the steps S5000 and S5010 may correspond to the determination at the step S2001, S2012, S2021, S2032, S2043, S2064, S2075, or S2085 in the above-mentioned processes. Upon determining that the powered device 200 is being charged through the powered circuitry 210 (S5000, S5010: Yes), the powered device 200 activates the powering circuitry 206 to provide for wireless power transfer (S5001, S5011). As long as the battery 209 is being charged by power generated by the powered circuitry 206, the powered device 200 may remain the powering circuitry 206 active. If the powered device 200A is present closest to the powering device 100 enough to be present in the powering region 10, the powered device 200A receives wireless power transfer from the powering device 100 and thus the battery 209 is charged by power generated by the powered circuitry 210 (S5000: Yes). So, the powered device 200A then activates the powering circuitry 206 to provide the powering region 11 (S5001). On the other hand, the powered device 200B out of the powering region 10 initially cannot be charged through the powered circuitry 206 (S5010: No), but in response to the provision of the powering region 11 by the powered device 200A at the step S5001, starts being charged through the powered circuitry 206 in the powering region 11 (S5010: Yes). So the powered device 200B then activates the powering circuitry 206 to provide the powering region 12 for wireless power transfer (S5011).

FIG. 37 depicts a process 901 for the daisy-chain powering, illustrating an example of the daisy-chain powering between two powered devices 200A and 200B. In the embodiments, each powered device 200 continuously, periodically, or intermittently determines whether or not the battery level of the battery 209 is sufficient above a threshold (S5020, S5030). The determination at the steps S5020 and S5030 may correspond to the determination at the step S2010, S2015, S2030, S2036, S2062, S2066, S2072, S2077, S2080, or S2087 in the above-mentioned processes. Upon determining that the battery level of the battery 209 is sufficient above the threshold (S5020, S5030: Yes), the powered device 200 activates the powering circuitry 206 to provide for wireless power transfer (S5021, S5031). As long as the battery level of the battery 209 is sufficient above the threshold, the powered device 200 may remain the powering circuitry 206 active. If the powered device 200A is present closest to the powering device 100 enough to be present in the powering region 10, the battery level of the battery 209 in the powered device 200A tends to be kept sufficient above the threshold as the powered device 200A is charged through the powered circuitry 210 (S5020: Yes). So, the powered device 200A then activates the powering circuitry 206 to provide the powering region 11 (S5021). On the other hand, the powered device 200B out of the powering region 10 initially cannot be charged through the powered circuitry 206, resulting in the battery level of the battery 209 being below the threshold (S5030: No), but in response to the provision of the powering region 11 by the powered device 200A at the step S5021, starts being charged through the powered circuitry 206 in the powering region 11, resulting in the battery level of the battery 209 being above the threshold (S5030: Yes). So the powered device 200B then activates the powering circuitry 206 to provide the powering region 12 for wireless power transfer (S5031).

FIG. 38 depicts a process 902 for the daisy-chain powering, illustrating an example of the daisy-chain powering between two powered devices 200A and 200B. In the embodiments, each powered device 200 starts activation of the powering circuitry 206 (S5041, S5051) upon discovery of another powered device 200 through communication using the communication circuitry 203 (S5040, S5050). When the powered device 200B is present near the powered device 200A, the powered devices 200A and 200B discover each other so that the powered device 200A starts providing the powering region 11 for wireless power transfer to the powered device 200B.

FIG. 39 depicts a process 903 for the daisy-chain powering, illustrating an example of the daisy-chain powering between two powered devices 200A and 200B. In the embodiments, each powered device 200 determines whether or not the powered device 200 is being charged through the powered circuitry 210 (S5061, S5071) upon discovery of another powered device 200 through communication using the communication circuitry 203 (S5060, S5070). The powered device 200 starts activation of the powering circuitry 206 (S5062, S5072) when the battery 209 is being charged by power generated by the powered circuitry 210 (S5061, S5071: Yes) upon the discovery. The powered device 200A starts activation of the powering circuitry 206 to provide the powering region 11 if the powered device 200A is receiving wireless power transfer from the powering device 100 in the powering region 10 upon discovery of the powered device 200B (S5062). On the contrary, the powered device 200B out of the powering region 10 should make a negative determination at the step S5071 upon discovery of the powered device 200A. However, once the powered device 200B starts reception of wireless power transfer from the powered device 200A in the powering region 11 provided in accordance with the step S5062, the powered device 200B should make an affirmative determination at the step S5071 upon discovery of another powered device 200 (i.e., the powered device 200C) to provide the powering region 12 for wireless power transfer to said another powered device 200 (S5072).

FIG. 40 depicts a process 904 for the daisy-chain powering, illustrating an example of the daisy-chain powering between two powered devices 200A and 200B. In the embodiments, each powered device 200 determines whether or not the powered device 200 is being charged through the powered circuitry 210 (S5080, S5090), and also determines whether or not the powered device 200 is currently discovering two or more devices in total through communication using the communication circuitry 203 (S5081, S5091). The determinations at the steps S5080 to S5081 or S5090 to S5091 may be made upon discovery of another powered device 200, or may be made continuously, periodically, or intermittently. Upon determining affirmatively (S5081, S5091: Yes), the powered device 200 starts activation of the powering circuitry 206 to provide a powering region for wireless power transfer (S5082, S5092). In other words, the powered device 200 starts activation of the powering circuitry 206 on the condition that: (a) the battery 209 is being charged by power generated by the powered circuitry 210 and (b) the powered device 200 is in communication with two or more devices in total. The communication with two or more devices in total may include: communication with the powering device 100 and with at least one other powered device 200; and communication with two or more other powered devices 200. When the powered device 200A in the powering region 10 wirelessly powered by the powering device 100 discovers the powered device 200B, the powered device 200A meets the condition that the powered device 200A is being charged through the powered circuitry 210 (S5080: Yes) and the powered device 200A is in communication with two or more devices, namely, the powering device 100 and the powered device 200B (S5081: Yes), leading to activation of the powering circuitry 206 to provide the powering region 11 (S5082). On the contrary, the powered device 200B does not meet the condition when the powered device 200B is in communication with only the powered device 200A even if the powered device 200B is being charged through the powered circuitry 210 in the powering region 11. However, once the powered device 200B discovers another powered device 200 (i.e., the powered device 200C) to be in communication with said another powered device 200, the powered device 200B meets the condition that the powered device 200B is being charged through the powered circuitry 210 (S5090: Yes) and the powered device 200B is in communication with two or more devices, namely, the powered devices 200A and 200C (S5091: Yes), leading to activation of the powering circuitry 206 to provide the powering region 12 (S5092).

CONCLUSION AND NOTE

Various embodiments of the present invention as described above provide smart wireless power transfer between a powering device and a powered device. Further modifications and alternative embodiments will be apparent to those skilled in the art in view of this disclosure. Accordingly, the above description is to be construed as illustrative only and is for the purpose of teaching those skilled in the art a manner of carrying out the invention. It is to be understood that the forms of the invention herein shown and described are to be taken as exemplary embodiments. Various modifications may be made without departing from the scope of the invention. For example, equivalent elements or materials may be substitute for those illustrated and described herein, and certain features of the invention may be utilized independently of the use of other features, all as would be apparent to one skilled in the art after having the benefit of this description of the invention. In addition, the terms "a" and "an" are generally used in the present disclosure to mean one or more.

What is claimed is:

1. A wireless power transfer system for wirelessly charging a powered device, comprising:
a battery power source for supplying power to the wireless power transfer system;
wireless communication circuitry for establishment of a close-range wireless communication over which a message associated with the powered device is communicated from the powered device; and
wireless powering circuitry including a transmitter configured to emit electromagnetic waves to form a radiative powering region within which the electromagnetic waves can be received by wireless powered circuitry of the powered device to generate power for charging a battery in the powered device, the wireless powering circuitry being configured to be activated when the close-range wireless communication is established,
wherein transmission power of the wireless communication circuitry is so controlled as to make a range of the close-range wireless communication substantially narrower than a range of the radiative powering region,
wherein the message is issued by the powered device when a battery level of the battery is below a predetermined threshold, and the wireless powering circuitry is configured to be activated in response to receipt of the message from the powered device over the established close-range wireless communication, and
wherein, when the wireless power transfer system is powered by the battery power source, a determination is made whether a level of drop in a battery level of the battery power source in a given time period is below a threshold, so that activation of the wireless powering circuitry is allowed only when the level of drop is determined to be below the threshold.

2. A wireless power transfer system for wirelessly charging a powered device, comprising:
a battery power source for supplying power to the wireless power transfer system;
wireless communication circuitry for establishment of a close-range wireless communication over which a message associated with the powered device is communicated from the powered device; and
wireless powering circuitry including a transmitter configured to emit electromagnetic waves to form a radiative powering region within which the electromagnetic waves can be received by wireless powered circuitry of the powered device to generate power for charging a battery in the powered device, the wireless powering circuitry being configured to be activated when the close-range wireless communication is established,
wherein transmission power of the wireless communication circuitry is so controlled as to make a range of the close-range wireless communication substantially narrower than a range of the radiative powering region,
wherein the message is issued by the powered device when a battery level of the battery is below a predetermined threshold, and the wireless powering circuitry is configured to be activated in response to receipt of the message from the powered device over the established close-range wireless communication, and wherein, when the wireless power transfer system is powered by the battery power source, a determination is made whether an average battery consumption level of the battery power source in a given time period is below a threshold, so that activation of the wireless powering circuitry is allowed only when the average battery consumption level is determined to be below the threshold.

3. A wireless power transfer system for wirelessly charging a powered device, comprising:

a battery power source for supplying power to the wireless power transfer system;

a processor;

wireless communication circuitry for establishment of a close-range wireless communication over which a message associated with the powered device is communicated from the powered device; and wireless powering circuitry including a transmitter configured to emit electromagnetic waves to form a radiative powering region within which the electromagnetic waves can be received by wireless powered circuitry of the powered device to generate power for charging a battery in the powered device, the wireless powering circuitry being configured to be activated when the close-range wireless communication is established, wherein transmission power of the wireless communication circuitry is so controlled as to make a range of the close-range wireless communication substantially narrower than a range of the radiative powering region, wherein the message is issued by the powered device when a battery level of the battery is below a predetermined threshold, and the wireless powering circuitry is configured to be activated in response to receipt of the message from the powered device over the established close-range wireless communication, and wherein, when the wireless power transfer system is powered by the battery power source, a determination is made whether a utilization rate of the processor is below a threshold, so that activation of the wireless powering circuitry is allowed only when the utilization rate is determined to be below the threshold.

4. A wireless power transfer system for wirelessly charging a powered device, comprising:

a battery power source for supplying power to the wireless power transfer system;

a processor;

an operating system;

application programs configured to be executed by the processor on the operating system;

wireless communication circuitry for establishment of a close-range wireless communication over which a message associated with the powered device is communicated from the powered device; and wireless powering circuitry including a transmitter configured to emit electromagnetic waves to form a radiative powering region within which the electromagnetic waves can be received by wireless powered circuitry of the powered device to generate power for charging a battery in the powered device, the wireless powering circuitry being configured to be activated when the close-range wireless communication is established, wherein transmission power of the wireless communication circuitry is so controlled as to make a range of the close-range wireless communication substantially narrower than a range of the radiative powering region, wherein the message is issued by the powered device when a battery level of the battery is below a predetermined threshold, and the wireless powering circuitry is configured to be activated in response to receipt of the message from the powered device over the established close-range wireless communication, and wherein, when the wireless power transfer system is powered by the battery power source, a determination is made whether a number of application programs being executed by the processor is below a threshold, so that activation of the wireless powering circuitry is allowed only when the number of the application programs is determined to be below the threshold.

* * * * *